US012565921B2

(12) United States Patent (10) Patent No.: US 12,565,921 B2
Walkingshaw et al. (45) Date of Patent: Mar. 3, 2026

(54) FLYWHEEL VACUUM ENCLOSURE AND ADJUSTMENT SYSTEM

(71) Applicant: Torus Inc., Sandy, UT (US)

(72) Inventors: Nathan Walkingshaw, Sandy, UT (US); Calab Nelson, Springville, UT (US); John Loveless, Layton, UT (US); Zahra Derafshi, Cambridge, MA (US); Cliff Lambarth, Portage, MI (US); Sean Peterson, Payson, UT (US)

(73) Assignee: Torus Inc., South Salt Lake, UT (US)

( * ) Notice: Subject to any disclaimer, the term of this patent is extended or adjusted under 35 U.S.C. 154(b) by 0 days.

(21) Appl. No.: 18/666,542

(22) Filed: May 16, 2024

(65) Prior Publication Data

US 2024/0384777 A1 Nov. 21, 2024

Related U.S. Application Data

(60) Provisional application No. 63/502,648, filed on May 16, 2023.

(51) Int. Cl.
F16F 15/31 (2006.01)
F03G 3/08 (2006.01)
(Continued)

(52) U.S. Cl.
CPC ............ F16F 15/3156 (2013.01); F03G 3/08 (2013.01); F16C 17/02 (2013.01);
(Continued)

(58) Field of Classification Search
CPC .... F16F 15/3156; F16F 15/3153; F16F 15/30; F03G 3/08; F16C 17/02; F16C 2361/55;
(Continued)

(56) References Cited

U.S. PATENT DOCUMENTS 3,970,917 A 7/1976 Diggs
4,186,245 A 1/1980 Gilman
(Continued)

FOREIGN PATENT DOCUMENTS

CN 217676608 U 10/2022
CN 115626413 A 1/2023
(Continued)

OTHER PUBLICATIONS

International Search Report and Written Opinion received for PCT Patent Application No. PCT/US2024/029771, mailed on Sep. 23, 2024, 16 pages.

(Continued)

*Primary Examiner* — Thomas C Diaz
(74) *Attorney, Agent, or Firm* — VLP Law Group, LLP; Michel Bohn; Lance Topham

(57) ABSTRACT

A system may include an enclosure base having a bottom surface and one or more side walls coupled with the bottom surface. A system may include an enclosure lid having a top surface, the enclosure lid coupling with the one or more side walls of the enclosure base to create an enclosed space, the enclosed space containing a massive flywheel, the massive flywheel having one or more axles. A system may include one or more bearings coupling the one or more axles to the enclosure base and the enclosure lid, the one or more bearings holding the one or more axles at an axis of rotation. Aspects of the invention include components coupled with the system, such as a vacuum assembly, adjustment and locking mechanisms, and other components.

20 Claims, 34 Drawing Sheets

(51) Int. Cl.
| | | |
|---|---|---|
| *F16C 17/02* | (2006.01) | |
| *F16F 15/315* | (2006.01) | |
| *H02K 7/09* | (2006.01) | |
| *H02K 7/02* | (2006.01) | |

(52) U.S. Cl.
CPC .......... *F16F 15/3153* (2013.01); *H02K 7/09* (2013.01); *F05B 2230/608* (2013.01); *F05B 2240/40* (2013.01); *F05B 2260/421* (2013.01); *F16C 2361/55* (2013.01); *H02K 7/025* (2013.01)

(58) Field of Classification Search
CPC .... H02K 7/09; H02K 7/025; F05B 2230/608; F05B 2240/40; F05B 2260/421; Y02E 60/16
See application file for complete search history.

(56) References Cited

U.S. PATENT DOCUMENTS

| | | | |
|---|---|---|---|
| 4,538,079 A | | 8/1985 | Nakayama et al. |
| 5,124,605 A | * | 6/1992 | Bitterly ................. F16F 15/305 |
| | | | 310/90.5 |
| 5,726,516 A | | 3/1998 | Randall |
| 5,783,885 A | | 7/1998 | Post |
| 6,029,538 A | * | 2/2000 | Little .................. F16F 15/3156 |
| | | | 384/903 |
| 6,614,142 B1 | | 9/2003 | Bonnieman et al. |
| 6,679,634 B2 | * | 1/2004 | Plesh, Sr. ................ F16C 43/06 |
| | | | 384/510 |
| 7,977,837 B2 | | 7/2011 | Oyama |
| 9,325,217 B2 | * | 4/2016 | Veltri ....................... H02K 7/09 |
| 11,362,558 B2 | | 6/2022 | Sanders et al. |
| 11,824,355 B2 | | 11/2023 | Walkingshaw et al. |
| D1,051,117 S | | 11/2024 | Hennessey |
| 2003/0029269 A1 | | 2/2003 | Gabrys |
| 2004/0051507 A1 | | 3/2004 | Gabrys et al. |
| 2011/0031827 A1 | | 2/2011 | Gennesseaux |
| 2012/0062154 A1 | | 3/2012 | Chiao et al. |
| 2012/0176074 A1 | | 7/2012 | Dubois et al. |
| 2013/0015825 A1 | | 1/2013 | Pullen |
| 2013/0261001 A1 | | 10/2013 | Hull et al. |
| 2014/0165777 A1 | | 6/2014 | Andrews et al. |
| 2014/0346780 A1 | * | 11/2014 | Holder .................... F16D 1/033 |
| | | | 29/598 |
| 2014/0366683 A1 | | 12/2014 | Pullen |
| 2016/0178031 A1 | | 6/2016 | Pullen |
| 2016/0241106 A1 | | 8/2016 | Veltri |
| 2016/0377147 A1 | | 12/2016 | Sun et al. |
| 2020/0112216 A1 | | 4/2020 | Galmiche et al. |
| 2020/0212762 A1 | | 7/2020 | Dharan |
| 2020/0259379 A1 | | 8/2020 | Sanders et al. |
| 2021/0184539 A1 | | 6/2021 | Ashley |
| 2022/0231572 A1 | | 7/2022 | Kesler |
| 2022/0243784 A1 | | 8/2022 | Pullen |
| 2023/0138936 A1 | | 5/2023 | Walker, III et al. |
| 2023/0246481 A1 | | 8/2023 | Walkingshaw et al. |
| 2024/0088706 A1 | | 3/2024 | Walkingshaw et al. |
| 2024/0384708 A1 | | 11/2024 | Walkingshaw et al. |
| 2024/0384776 A1 | | 11/2024 | Walkingshaw et al. |
| 2024/0388164 A1 | | 11/2024 | Walkingshaw et al. |
| 2024/0388165 A1 | | 11/2024 | Walkingshaw et al. |

FOREIGN PATENT DOCUMENTS

| | | | |
|---|---|---|---|
| GB | 2494783 A | 3/2013 | |
| IL | 289441 A | 12/2022 | |
| JP | 2007-056710 A | 3/2007 | |
| WO | 93/07387 A1 | 4/1993 | |
| WO | 2023/126923 A1 | 7/2023 | |
| WO | 2024/238840 A1 | 11/2024 | |
| WO | 2024/238842 A1 | 11/2024 | |
| WO | 2024/238845 A1 | 11/2024 | |
| WO | 2024/238855 A1 | 11/2024 | |

OTHER PUBLICATIONS

Amber Kinetics, Inc. (2015). Final Technical Report: Smart Grid Demonstration Program—Flywheel Energy Storage Demonstration. U.S. Department of Energy, Contract ID: DE-OE0000232, Dec. 30, 2015, 16 pages, Version 1.0., https://www.energy.gov/sites/prod/files/2017/01/f34/Amber_Kinetics_Final_Technical_Report.pdf.

Groom, N. J., et al., "Fifth International Symposium on Magnetic Suspension Technology", NASA/CP-2000-210291, Jul. 2000, Introduction through the Table of Contents, Session 1 (pp. 1-48), a portion of Session 5 (pp. 239-247), Session 7 (pp. 285-307), Session 9 (pp. 355-381), Session 15 (pp. 593-610), and a portion of Session 17 (pp. 675-720).

Globalspec, Flywheel Power Systems Selection Guide: Types, Features, Applications, Flywheel Power Systems Information, 5pp., obtained at https://www.globalspec.com/learnmore/electrical_electronic_components/power_generation_storage/alternative_power_generators/flywheel_power_systems.

"The energy transition demands more than renewables and battery-based energy storage," Amber Kinetics—Take Charge, retrieve from https://amberkinetics.com/, retrieved on Feb. 25, 2023, pp. 5.

Amiryar, M. E., et al., "Analysis of Standby Losses and Charging Cycles in Flywheel Energy Storage Systems", Energies, vol. 13, 2020, 22 pages.

Bianchini, C., et al., "Design of Motor/Generator for Flywheel Batteries", IEEE Transactions on Industrial Electronics, vol. 68, No. 1, Oct. 2021, pp. 9675-9684.

Ertz, Gabriel, Development, manufacturing, and testing of a multi-rim {hybrid} flywheel rotor, Diploma Thesis University of Alberta, Institute for Dynamics and Vibration, Jun. 10, 2014, 107 pages.

Groom, N. J., et al., "Fifth International Symposium on Magnetic Suspension Technology", NASA/CP-2000-210291, Jul. 2000, 746 pages.

Ha, Sung K., et al, Design and Manufacture of a Composite Flywheel Press-Fit Multi-Rim Rotor, Journal of Reinforced Plastics and Composites, 27, Feb. 25, 2008, SAGE Publications, pp. 953-965.

Ha, Sung K., et al., Design and Spin Test of Hybrid Composite Flywheel Rotor with Split Type Hub, Journal of Composite Materials, Jan. 9, 2006, SAGE Publications, pp. 1-18.

International Search Report and Written Opinion of Intl. Application No. PCT/US2023/061784, mailed Jun. 5, 2023 (12pages).

Kim, Seong J., et al., Design and fabrication of hybrid composite hub for multi-rim flywheel energy storage system, Composite Structures 107, 2014, pp. 19-29.

Machine translation of JP2007056710; Nakaseki et al. (Year: 2007).

International Preliminary Report on Patentability received for PCT Patent Application No. PCT/US23/61784, mailed on Aug. 15, 2024, 11 pages.

International Search Report and Written Opinion received for PCT Patent Application No. PCT/US24/29773, mailed on Aug. 15, 2024, 12 pages.

International Search Report and Written Opinion received for PCT Patent Application No. Aug. 15, 2024, 13 pages.

International Search Report and Written Opinion received for PCT Patent Application No. PCT/US24/29793, mailed on Aug. 8, 2024, 7 pages.

Invitation to Pay Additional Fees received for PCT Patent Application No. PCT/US2024/029771,30, 2024, 2 pages.

Extended European Search Report and Search Opinion received for EP Application No. 23750366.9, mailed on Oct. 13, 2025, 16 pages.

Office Action received for Australian Patent Application No. 2023215462, mailed on Feb. 17, 2025, 4 pages.

International Preliminary Report on Patentability received for PCT application No. PCT/US24/29773, mailed on Nov. 27, 2025, 10 pages.

International Preliminary Report on Patentability received for PCT application No. PCT/US24/29779, mailed on Nov. 27, 2025, 12 pages.

(56)                References Cited

OTHER PUBLICATIONS

International Preliminary Report on Patentability received for PCT application No. PCT/US24/29793, mailed on Nov. 27, 2025, 7 pages.
International Preliminary Report on Patentability received for PCT Patent Application No. PCT/US24/29771, mailed on Nov. 27, 2025, 13 pages.
Office Action received for Australian Patent Application No. 2024272422, mailed on Dec. 8, 2025, 4 pages.
Office Action received for Australian Patent Application No. 2024274349, mailed on Dec. 3, 2025, 3 pages.

* cited by examiner

606

408b

264

240

238

714

712

606

604

722

724

726

728

734
732
736
738
740

264

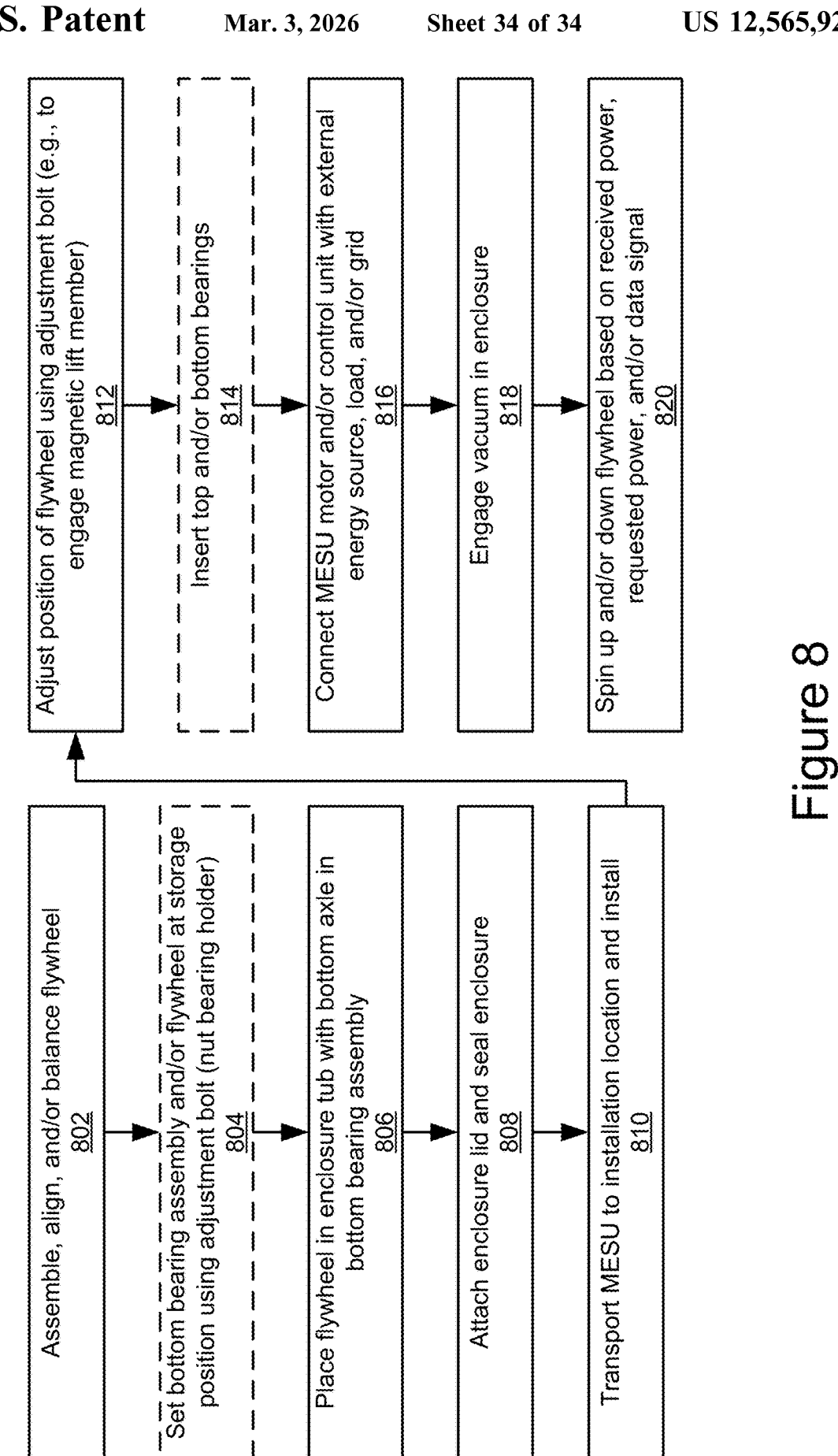

Assemble, align, and/or balance flywheel 802

Set bottom bearing assembly and/or flywheel at storage position using adjustment bolt (nut bearing holder) 804

Place flywheel in enclosure tub with bottom axle in bottom bearing assembly 806

Attach enclosure lid and seal enclosure 808

Transport MESU to installation location and install 810

Adjust position of flywheel using adjustment bolt (e.g., to engage magnetic lift member) 812

Insert top and/or bottom bearings 814

Connect MESU motor and/or control unit with external energy source, load, and/or grid 816

Engage vacuum in enclosure 818

Spin up and/or down flywheel based on received power, requested power, and/or data signal 820

Figure 8

FLYWHEEL VACUUM ENCLOSURE AND ADJUSTMENT SYSTEM

CROSS-REFERENCE TO RELATED APPLICATION

This application claims priority to U.S. Provisional Patent Application No. 63/502,648 filed on May 16, 2023. The present application is related to co-pending U.S. application Ser. No. 18/666,522, titled "Mechanical-Energy Storage Unit System" filed on May 16, 2024; U.S. application Ser. No. 18/666,557, titled "Stacking Flywheel and Linkage" filed on May 16, 2024; U.S. application Ser. No. 18/666,573, titled "Flywheel Magnetic Lift and Bearing System" filed on May 16, 2024; and U.S. application Ser. No. 18/666,593, titled "Mechanical-Energy Storage Unit and Assembly Fixture" filed on May 16, 2024; as the present application by common inventors. All of these applications are incorporated herein by reference, including their specifications and drawings, which disclosure is not admitted to be prior art with respect to the present invention by its mention in the cross-reference section.

BACKGROUND

The present disclosure relates to mechanical energy storage units. Implementations relate to flywheel-based mechanical energy storage units.

Currently, residential electricity customers, as well as electrical utilities, use various sources of electrical energy storage to offset varying electrical power production and use, such as the duck curve associated with solar or other renewable energy production. The variation in power production and usage has been further exacerbated with the increasing popularity of renewable power sources. These issues cause significant cost and other issues to utilities, power outages, and other issues.

Commonly, excess or backup power is stored in chemical storage, such as large chemical batteries. Unfortunately, chemical batteries suffer from many issues that make them undesirable at both a residential level and at a utility level. For example, chemical batteries may be very expensive, complex, and require numerous safeguards against fires. Chemical batteries are also ecologically unfriendly, as their production uses toxic chemicals, creates significant greenhouse gases, and results in significant material waste. Furthermore, chemical batteries have short lifespans because the batteries have a limited number of years and recharge cycles before they must be disposed of.

Previous solutions for mechanical energy storage have been overly complex, too large to be implemented at a residential level, not scalable for an electrical utility, or have faced other issues.

SUMMARY

In some aspects, the techniques described herein relate to a flywheel enclosure including: an enclosure base having a bottom surface and one or more side walls coupled with the bottom surface; an enclosure lid having a top surface, the enclosure lid coupling with the one or more side walls of the enclosure base to create an enclosed space, the enclosed space containing a massive flywheel, the massive flywheel having one or more axles; and one or more bearings coupling the one or more axles to the enclosure base and the enclosure lid, the one or more bearings holding the one or more axles at an axis of rotation.

In some aspects, the techniques described herein relate to a flywheel enclosure, further including: a plurality of reinforcing ribs reinforcing the bottom surface and the one or more side walls.

In some aspects, the techniques described herein relate to a flywheel enclosure, wherein: one or more seals are disposed on at least one of the enclosure base and the enclosure lid, the one or more seals sealing the enclosed space to provide a vacuum inside the enclosed space.

In some aspects, the techniques described herein relate to a flywheel enclosure, wherein: the enclosure base includes a top ring mounted to the one or more side walls, the top ring including a groove holding an O-ring seal; the enclosure lid mounts to the top ring via a plurality of fasteners, the O-ring seal sealing the enclosure lid to the top ring; and the one or more bearings include a top bearing coupled with the enclosure lid and a bottom bearing coupled with the enclosure base.

In some aspects, the techniques described herein relate to a flywheel enclosure, further including: a component mounting plate coupled with the enclosure lid, the component mounting plate including a plurality of mounting points for mounting flywheel accessory components to the enclosure lid, the flywheel accessory components including a vacuum assembly.

In some aspects, the techniques described herein relate to a flywheel enclosure, further including: a positioning mechanism coupled with the enclosure base, the positioning mechanism moving one or more of the one or more bearings and the massive flywheel within the enclosed space.

In some aspects, the techniques described herein relate to a flywheel enclosure, wherein the positioning mechanism includes: a nut bearing holder that holds a bottom bearing of the one or more bearings, the nut bearing holder having threads that cause the nut bearing holder to move the bottom bearing vertically when the nut bearing holder is rotated.

In some aspects, the techniques described herein relate to a flywheel enclosure, wherein: the nut bearing holder lifts the massive flywheel via the one or more bearings when the nut bearing holder is rotated.

In some aspects, the techniques described herein relate to a flywheel enclosure, wherein the enclosure base includes threaded ring around a perforation in the bottom surface, the threaded ring interacting with the threads of the nut bearing holder.

In some aspects, the techniques described herein relate to a flywheel enclosure, further including: a shipping support area coupled with the enclosure base and configured to vertically support the massive flywheel during shipping, the positioning mechanism configured to decouple the massive flywheel and the shipping support area.

In some aspects, the techniques described herein relate to a flywheel enclosure, wherein the shipping support area includes a shipping ring located around a perforation in the bottom surface, the one or more bearings extending through the perforation in the bottom surface.

In some aspects, the techniques described herein relate to a flywheel enclosure, wherein the positioning mechanism includes: a nut bearing holder that holds a bottom bearing of the one or more bearings, the nut bearing holder moving the one or more of the one or more bearings and the massive flywheel within the enclosed space when the nut bearing holder is rotated; and a nut locking mechanism that locks the nut bearing holder rotationally to the enclosure base.

In some aspects, the techniques described herein relate to a flywheel enclosure, wherein the nut locking mechanism includes: a retaining cap that holds the nut bearing holder to the enclosure base and encloses the one or more bearings in the enclosed space.

In some aspects, the techniques described herein relate to a flywheel enclosure, wherein the nut locking mechanism includes: a hex interface coupling with the nut bearing holder and the retaining cap, the hex interface allowing the nut bearing holder to be held by the retaining cap at a set of angles defined by the hex interface.

In some aspects, the techniques described herein relate to a flywheel enclosure, wherein: the flywheel enclosure includes one or more magnets coupled with the enclosure lid, the one or more magnets pulling the massive flywheel toward the enclosure lid; and the positioning mechanism is configured to lift the massive flywheel to increase the pulling force of the one or more magnets.

In some aspects, the techniques described herein relate to a flywheel system including: an enclosure base having a bottom surface and one or more side walls coupled with the bottom surface; an enclosure lid having a top surface, the enclosure lid coupling with the enclosure base to create an enclosed space, the enclosed space containing a massive flywheel, the massive flywheel including a massive cylinder and one or more axles, the massive flywheel rotating about the one or more axles, a motor being mounted to the enclosure lid and coupled with the one or more axles, the motor changing a rotational velocity of the massive flywheel; and one or more bearings coupling the one or more axles to the enclosure base and the enclosure lid, the one or more bearings holding the one or more axles at an axis of rotation.

In some aspects, the techniques described herein relate to a flywheel system, further including: a positioning mechanism coupled with the enclosure base, the positioning mechanism moving one or more of the one or more bearings and the massive flywheel within the enclosed space.

In some aspects, the techniques described herein relate to a flywheel system, wherein the positioning mechanism includes: a nut bearing holder that holds a bottom bearing of the one or more bearings, the nut bearing holder having threads that cause the nut bearing holder to move the bottom bearing vertically when the nut bearing holder is rotated.

In some aspects, the techniques described herein relate to a flywheel system, wherein: the nut bearing holder lifting the massive flywheel via the one or more bearings when the nut bearing holder is rotated.

In some aspects, the techniques described herein relate to a system including: an enclosure tub having a bottom surface and one or more side walls coupled with the bottom surface; an enclosure lid having a top surface, the enclosure lid coupling with the enclosure tub to create an enclosed space, the enclosed space containing a massive flywheel, the massive flywheel having one or more axles; one or more bearings coupling the one or more axles to the enclosure tub and the enclosure lid, the one or more bearings holding the one or more axles at an axis of rotation; and a positioning mechanism coupled with the enclosure tub, the positioning mechanism holding the one or more bearings, the positioning mechanism moving the massive flywheel vertically via the one or more bearings.

Other implementations of one or more of these aspects or other aspects include corresponding systems, apparatus, and computer programs, configured to perform the various actions and/or store various data described in association with these aspects. These and other implementations, such as various data structures for controlling the mechanical energy storage unit, may be encoded on tangible computer storage devices. Numerous additional features may, in some cases, be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

FIG. 8 is a block diagram illustrating a method of building a flywheel assembly.

DETAILED DESCRIPTION

Figure 1A:
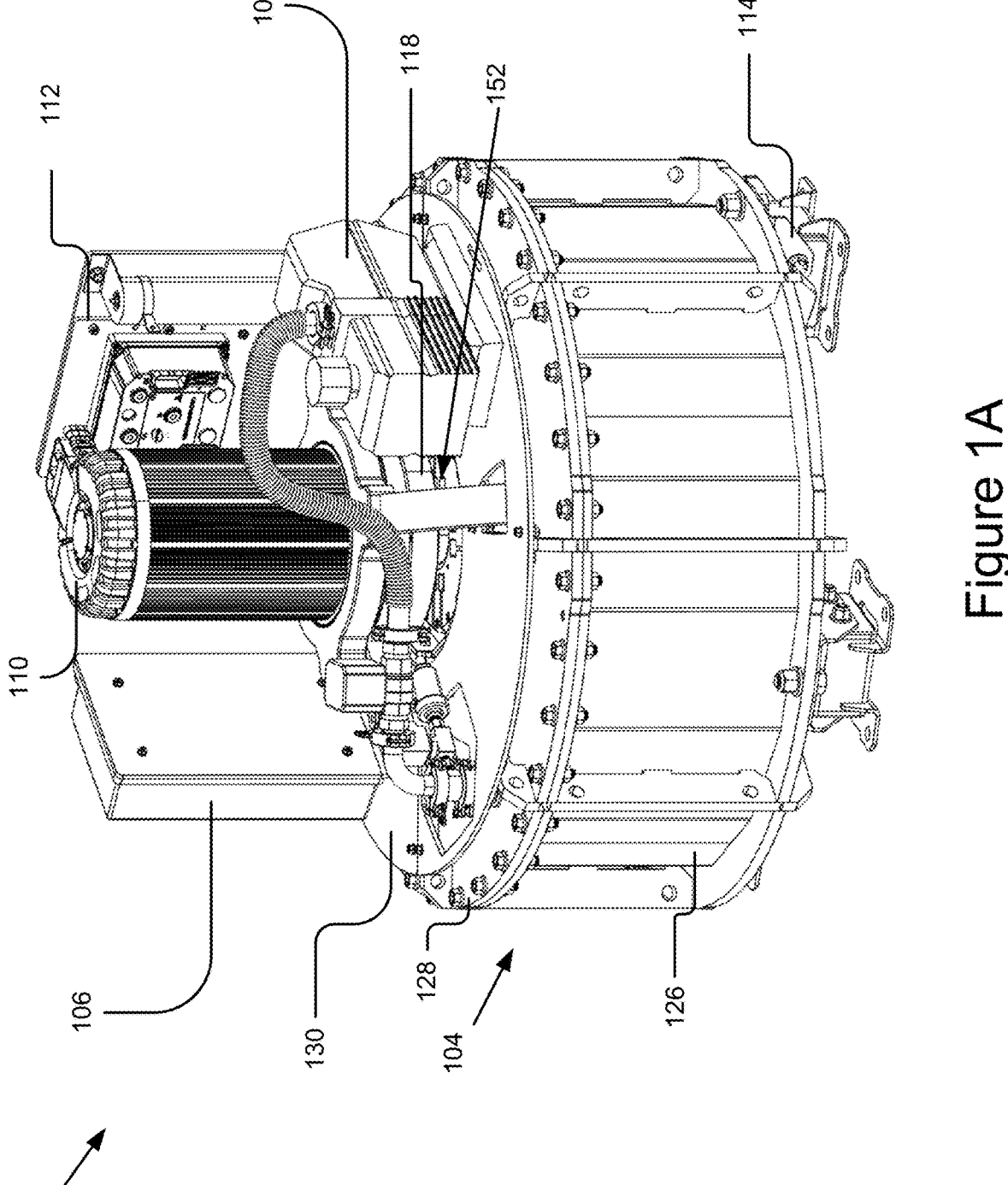
FIG. 1A illustrates an example mechanical-energy storage unit or flywheel assembly.

This description includes several improvements over previous solutions, such as those described in reference to the Background. A mechanical-energy storage unit is described herein along with its assembly and an assembly fixture. Some aspects of the technology include components that reduce vertical force by a massive flywheel on bearings, such as an improved magnetic lift system. Other aspects include bearings, magnetic couplings, clamping plates, and/or other systems that may further improve the mechanical energy storage unit.

In some implementations, one or two mechanical-energy storage units 102 may be installed at a residence to provide backup power in case of a power outage, to store electricity generated using residential solar panels, or to offset unevenness of power production and usage (e.g., an electrical utility may control the mechanical-energy storage unit 102 at a residence to address the balance energy use/production at the residence, nearby residences, or across the power grid). A mechanical-energy storage unit 102 may be buried next to an electrical panel or placed in a shed outside a residence, placed in a garage or utility room, or stored offsite.

In some implementations, multiple mechanical-energy storage units 102 may be coupled together to scale energy backup at a larger facility, such as a business, or by an electrical utility. For instance, many mechanical-energy storage units 102 may be placed at a facility, buried, or otherwise used by an electrical utility. The multiple mechanical-energy storage units 102 may be communicatively linked to each other or to a central server to control storage and distribution of the stored energy (e.g., by controlling the rotational frequency of a flywheel 402 to keep various flywheels 402 at efficient speeds).

Various implementations and features of flywheel energy storage systems (FESS) are described herein. These provide improvements over previous energy storage units including other flywheels 402. For instance, the technology described herein provides an improved flywheel system or assembly, improved bearings, improved flywheel-motor couplings, improved flywheel housing, improved flywheel plates, improved assembly fixture, and method for assembly and use, among other improvements, features, and benefits.

For example, a flywheel 402 may include a rotatable mass component, which may comprise a plurality of stacking plates 122, cylinders, or other components, one or more bolt or clamping plates 120, one or more axle 408 members, and other features. For instance, the technologies described herein include a plurality of plates that may have contoured edges based on an associated support structure, which allows increased speeds while reducing failure modes. For instance, the support structure may include clamping plates 120 that apply pressure to stacking plates 122, thereby inducing friction between the plates to keep them in place and transfer rotational momentum between the plates and one or more axles 408. In some implementations, two clamping plates 120 may be clamped together by bolts or other fasteners, which thereby cause the clamping plates 120 to apply pressure on massive plates (e.g., in an axial direction), which may be referred to herein as stacking plates 122, and increase the friction among the stacking plates 122, which may, in some cases, allow the stacking plates 122 to be used without other fasteners, thereby improving safety and efficiency. Other features and benefits of the flywheel 402 are described below. Not only are the plates improved, but their support structure is improved, among other benefits. Further implementations and features allow the expansion, positioning, and use of the flywheel 402 thereby further improving its performance.

Among other improvements, the technologies described herein also include an improved support structure, such as an enclosure 104, and support system, which may include, among other things, a sealed enclosure 104, a lid-mounted vacuum assembly 108, a magnetic coupling 118, various bearings, and positioning mechanisms. The enclosure 104 may include a magnetic lift assist mechanism 152 that either entirely supports or partially supports the weight of the flywheel 402 (e.g., to reduce wear on bearings). The enclosure 104 may also include a transport surface and a lifting and adjustment mechanism that moves the position of the flywheel 402 internal to the enclosure 104 from a transport or storage position and adjusts it in an active position. The enclosure 104 may provide support for various components, such as a supercapacitor 106, vacuum assembly, processor/controller/central processing unit, a motor 110, and other components. The enclosure 104 may include various features for maintaining a vacuum, holding one or more bearings, positioning a flywheel 402 during use or transport, mitigating damage due to structural failures, and isolating vibration, among other features.

Other benefits and features are described throughout this disclosure, but it should be noted that other features and benefits are contemplated. Furthermore, while various implementations are described in reference to the figures, these are provided by way of example and their features may be expanded, modified, or removed. For instance, features described in reference to some implementations may additionally or be used with other implementations.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components. Further, it should be noted that while various example features and implementations are described throughout this disclosure and the figures, these examples are not exhaustive of every contemplated implementation, feature or permutation. For instance, while a certain feature may be described in reference to a first implementation, the feature may be used with a second implementation or the features, operations, etc., may otherwise be exchanged between the implementations.

The innovative technology disclosed in this document also provides novel advantages including the ability to integrate modern technology with conventional power infrastructure; enable rapid transition to renewable energy sources; use the power grid as a backup; store power locally in nodes and regionalized storage clusters of nodes; isolate and minimize the impact of power outages; whether caused by natural disasters, infrastructure failure, or other factors; provide affordable alternatives to expensive and environmentally unfriendly electrochemical batteries; provide consumers the option to be independent from carbon-based power sources; and decentralize electric power production.

Figure 1B:
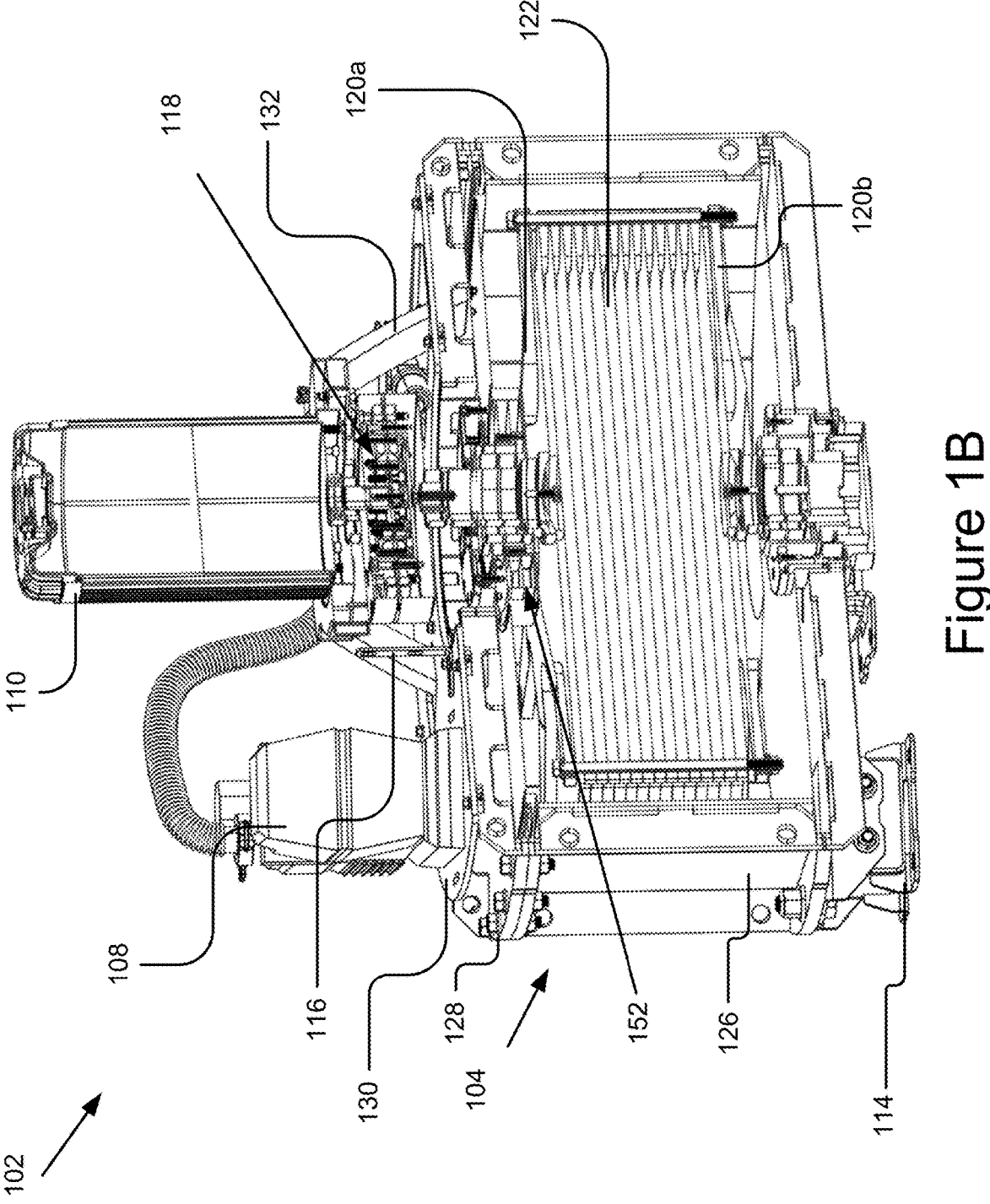
FIG. 1B illustrates an example cross section view of a flywheel assembly.
Figure 1C:
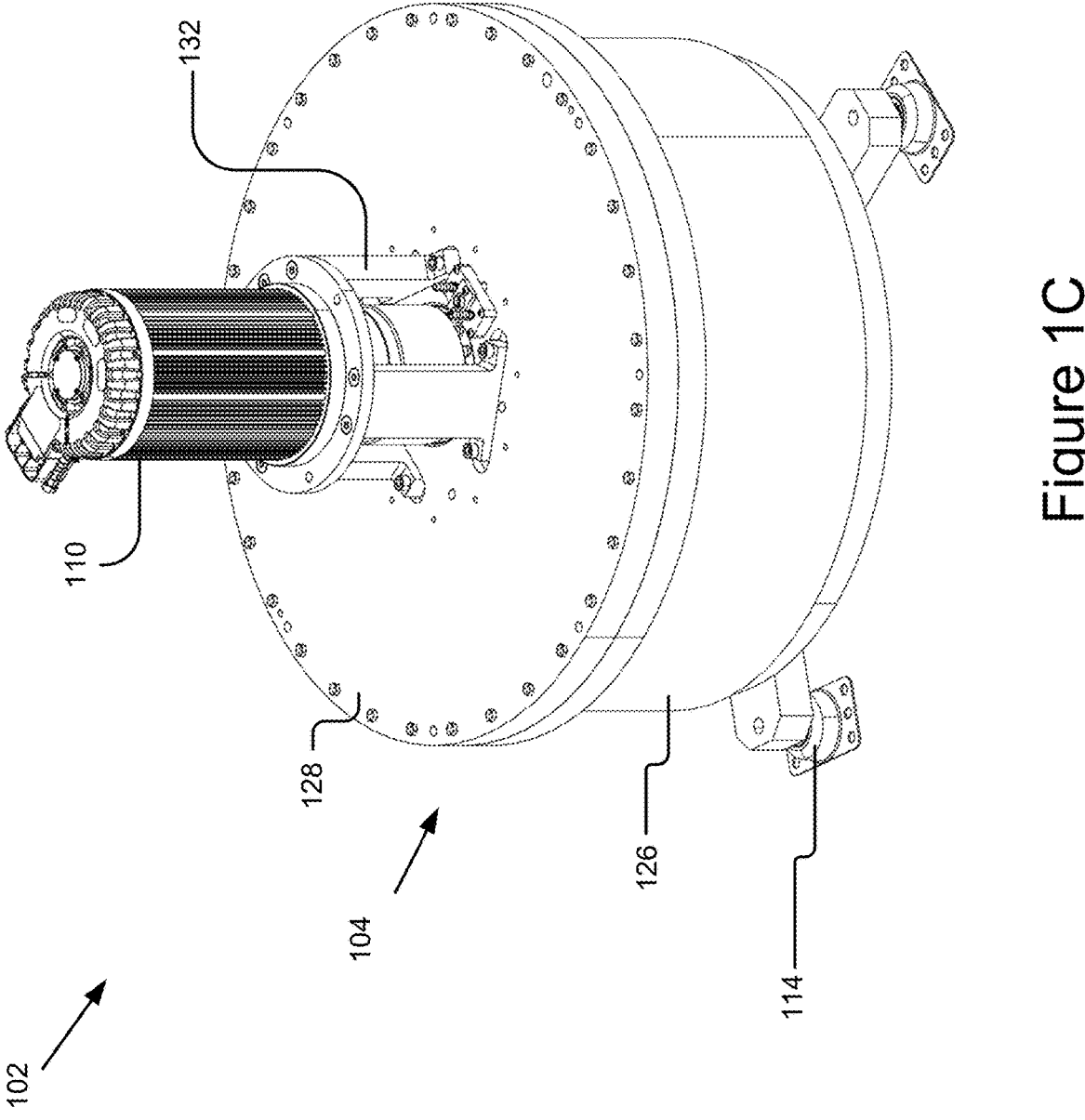
FIG. 1C illustrates an example flywheel assembly.
Figure 1D:
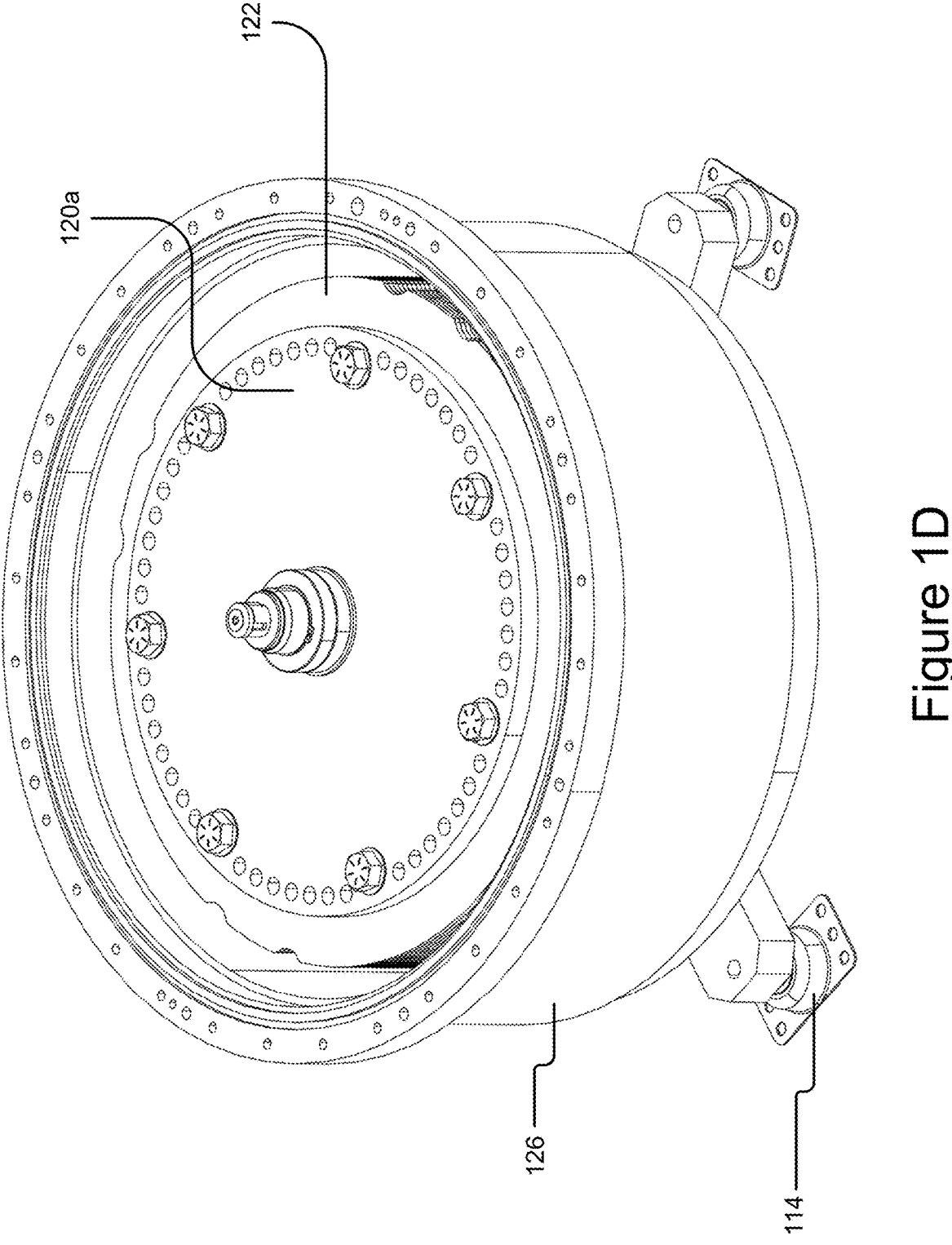
FIG. 1D illustrates the example flywheel assembly with a lid and other components omitted to show an example flywheel inside an enclosure.

FIGS. 1A-1D illustrate an example mechanical-energy storage unit 102 (MESU 102) or flywheel assembly 102 from various angles and views. For example, FIG. 1A illustrates a front-top view, FIG. 1B illustrates a cross section view, FIG. 1C illustrates a front-top view of another example MESU 102 or flywheel assembly 102, and FIG. 1D illustrates a front-top view with an enclosure lid 128 removed to show a flywheel 402 inside a flywheel enclosure 104 of an example MESU 102 assembly.

The improved flywheel assembly 102 may be a mechanical-energy storage unit 102 with configurations and features that improve manufacturability while also providing redundancy, safety, and reliability that allow the flywheel assembly 102 to provide years of safe and relatively maintenance free operation in ways that were not previously possible, for example, as may be noted in the Background and elsewhere herein. Although various configurations are possible and contemplated, the illustrated example flywheel assembly 102 may include a vacuum enclosure 104 and support structure, a massive rotating flywheel 402 (not visible in FIG. 1A) internal to the enclosure 104, a motor-generator 110 that may be fully or partially external to the enclosure 104 and coupled with the flywheel 402, a supercapacitor 106, driver(s) and/or CPUs, inverter(s), circuit breakers, magnetic lift member(s) 152 (also referred to as magnetic lift components or mechanisms herein), bearings, physical or magnetic couplings 118, a vacuum pump 108, and various other components, as described below, although other implementations are possible and contemplated herein.

The enclosure 104 is an example of a support structure that supports various components of a flywheel assembly 102. While example enclosures 104 are shown completely enclosed, in some implementations, an enclosure or other support structure may be open, such as a cage, frame, or other configuration.

The example flywheel assembly 102 may include, among other things, an enclosure 104 that is scalable to provide a vacuum, support to the flywheel 402 (not visible in FIG. 1A), a mounting structure for various components of the assembly, and protection against mechanical failure, among other things. The example enclosure 104 for the flywheel 402 may be configured as a vacuum assembly case with reinforcement including features for coupling the flywheel 402 with the case, an improved shape, and an ability to adjust the flywheel 402 through the case. In some instances, a connection for creating and/or maintaining a vacuum may also be included with the case. Example implementations and features of the enclosure 104 may be described elsewhere herein, although other implementations are possible and contemplated.

The flywheel enclosure 104 may be mounted and/or isolated from a mounting structure by one or more feet 114 or legs, as noted below, and may include mounting structures for accommodating various components of the assembly. For example, a supercapacitor 106 may be mounted to a support structure of or attached to the enclosure 104, which supercapacitor 106 may buffer energy entering/exiting the flywheel 402, for instance, by assisting the motor 110 to spin the flywheel 402 up or receive energy therefrom.

Also, as described below, the enclosure 104 may provide mounting points or structures (e.g., a mounting brace 132)

for mounting a motor-generator 110 in line with the axis of rotation of the flywheel 402, although, in other implementations, gears may be used to couple the motor-generator 110 with the flywheel 402. The motor-generator 110 may be coupled with the flywheel 402 via one or more axle 408 components and, in some instances, a magnetic coupling 118 that allows a flywheel axle(s) 408 to remain physically decoupled from a motor-generator 110 rotor while still providing force to pass between them, although a physical coupling may also or alternatively be used, as described below. The motor-generator 110 may have an electrical connection to a supercapacitor 106, inverter, driver, CPU, external grid connection or otherwise, which allows electrical current to flow into the motor-generator 110 to spin up the flywheel 402 or out of the motor-generator 110 to receive stored potential energy from the flywheel 402.

The motor-generator 110 may have various configurations, as noted in further detail elsewhere herein. In some implementations, the motor-generator 110 may be an electrical-vehicle motor or other motor (e.g., a Hyper 9™ motor), such as a brushless alternating current motor (e.g., a 3 phase AC synchronous reluctance internal permanent magnet motor) that can free-wheel in order to allow the flywheel 402 to store power for a longer period of time. The motor size and configuration may vary depending on peak output/input and flywheel 402 size/speed requirements. For instance, a smaller, residential MESU 102 may include a smaller size flywheel 402 with a 30-40 KW motor while a larger, commercial (e.g., for a store, electrical utility, subdivision, etc.) may have a 300-500 kW motor, although other implementations are possible. The motor controller and/or CPU may be the same for various sizes of flywheels 402 or may vary depending on the implementation.

The motor-generator 110 may be coupled with the flywheel 402 using an axle 408 and bearing of the flywheel 402/flywheel enclosure 104. Similarly, in some implementations, the flywheel axle 408 and motor-generator 110 may be coupled using a flywheel motor coupling, which may include a direct connection, magnetic coupling 118, friction clutch, torque converter, gearbox, or otherwise, as described in further detail below.

An example flywheel 402 (not visible in FIG. 1A) may be housed in and/or supported by the enclosure 104 and components thereof. Example flywheels 402 and features thereof are described throughout this disclosure. For example, a flywheel 402 may include a plurality of stacking plates 122 held together by a support structure, such as clamping plates 120 (e.g., using compression and friction). The support structure may include one or more axles 408 that attach thereto and provide support to the flywheel 402. As described in further detail elsewhere herein, the configuration of the support structure and axles 408 may allow flywheel plates to be used without the axle 408 perforating the plates. Depending on the implementation, the axle(s) 408 may be vertically and/or horizontally supported by other components or the flywheel enclosure 104 and may couple with a motor-generator 110 (e.g., as noted above).

For example, an axle 408 may interact with one or more bearings, whether magnetic, metal, ceramic, hybrid ceramic, etc., of the enclosure 104, to allow the flywheel 402 to spin about an axis formed by the axle 408. The enclosure 104 may include or couple with one or more bearings that support the flywheel 402 horizontally to keep it spinning with little-to-no vibration, as described below. In some cases, the bearings may be ceramic to avoid interaction with a magnetic field of a magnetic lift member 152 or other magnetic component.

The axle(s) 408 may interact with the bearing(s) to provide vertical or horizontal support to the flywheel 402, for example, by keeping the axles at a defined location and balanced at a defined axis of rotation.

For instance, a bottom bearing may interact with the bottom of the flywheel 402 and/or a top bearing may interact with the top of the flywheel 402, for example, inside the enclosure 104. In some implementations, a magnetic levitation device or magnetic lift assistance member 152 may be used to reduce the friction or pressure, for example, on one or more of the bearings. For instance, a magnetic levitation device may be disposed at a bottom of the flywheel 402 to apply upward force thereon thereby limiting the force due to gravity on a bottom bearing and/or balancing force between a top and bottom bearing. In some implementations, a magnetic lift assistance member (also referred to as magnetic lift member) 152 may be positioned at a top of the flywheel 402/enclosure 104 to pull the enclosure 104 upward, thereby decreasing the force due to gravity on a bottom bearing(s). As noted in further detail elsewhere herein, the magnetic lift assistance member 152 may lift less then, exactly, or greater than the weight of the flywheel 402 so that there is some, little, or no weight on the bottom and/or top bearing(s).

The amount of weight held by magnets of the magnetic lift assistance member 152 may be adjusted based on a distance from the magnets, as described elsewhere herein. For instance, the flywheel may be manually adjusted by an installer or, in some implementations, the enclosure 104 may include or may be coupled with one or more flywheel positioning components that may adjust the position of the flywheel 402, for example, to ensure that a correct distance between the flywheel 402 and magnetic lift assist mechanism 152, top bearing, bottom bearing, or other component of the assembly 102. For instance, a flywheel positioning component may move the flywheel 402 (e.g., inside the enclosure 104) from a shipping position to an engaged position where it is in a correct position relative to the bearing(s) to minimize bearing wear and friction.

It should be noted that although the enclosure 104 is illustrated as fully enclosed, including reinforcements, welds, seals/O-rings, etc., that allow a vacuum to be maintained inside the enclosure 104 with the flywheel 402; however, it should be noted that other implementations are possible and contemplated herein, such as where the enclosure 104 is fully or partially open.

In some implementations, the flywheel assembly 102 may include various components mounted to the enclosure 104 (e.g., via a lid 128 assembly mounting plate or bracket) that support the operation of the flywheel 402. For instance, the flywheel assembly 102 may include a supercapacitor 106, motor-generator 110 (and associated mounting hardware), driver and CPU/controller 112, vacuum pump 108, various inverters, wiring harnesses, circuit breakers, and other equipment, although other implementations are possible and contemplated herein.

As illustrated in the examples of FIGS. 1A-1D, a flywheel enclosure 104 may be round with a flat bottom and top and various reinforcing ridges, which configuration may provide strength to the enclosure 104 to prevent buckling due to an internal vacuum while also preventing external damage in case of a mechanical failure of the flywheel 402. It should be noted that the enclosure 104 may be square, hexagonal, etc. It may have rounded (e.g., as illustrated in FIG. 1D) or flat sides (e.g., as illustrated in FIG. 1A). As illustrated in FIG. 1A, a mounting plate may be positioned on top of the enclosure 104 components mounted thereto, as described in further detail below.

In some implementations, as illustrated in the examples, the flywheel assembly 102 may include one or more (e.g., 3 and 4 arms are illustrated) motor mount braces 132 that couple with a lid 128 of the flywheel enclosure 104 and extend upward to support a motor mount, which may comprise a ring that holds the motor-generator 110 in alignment with an axis of rotation of the flywheel 402. In some instances, the motor mount braces 132 may include linear actuators that lift the motor-generator 110 vertically in order to decouple the motor-flywheel 402 coupling, such as the magnetic coupling 118 described in further detail below. The flywheel assembly 102 may include a component mounting plate or lid assembly mounting plate(s) 130 that couple with top ribs or other structures of the enclosure 104 and provide mounting points for the various accessory components of the flywheel assembly 102. In some instances, the lid 128 or lid assembly mounting plate(s) 130 may have various perforations that allow the motor mount braces 132, axles 408, motor-flywheel 402 coupling, vacuum pump 108 connection and other components to pass therethrough. Accordingly, the components may be securely mounted to mounting plate 130, lid 128, enclosure 104, or otherwise (e.g., as illustrated in the example figure) in order to speed assembly and improve stability.

As shown in the example of FIG. 1A, the enclosure 104 may have a plurality of reinforcing structures, such as ribs, rings, etc.

The enclosure 104 may also include one or more feet 114 or other supports that provide support to the ribs (e.g., the side or bottom ribs) or other structures (e.g., a bottom plate) of the enclosure 104 to secure the flywheel assembly 102, support the weight of the flywheel 402, and/or isolate the flywheel 402's movement/vibration; although, it should be noted that vibration is ideally limited by balancing the flywheel 402 and acceleration, temperature, or other sensors may be located in the bearings, axles 408, enclosure 104, or other components.

FIG. 1B illustrates an example cross section view of a flywheel assembly 102. For instance, as shown in the figure, a flywheel 402 having a number of stacking plates 122 and a top and bottom axle 408*b* is located inside an enclosure 104. The bottom axle 408*b* of the flywheel 402 is shown interacting with bottom bearings that support the flywheel 402 horizontally and/or vertically. The top axle 408*a* of the flywheel 402 is shown passing through a magnetic lift member 152 and into a magnetic coupling 118, which couples the axle 408 with a stator (directly or via other components, axles 408, drive shafts, gears, etc.) with the motor-generator 110, which is held vertically above the axle 408 using the motor braces 132. Additionally, as noted elsewhere herein, various sensors may be located throughout the assembly, such as the RPM sensor mount 116 that is located adjacent to the magnetic coupling 118, as well as various temperature, acceleration, etc., sensors that may be positioned adjacent to the motor 110, bearings, and other components of the assembly. These and other implementations and features are described in further detail below.

FIG. 1C illustrates another example MESU 102 or flywheel assembly 102 with a different implementation of the enclosure 104. As illustrated, an enclosure 104 may be a cylindrical enclosure with an enclosure base, such as a tub 126 and a lid 128. The enclosure 104 may also include one or more feet 114 (e.g., three are illustrated in FIG. 1C) or legs support the flywheel assembly 102. A foot 114 may include a bushing or other component that isolates vibrations, bolt holes to bolt the flywheel assembly 102 to a floor or other location.

In the depicted example, the motor-generator 110 may be mounted higher on motor mount braces 132 and/or base than the example of FIG. 1A, for example, to allow access to mount or remove the motor-generator 110, magnetic coupling 118, bearings, or other components. Additionally, while the other components illustrated in FIG. 1A are not shown in FIG. 1C, they may also be mounted to the lid 128 or another location of the flywheel assembly 102. For instance, a vacuum pump 108, supercapacitor 106, chemical battery, driver, CPU, etc., may be mounted to the lid 128, tub 126, other portion of the flywheel assembly 102, or otherwise.

FIG. 1D illustrates the example flywheel assembly 102 of FIG. 1C with the lid 128 and other components omitted to show an example massive flywheel 402 inside the enclosure 104. As shown, the flywheel 402 may be positioned at a center of the enclosure 104, although other implementations are possible. As illustrated in the example of FIG. 1D, a flywheel 402 may include one or more clamping plates 120 (the top clamping plate 120a is shown), one or more stacking plates 122, one or more bolts holding the clamping plates 120 together and/or to the stacking plates 122, and one or more axles 408. These and other features and implementations are described in further detail elsewhere herein.

Figure 2A:
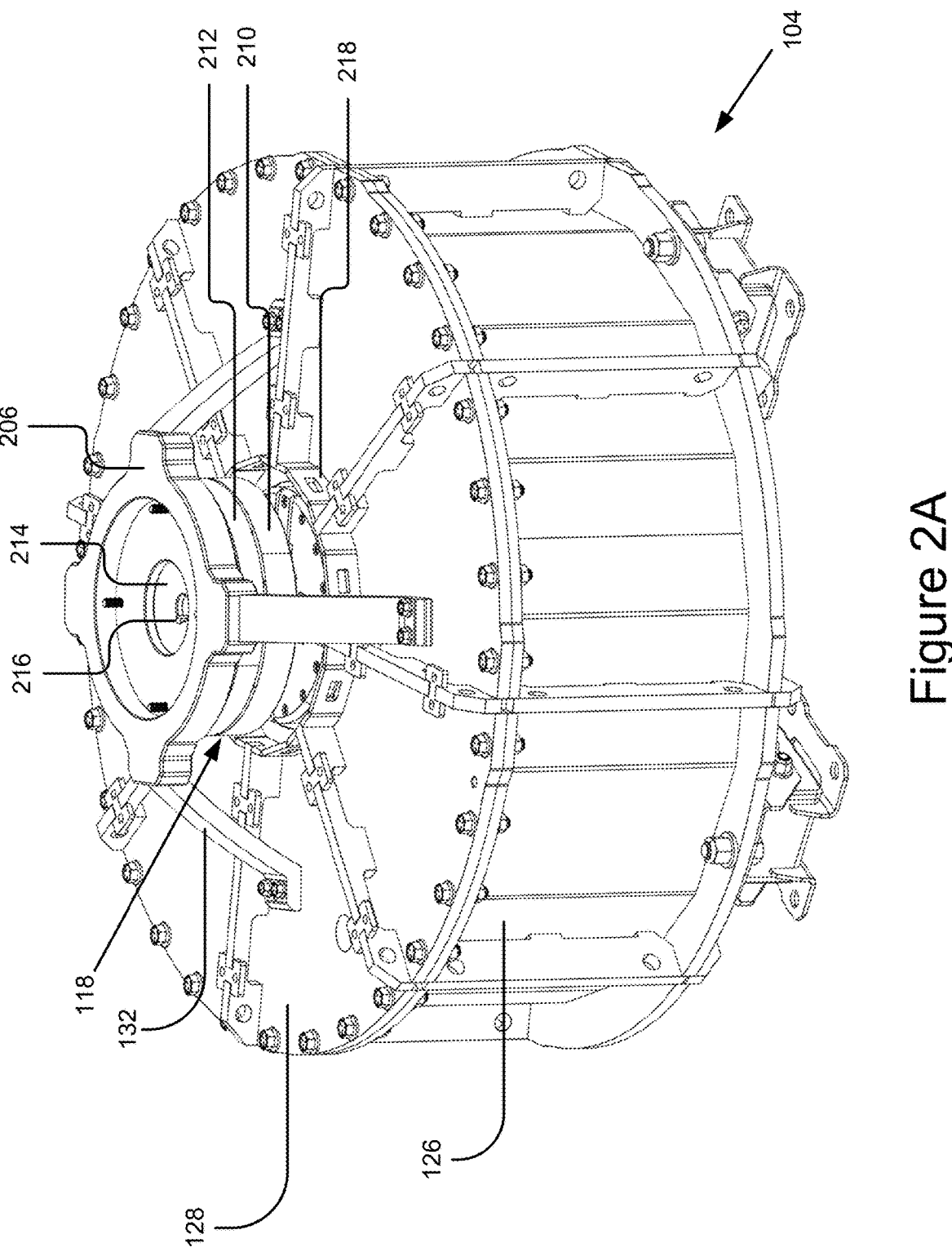
FIG. 2A illustrates an example flywheel enclosure with a motor mount, magnetic coupling, and other features coupled therewith.

FIGS. 2A-2F illustrate an example flywheel enclosure 104 and various components, views, and constructions thereof. FIG. 2A illustrates an example flywheel enclosure 104 with a motor mount, magnetic coupling 118, and other features coupled therewith. For instance, various components, such as the motor-generator 110, CPU, vacuum 108, and mounting plates 130 are removed to expose the underlying structure. As illustrated in the example, four motor mount braces 132 are coupled to a top plate (e.g., part of a lid 128) of an enclosure 104 and extend upward to provide rigid support to a motor mount base 206. The motor mount base 206 may be round or any other shape to accommodate various components, such as the motor-generator 110, magnetic coupling 118, bearing(s), axle(s) 408, etc. For instance, the motor mount base 206 may be rounded at a top to receive and mount (e.g., using fasteners, such as bolts) the motor-generator 110, have a perforation through which a flywheel axle 408 and/or motor axle, etc., may pass, and or may allow various other components to be coupled or mounted thereto. For instance, a magnetic coupling 118 may be mounted to or integrated with the motor mount base 206, so that it can easily be attached to the enclosure 104.

As depicted in the example, the motor mount braces 132 and base 206 may be configured to be lifted above, accommodate, and/or hold other components. For instance, a motor coupling, such as the illustrated example magnetic coupling 118 may be coupled to a bottom side of the motor mount base 206 to interact with both a top axle 408a and a motor-generator 110. Similarly, this positioning may allow top bearing(s) to be installed or maintained under the braces/base. Similarly, as noted elsewhere herein, reinforcing components or structures of the flywheel assembly 102 may support the motor 110, prevent undesired twisting of components, and hold a bearing and/or magnetic lift member 152.

FIG. 2A also illustrates various assembled structures of the flywheel enclosure 104, which may include a lid 128 and a tub 126. The lid 128, as described in further detail below, may include a top plate, top rib(s), motor mount brace(s) 132, mounting plates, and various other structures. For instance, a top ring 218 may include a ring of material (e.g., a steel ring or set of bends in steel plates) may be disposed surrounding an axle 408a/axis of rotation to provide torsional rigidity to the enclosure 104 and/or to top ribs, which may radiate outward from the top ring 218 and provide strength to the lid 128, which may support motor mount brace(s) 132, mounting plate(s), a vacuum 108, etc., and may prevent the top plate from buckling when force is placed thereon. The top ring 218, top rib(s), top plate, and/or other structures may work together to support air pressure due to an internal vacuum and/or the weight of the flywheel 402. For instance, a magnetic lift mechanism 152 may be coupled to the lid 128 (e.g., at a center near the axle 408a) to lift some or all of the weight of the flywheel, so the strength of the lid 128 is particularly beneficial. Depending on the implementation, the lid 128 may be constructed of one quarter to one half inch steel plate, or a thicker construction (e.g., as in the example of FIG. 1C), which may be flat, welded together, and/or have various bends to further increase rigidity. For instance, the top ring 218 and top ribs may include one or more longitudinal bends to increase their strength and the ability to mount components thereto.

The enclosure tub 126, as described in further detail below, may include one or more side walls that encircle the flywheel 402, which may be a continuous ring of material or bent metal (e.g., steel) or other plates that are welded together. The side walls may provide vertical strength to the enclosure 104 while also mitigating mechanical failure of the flywheel 402. Side ribs (e.g., steel plates welded to the side walls, such as the top ribs) may also be attached around the side wall, as illustrated, to provide further strength and avoid buckling inward or outward. The side ribs and/or side walls may be coupled (e.g., welded, glued, bolted, etc.) with a wall ring to which a lid 128 may be bolted, as described below, and with a bottom plate (which may have structures, such as bottom ribs, as described below).

For instance, a magnetic coupling 118 is shown in the example of FIG. 2A. The magnetic coupling 118 may couple the flywheel axle 408 (e.g., 408a) with an axle or rotor of the motor-generator 110. The magnetic coupling 118 may be supported by a motor mount base 206, top ring 218, or other components of the flywheel assembly 102 to hold it above an axle 408. The magnetic coupling 118 may include an external rotor bottom 210 and external rotor top 212, which may house an internal arrangement of magnets and/or bearings, etc., as described in further detail below. The magnetic coupling 118 may include an internal rotor top 214 with a rounded machine key 216 that interacts with a corresponding slot in an axle and/or rotor of the motor-generator 110 to improve the strength of the mechanical connection between these components. A similar structure may additionally or alternatively be used with an axle 408a. The magnetic coupling 118 is described in further detail below.

Figure 2B:
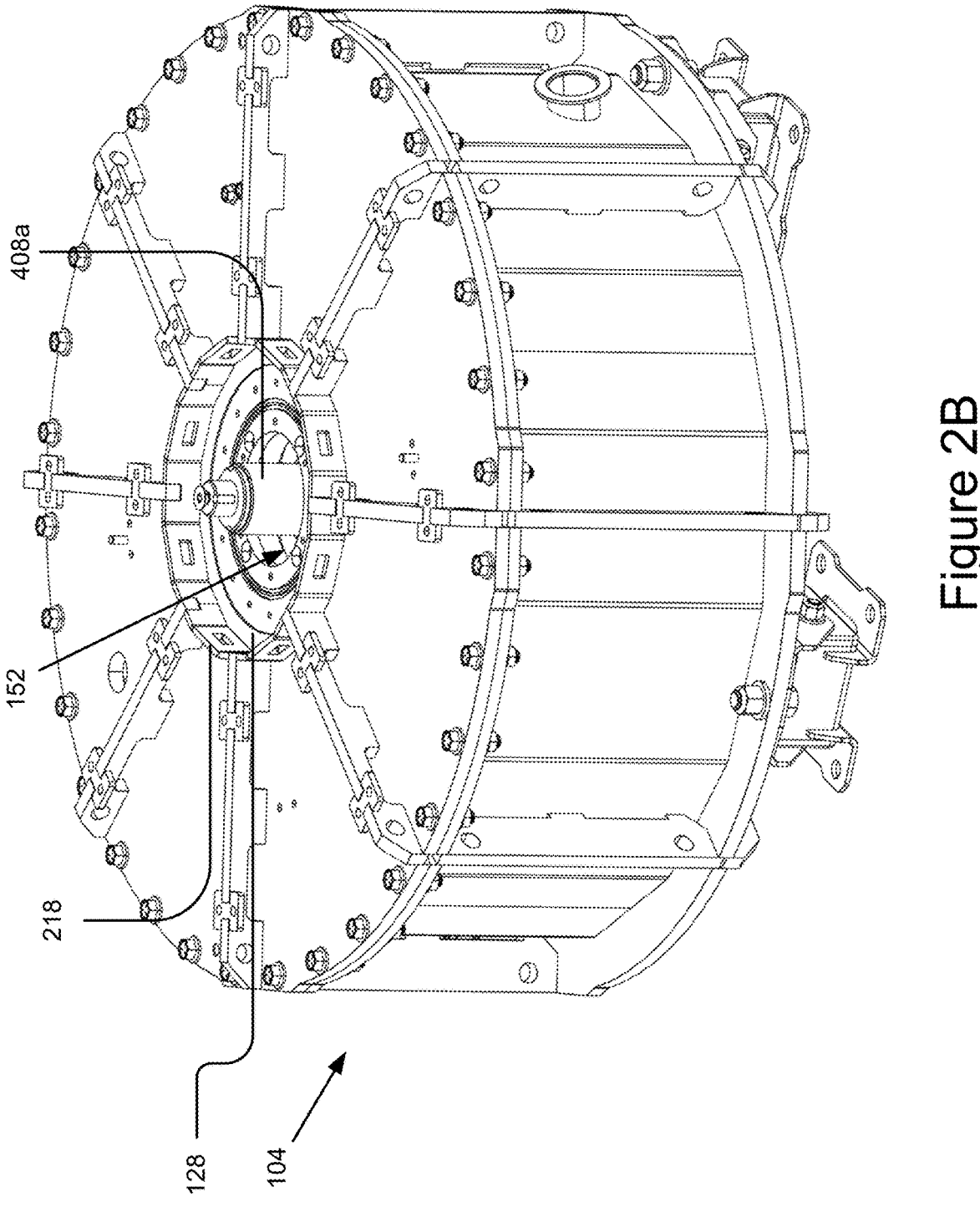
FIG. 2B illustrates an example flywheel enclosure with an upper bearing and O-ring housing or other components removed.

FIG. 2B illustrates an example flywheel enclosure 104 with an upper bearing and O-ring housing or other components removed. As illustrated, a top component of the magnetic lift member 152 may surround the top axle 408a of the flywheel 402 to interact with the top clamping plate 120a (not visible in FIG. 2B) or another component of the flywheel 402. A magnetic lift member 152 may include a ring of magnets coupled (e.g., welded, bolted, etc.) to the top plate of the lid 128, top reinforcement ring 408, and/or other components of the enclosure 104 or flywheel assembly 102. For example, the magnetic lift member 152 may be coupled with a bottom side of the top plate of the lid 128 to be in close proximity to the top clamping plate 120a of the flywheel 402, as described elsewhere herein.

As illustrated in the example of FIG. 2B, the lid 128 may include a flat plate with various ribs, rings, or other reinforcing or mounting structures coupled (e.g., integrated with, welded to, bolted to, etc.) thereto. As illustrated in the example of FIG. 2B, the top plate of the lid 128 may include a perforation at a center or axis of rotation, for example through which a top axle 408a, portion of a top axle 408a, or other components (e.g., bearings, seals, magnetic couplings 118, motors 110, etc.) may extend or be mounted. A magnetic lift member 152 may be in, below, or adjacent to the perforation.

Figure 2C:
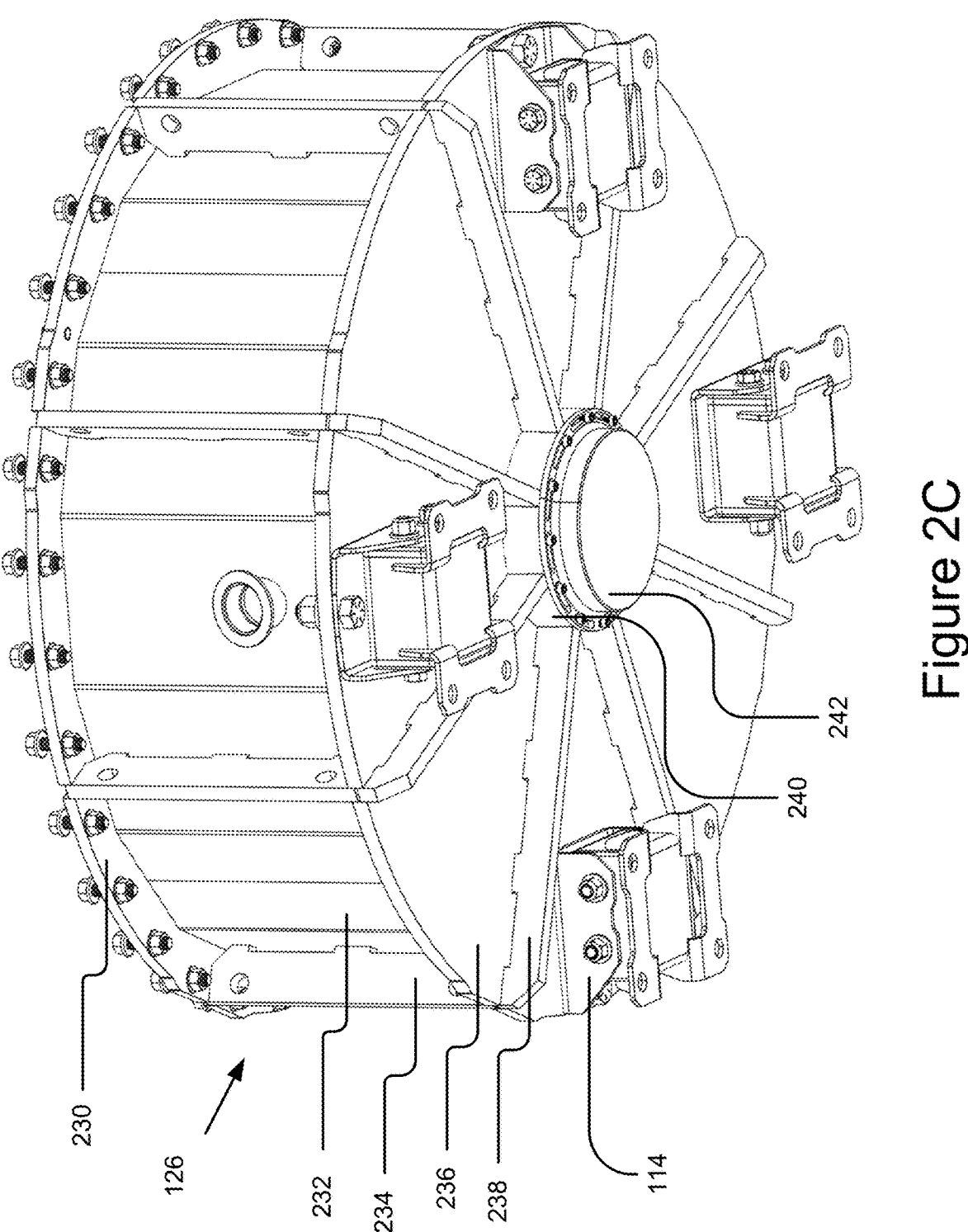
FIG. 2C illustrates a bottom-up view of an example enclosure tub.

FIG. 2C illustrates an example enclosure tub 126 shown from the bottom. As illustrated, a lid 128 has been omitted while the bolts for the lid 128 are shown in place in a top ring 230. As described in further detail above, the enclosure tub 126 may include side wall(s) 232, side rib(s) 234, a bottom plate 236, bottom rib(s) 238, feet 114, and other components. For instance, a bottom reinforcement ring 240 may be located at a center of the bottom plate 236 and bottom ribs 238 may radiate outward therefrom in order to provide strength and rigidity. The ribs and other structure illustrated, as noted with the top 128, may provide support to the flywheel 402, for example, via bearings, magnetic lift, and/or axle(s) 408.

Four example feet 114 are illustrated coupled with the bottom plate 236 of the tub 126 in the example of FIG. 2C. The feet 114 may allow the flywheel assembly 102 to be bolted directly to an external structure and, in some instances, may allow some leveling of the enclosure. Example implementations of feet are 114 are described in further detail below.

FIG. 2C also illustrates a retaining cap 242 that may couple with the enclosure tub 126 (e.g., by bolting it to a bottom reinforcement ring 240 or other structure) to allow various components, such as a bottom/lower bearing assembly of the flywheel 402 to be accessed. The retaining cap 242 may also include seals/O-rings that seal the vacuum of the enclosure 104. As described in further detail below, the bottom or lower bearing assembly may include one or more horizontal and/or vertical bearings, a shipment support area or ring 262, a bearing height adjustment mechanism (e.g., the nut bearing holder 264 described below), and adjustment locking mechanism 606.

Figure 2D:
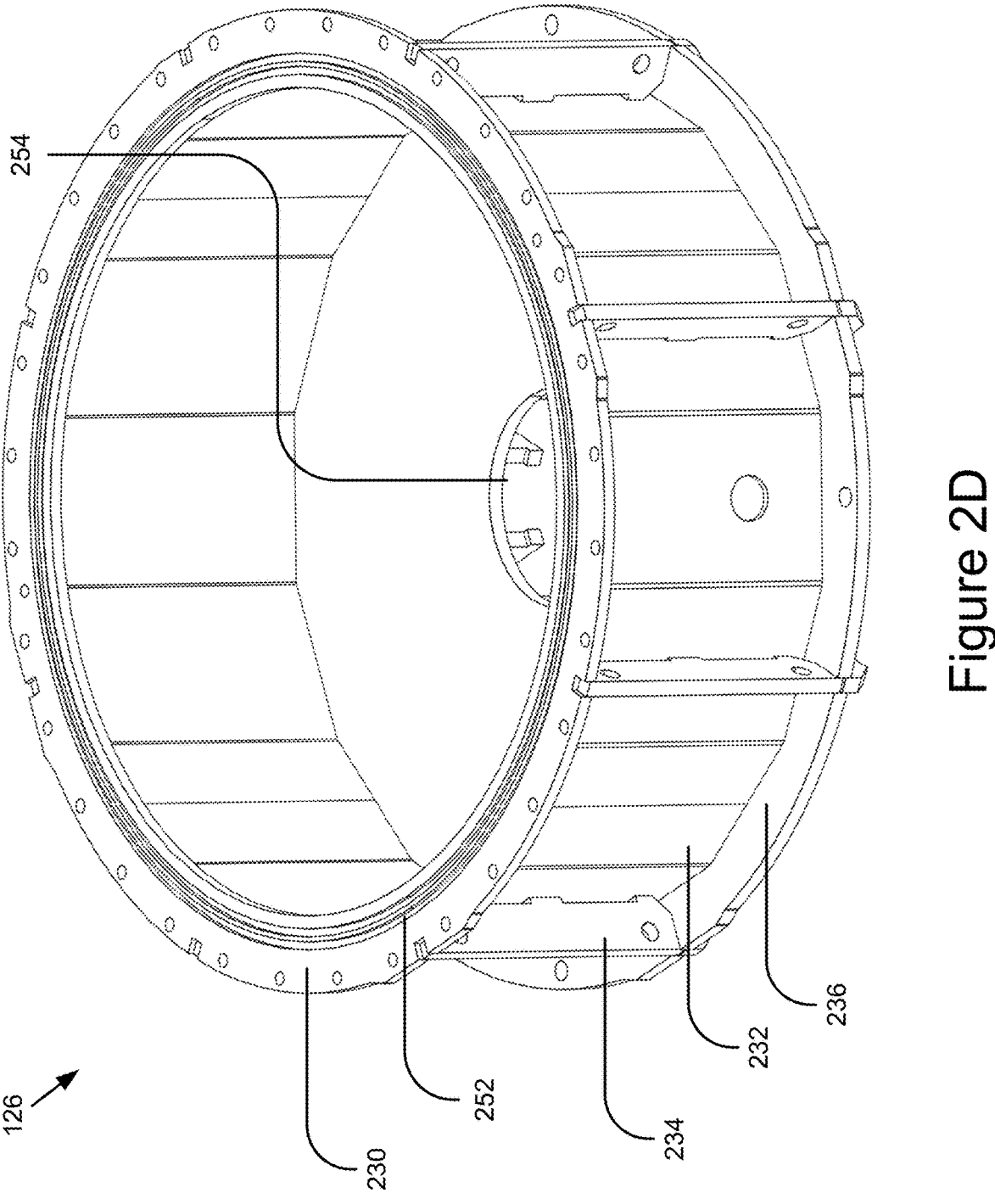
FIGS. 2D-2F illustrate views of example enclosure tubs.

For example, FIG. 2D illustrates an example enclosure tub 126. As illustrated, in the example implementations, various configurations and constructions are possible. For instance, the enclosure 104 and its components may be made of plate metal (e.g., steel, aluminum, etc.) that is attached together to form the enclosure 104. For instance, the plate metal may be coupled or bent at various angles or continuously to create side walls 232, a bottom plate 236, top lid 128 (not shown in FIG. 2D), etc., and ribs (e.g., 234) positioned at a normal angle to the plates may be attached thereto to provide increased strength. The walls, ribs, top/bottom plates, and other components may be attached together using various techniques, such as welds, glue, or fasteners. For instance, where metal plates are used, they may be welded together to not only provide strength against an internal vacuum but also mitigate against mechanical failures of the flywheel 402. For example, a bottom plate 236 may be welded to a side wall 232 (which may comprise one or multiple coupled segments), which may be welded to a top ring 230, as shown in FIG. 2D. Side 234 and bottom ribs 238 may be welded to the walls, plates, and/or reinforcing rings, as illustrated in the examples.

Other implementations of an enclosure tub 126 or other components are described and illustrated elsewhere herein.

In some implementations, the top ring 230 (and/or the lid 128) may include grooves 252 for accepting one or more seals or O-rings, so that top ring 230 may be sealed against the lid 128, although other implementations are possible. In some instances, multiple (e.g., two) seals/O-rings may be used to provide redundancy.

In some implementations, a side wall 232 may include one or more holes or perforations through which the internal cavity may be accessed, such as for adjustment, sensors, for receiving a vacuum hose or fitting, or for other purposes. These perforations may be sealed using gaskets, caps, or other components during operation of the flywheel 402.

As illustrated in FIG. 2D, in some implementations, the enclosure tub 126 may include a hole 254 or perforation at a bottom center at which the bottom/lower bearing assembly may be located. For instance, the hole 254 in the bottom of the tub 126 may allow the flywheel 402 to be adjusted, mounted, or otherwise, as described elsewhere herein. It should be noted that in other implementations, such as where a solid bottom of the enclosure 104 supports bearings and/or other components of the flywheel 402, are possible. Similarly, in some implementations, the flywheel 402 may be entirely supported by a lid 128 of the flywheel enclosure 104 and the bottom of the flywheel enclosure 104 may be solid.

Figure 2E:
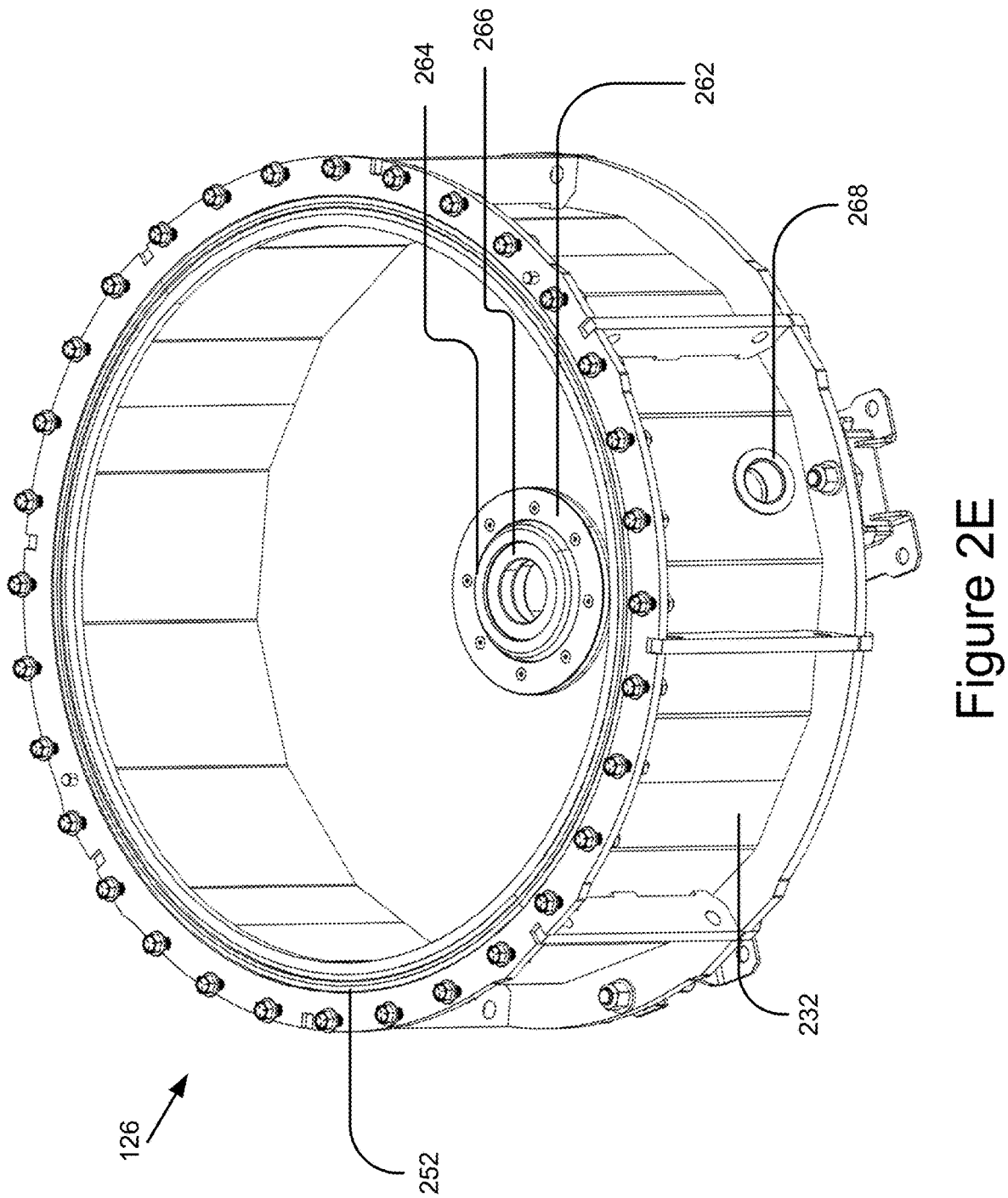

FIG. 2E illustrates an example enclosure tub 126 with a shipping ring 262, nut bearing holder 264, and bearing(s) 266, which may be mounted at the hole or perforation in the bottom of the enclosure 104. As described in further detail below, one or more bearings 266 that support the flywheel 402 (e.g., via a bottom/lower axle 408b of the flywheel 402) may be held by a nut bearing holder 264, which may be vertically adjustable to move the bearings up or down. Accordingly, by adjusting the bearing holder 264, the flywheel 402 can be moved up or down to move it between a storage position and adjust it in the enclosure 104 to provide an appropriate amount of force on the top and/or bottom bearings 266.

For example, a shipping ring 262 may be located at the bottom of the enclosure tub 126, so that a portion of the bottom axle 408b (not shown in FIG. 2E) and/or bottom clamping plate 120b (e.g., a flat bottom portion thereof, as illustrated in other figures herein) may rest thereon when in a shipping position. For instance, when a nut bearing holder 264 is adjusted into a shipping position (e.g., completely downwards), a bottom bearing 266 and/or top bearing may be fully disengaged (e.g., vertically) from the flywheel 402 to avoid damage to the bearings during shipping, for example, where the weight of the flywheel 402 is supported on the shipping ring 262. As described in further detail below, the bottom bearing 266/bearing holder 264 may be adjusted to move the flywheel 402 (e.g., vertically upward) to engage a top and/or bottom bearing. Additionally, or alternatively (e.g., where a top bearing has a variable position), the flywheel 402 position may be adjusted to vary a distance to a magnet of the magnetic lift member 152 using the nut bearing holder 264, for instance.

In some implementations, the nut bearing holder 264 may be un-adjustable, fixed, or omitted (e.g., replaced by another bearing holder). Additionally, or alternatively, a shipping ring 262 may be omitted or may be removable. For instance, a shipping ring 262 or other structure may be installed during assembly and then removed during installation, for example, as a flywheel 402 is manually adjusted by an installer.

FIG. 2E also illustrates an angled flange 268 in a side wall 232 of the enclosure 104, which may allow access to an internal cavity, such as by a sensor, vacuum assembly 108, or other components of the flywheel assembly 102.

Figure 2F:
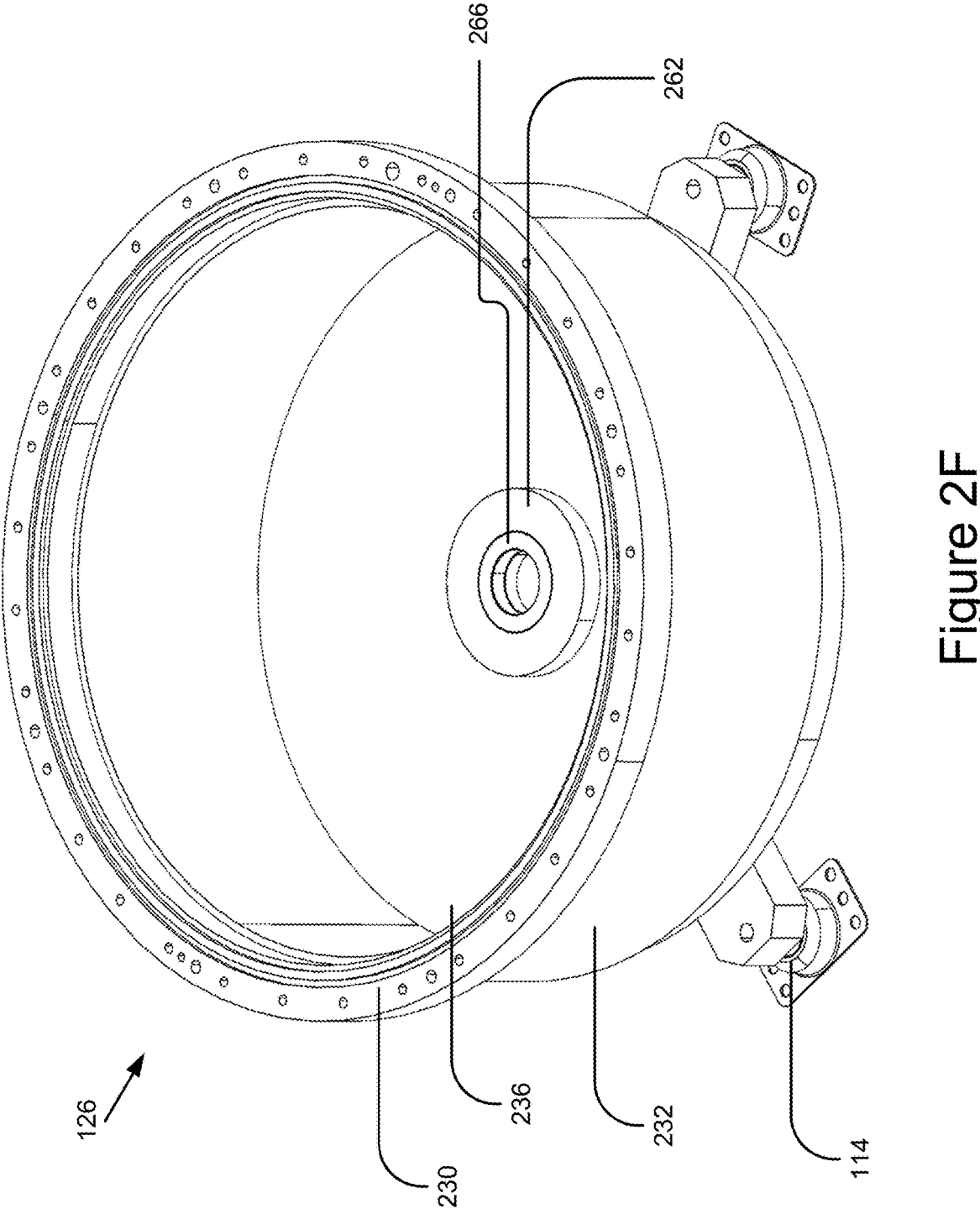

FIG. 2F illustrates an example enclosure tub 126 with a shipping ring 262 and bearing(s) 266, which may be mounted at the hole or perforation in the bottom of the enclosure 104. In the depicted example, a nut bearing holder 264 may be omitted or permanent, for example, where it is not adjustable, although other implementations or combinations are possible.

In the example of FIG. 2F, a side wall 232 may be a circular wall, for example, with or without ribs. For instance, a thicker side wall 232 may be continuous or a strip welded at the ends to form the side wall 232. The tub 126 may include a bottom plate 236 welded or integrated with the side wall 232.

Figure 3A:
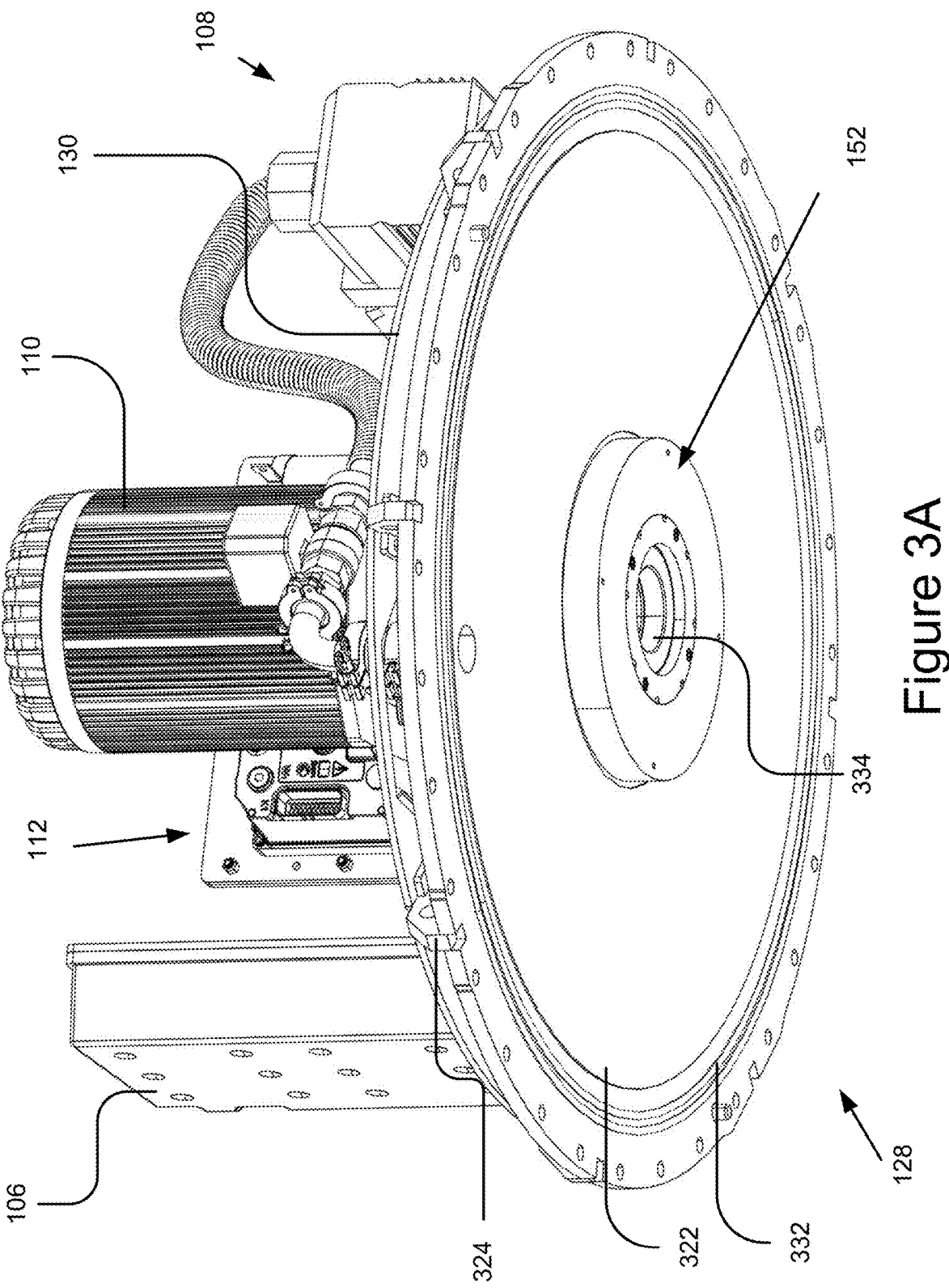
FIG. 3A illustrates an example enclosure lid with various components attached thereto.

FIG. 3A illustrates an example enclosure lid 128 with various components attached thereto. For instance, the enclosure lid 128 may be placed onto an enclosure tub 126 (not shown in FIG. 3A) to form an enclosure 104, which may be vacuum sealed, depending on the implementation. As illustrated in the example, a lid 128 may include a top plate 322 with reinforcing top ribs 324 that extend radially from an axle 408a (e.g., from a top reinforcing ring 218) to an outer edge of the plate 322. In some instances, the top ribs 324 may extend beyond the top plate 322 or into cuts in the top plate 322. For example, the top rib(s) 324 may extend partially (e.g., at an end) into slots formed in the top plate 322 to further enhance rigidity and case manufacturability.

Other configurations of a lid 128 are also possible, such as the example implementation of FIG. 1C. For example, a lid 128 may not have reinforcing ribs mounting plates (e.g., 130) or other components, such as where the top plate 322 is thick enough to support the flywheel 402, a magnetic lift component 152, or other component. In some instances, the top plate 322 may include a recess or other area to accommodate, receive, or couple with the magnetic lift member 152.

The lid 128 may also include O-rings, O-ring grooves/channels 332, or other seal locations around a periphery of the top plate 322, center perforation (e.g., in association with a top bearing assembly or other components), and other features for sealing the enclosure 104 when the lid 128 is attached to the enclosure tub 126 (e.g., by bolts around the peripheral edge). In some instances, the lid 128 or other components may include a hole, seal, valve, etc., through which a vacuum assembly 108 may be attached in order to actively establish or maintain a vacuum. For example, as noted above, a vacuum assembly 108 may be mounted to a lid 128 assembly mounting plate 130 or otherwise, depending on the implementation.

In some implementations, the lid 128 may also include a motor 110 mounted thereto, along with other components, such as a driver, controller/CPU 112, supercapacitor 106, etc. As these and other components may be previously assembled on the lid 128 and then placed onto the enclosure tub 126 (e.g., where a flywheel 402 is already positioned in the tub 126), which may improve the speed and case of assembly.

In some implementations, the lid 128 may include a perforation at an axis of rotation of the flywheel for receiving a top axle 408a of the flywheel 402, although other implementations are possible, such as where a top axle 408a interacts with a magnetic coupling 118 integrated or coupled with the lid 128. For instance, the magnetic coupling 118 may be sealed and/or placed at a center of the lid 128 and may interact with the top clamping plate 120a to provide interaction between the flywheel 402 and the motor 110.

In some implementations, the axle 408a may pass through the perforation, which may include or be coupled with one or more bearing(s) 334 that support the axle 408a horizontally and/or vertically (e.g., holding the flywheel downward from contacting magnets in the magnetic lift member 152). One or more magnets, such as in a magnetic lift assist member/mechanism 152 may be attached to the lid 128.

A magnetic lift member 152 may extend downward from the bearing(s) 334 or other components to bring it into proximity with the top clamping plate 120a and/or stacking plates 122 of the flywheel 402, which may increase the efficiency of the magnets. Although the magnetic lift member 152 is illustrated as being a continuous ring, multiple individual magnets may be included (e.g., in a balanced manner) around the axis of rotation of the flywheel 402 (e.g., inside a housing of the magnetic lift member 152). In some implementations, the height of the magnetic lift member 152 and/or its magnets may be adjustable by tightening or loosening bolts coupling the magnetic lift member 152 to the lid 128, for example, from underneath the lid 128 or on top of the lid 128 (e.g., when the lid 128 is on top of the enclosure tub 126). Accordingly, a position (and, by extension, strength) of the magnets may be adjustable to further balance the system and force on the bearings 334.

Figure 3B:
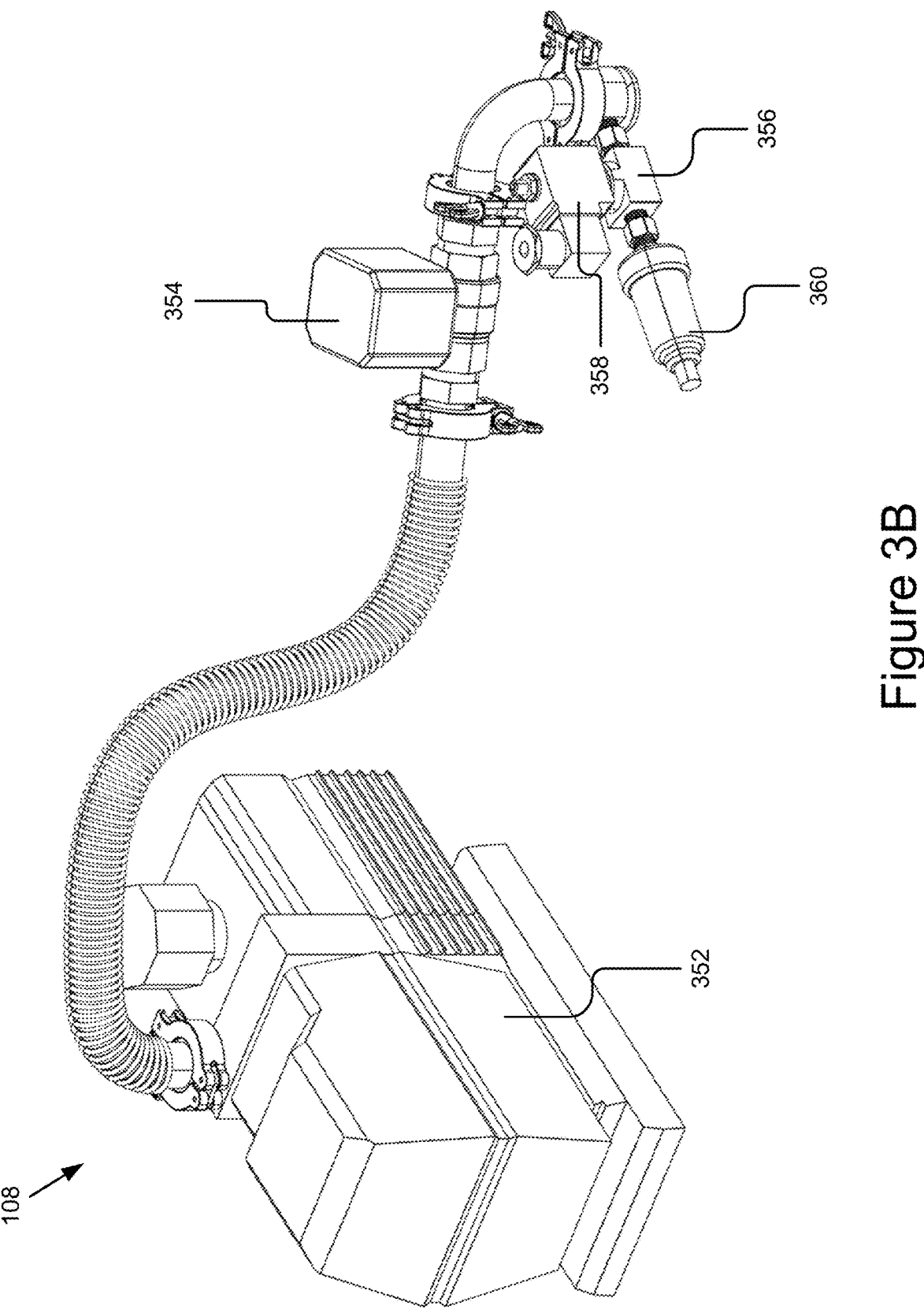
FIG. 3B illustrates an example vacuum assembly.

FIG. 3B illustrates an example vacuum assembly 108 that may actively maintain or initially established a vacuum in the enclosure 104 (e.g., via a perforation in the lid 128 or tub 126). The vacuum assembly 108 may be mounted to the enclosure 104, as illustrated in FIG. 1A, and it may be triggered using a pressure sensor that senses pressure inside the enclosure 104. The vacuum assembly 108 may include a vacuum pump 352 that is powered by the flywheel 402 itself, supercapacitor 106, a chemical battery, or grid power. The vacuum pump 352 may be coupled with a motorized on/off valve 354 that opens or closes the vacuum to avoid leakage, a solenoid valve 356 and solenoid valve coil housing 358 that may allow air to enter the enclosure 104, desiccant filter 360 that prevents dust or debris from entering the enclosure 104 while also reducing buildup of moisture (e.g., due to the operation of the vacuum pump 352), and other components that maintain the vacuum and limit humidity in the system.

The vacuum assembly 108 may include additional, fewer, or different components. It may be used to reduce a pressure and therefore an air resistance of a spinning flywheel 402. In some implementations, when a technician is performing maintenance or repairs on the flywheel assembly 102, the vacuum may be released (e.g., where air enters the enclosure 104 through a filter) to allow the maintenance to be performed. In some implementations, the vacuum pump 352 may create a positive pressure inside the flywheel enclosure 104. By providing a positive pressure, dust or other debris may be prevented from entering the enclosure 104, for example, because it may be difficult to clean out.

Figure 3C:
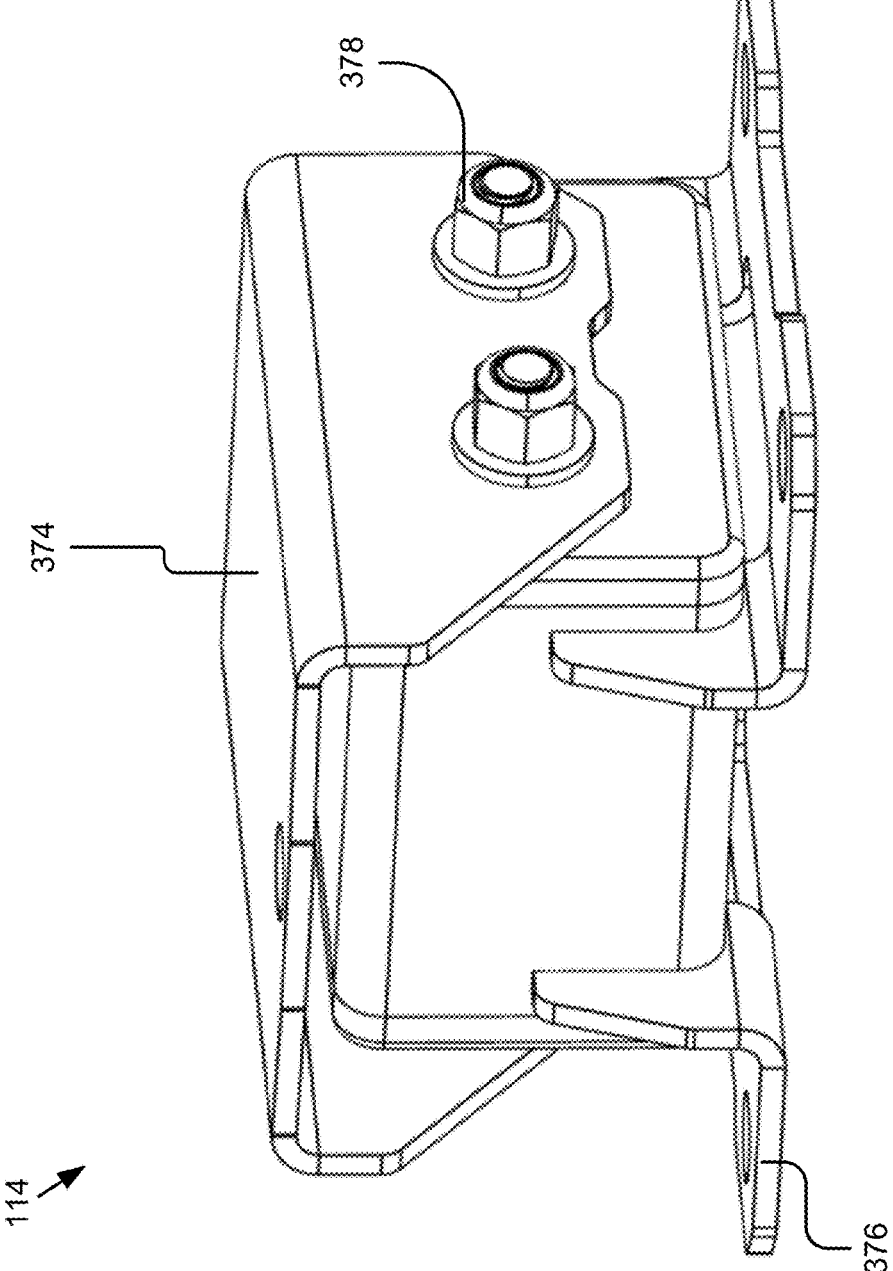
FIGS. 3C and 3D illustrate example feet of a flywheel enclosure.

FIG. 3C illustrates an example foot 114 of a flywheel enclosure 104. The foot 114 may include a top portion 374 that may be welded, bolted, or otherwise affixed to a bottom (e.g., a bottom plate 236 and/or rib 238) or side (e.g., side wall 232 or rib 234) of the enclosure 104. The foot 114 may also include a coupling portion 376 that allows it to be bolted to an external surface, such as a cement pad. In some implementations, the foot 114 may also include adjustable bolts 378 to allow the flywheel enclosure 104 to be leveled or bushings that isolate vibrations.

Figure 3D:
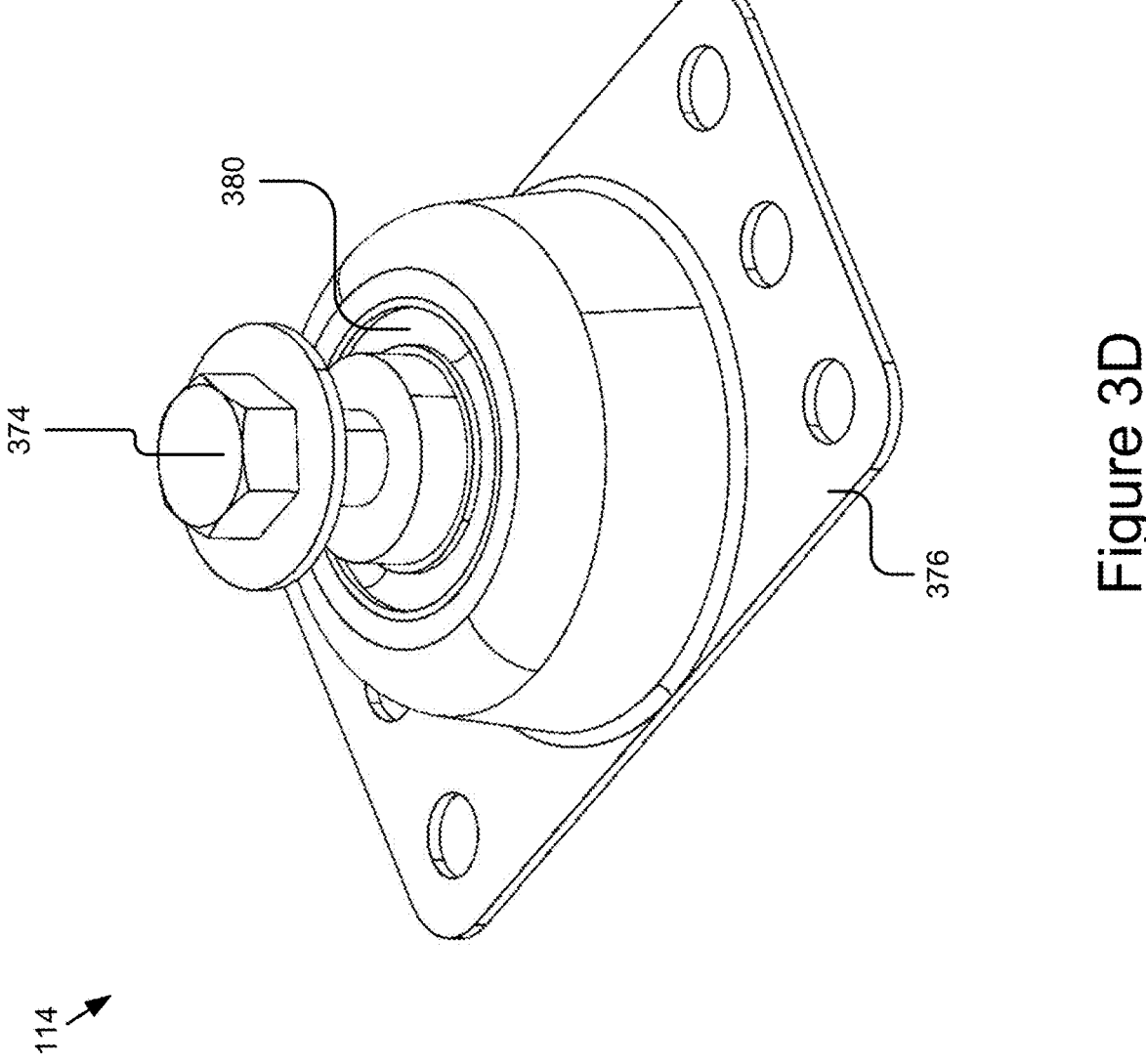

FIG. 3D illustrates an example foot 114 of a flywheel enclosure 104. The foot 114 may include a top portion 374 that may be welded, bolted, or otherwise affixed to a bottom (e.g., a bottom plate 236 and/or rib 238) or side (e.g., side wall 232 or rib 234) of the enclosure 104. For example, the top portion 374 may include a bolt that bolts to a leg coupled with the enclosure 104 (e.g., as in FIG. 1C). The foot 114 may also include a coupling portion 376 that allows it to be bolted to an external surface, such as a cement pad. In some implementations, the foot 114 may also include a rubber bushing 380, gasket, etc., that isolates the flywheel enclosure 104 from a floor.

FIGS. 4A-4D illustrate an example flywheel 402 and various components, views, and constructions thereof. There are a number of innovative features in the flywheel 402. For example, the flywheel 402 may include flywheel plates (120 and/or 122) that are coupled together using friction, which may be performed in addition to or in lieu of other connections, such as adhesive, welding, or otherwise. Some implementations of the flywheel 402 include bolts through components while others do not include bolts through components. Similarly, some implementations of the flywheel 402 include two separate axles 408—a top axle 408a and a bottom axle 408b. For instance, while previous flywheels 402 may include bolts attaching each of their components together, some implementations of the flywheel 402 herein may separate the axle 408 and/or use a clamping force from clamping plates 120 (and/or axles 408) to increase friction between the stacking plates 122 themselves, which may improve manufacturing and reduce points of failure when the flywheel 402 is spinning at high speeds.

In some implementations, clamping plates 120 may be used on the top and bottom of the flywheel 402 to support the flywheel 402, for example, by coupling the stacking flywheel plates 122 together and/or to axles 408. A top clamping plate 120a and a bottom clamping plate 120b may be drawn together by bolts at or near its peripheral edge, as described in elsewhere herein, which applies pressure inward on the stacking plates 122 in an axial direction thereby increasing friction. The friction may also allow rotational force to be transferred through the stacking plates 122 while also preventing them from moving out of alignment, which may throw the balance of the flywheel 402 off.

Depending on the implementation, the clamping force from the clamping plates 120 may be applied to the stacking plates 122 directly (e.g., by direct contact between the clamping plates 120 or stacking plates 122) and/or via other components, such as a portion of an axle 408 or other contact points (e.g., bushings or washers, as described below). For example, a clamping plate 120 may apply force to a center of the stacking plates 122 via a top and bottom axle 408b (and/or washer(s), ball washer(s), bushings at a peripheral edge or arm end, and/or otherwise).

In some implementations, the clamping plates 120 may be less massive than the stacking plates 122 (although other implementations are possible, as noted herein), so each type of plate may expand (and, potentially, become thinner) differently, especially at the peripheral edge. Accordingly, in some instances, bushings or other components may allow the stacking plates 122 to move relative to the clamping plates 120 while the clamping force is continuously applied.

The clamping plates 120 may have various contours and configurations to allow them to provide clamping force and other functionality. In some implementations, the stacking plates 122 may be configured differently from the clamping plates 120 and their function is primarily to add rotational mass to the flywheel 402 in order to store energy. The stacking plates 122 may be massive plates that are substantially round or may include various contours based on interaction with the clamping plates 120 or an assembly fixture. Example stacking plates 122 and clamping plates 120 are described in further detail below.

As described in further detail elsewhere herein, shapes, configurations, or features of the clamping plate(s) 120 may be designed to improve their interaction with the magnetic lift member 152, for example, to improve an amount of space, a magnetic pull, or otherwise. In some instances, it may further be configured to reduce eddy currents caused by the magnetic lift member 152.

Figure 4A:
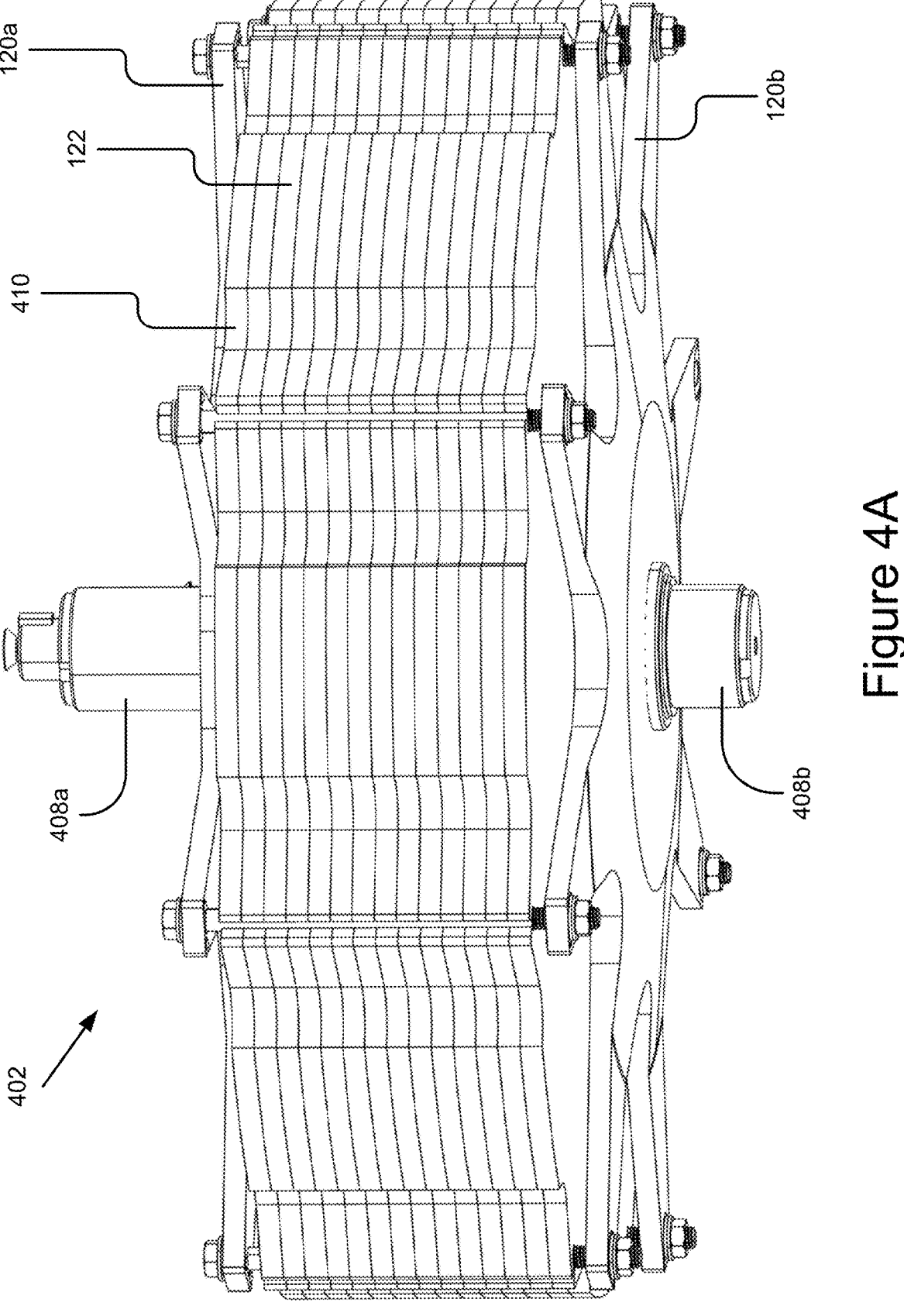
FIG. 4A illustrates a side-bottom view of the example flywheel 402.

FIG. 4A illustrates a side-bottom view of the example flywheel 402. As illustrated, a plurality of stacking plates 122 may be continuously stacked with their faces touching each other to minimize space consumed and flex while increasing friction. Fourteen stacking plates 122 are illustrated, although other implementations are possible and contemplated herein. As illustrated, there may be a space 442 between one or both of the clamping plates 120 and the stacking plates 122. Although this space 442 is illustrated as being relatively large and uniform, it may be smaller or non-existent for one or both of the axles 408. For instance, the top clamping plate 120a may contact a top-most stacking plate 122, while there may be only a few millimeters between the bottom clamping plate 120b and the bottom-most stacking plate 122, which space may vary based on clamping force applied and flex of the clamping plate 120.

As illustrated in the example flywheel 402 of FIGS. 4A-4D, a bottom axle 408b may be coupled with a bottom clamping plate 120b. The bottom clamping plate 120b then interacts with a bottom flywheel stacking plate 122 (e.g., via bushings, an axle washer 432 washer 432b, a portion of the axle 408, etc.). Various quantities of stacking flywheel plates may be stacked together depending on desired energy capacity, as noted elsewhere herein. Similarly, a top clamping plate 120a may interact with a top-most flywheel stacking plate 122 (e.g., via bushings, axle washer 432 washer 432a, etc.). The top clamping plate 120a may be coupled with a top axle 408a. In other implementations, a bottom face of the top clamping plate 120a may rest directly against the top face of the top-most stacking plate 122.

In some implementations, each of the stacking plates 122 may be identical, and each of the clamping plates 120 may be identical, although other implementations (e.g., sizes, configurations, etc.) are possible and contemplated, as noted below. Similarly, the top and bottom axle 408b may be the same or different (e.g., having a different length, interacting with different bearings or configurations, as illustrated herein.

As illustrated, when assembled, the clamping plates 120 of the flywheel 402 may align with the stacking plates 122. In some implementations, a clamping plate 120 may have a star shape (e.g., as illustrated in FIG. 4A) where the tip of each arm or branch of the clamping plate 120 has a bolt hole that receives a bolt for clamping the clamping plates 120 together. In some implementations, a clamping plate 120 may have another shape (e.g., as illustrated in FIGS. 4C and 4D) including one or more perforations proximate to a peripheral edge.

Similarly, the configuration of the stacking plates 122 may be based on the shape (e.g., the position and quantity of branches of the clamping plate 120), as described in further detail below. For instance, bolt points of the stacking plates 122 may correspond to bolt points of the clamping plates 120 whether or not the stacking plates 122 contact the bolts.

Figure 4B:
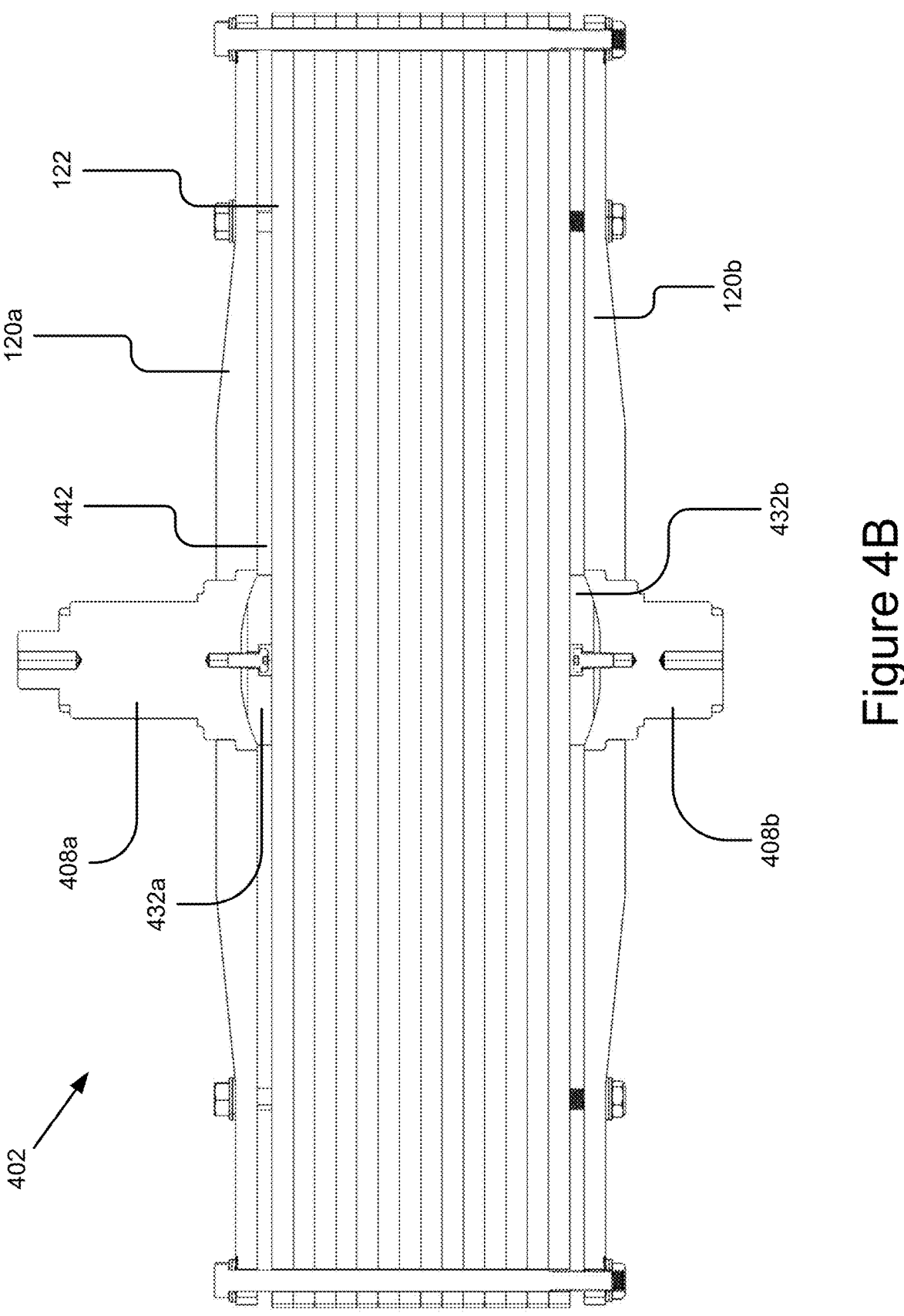
FIG. 4B illustrates a cross sectional view of an example multi-part flywheel.
Figure 4C:
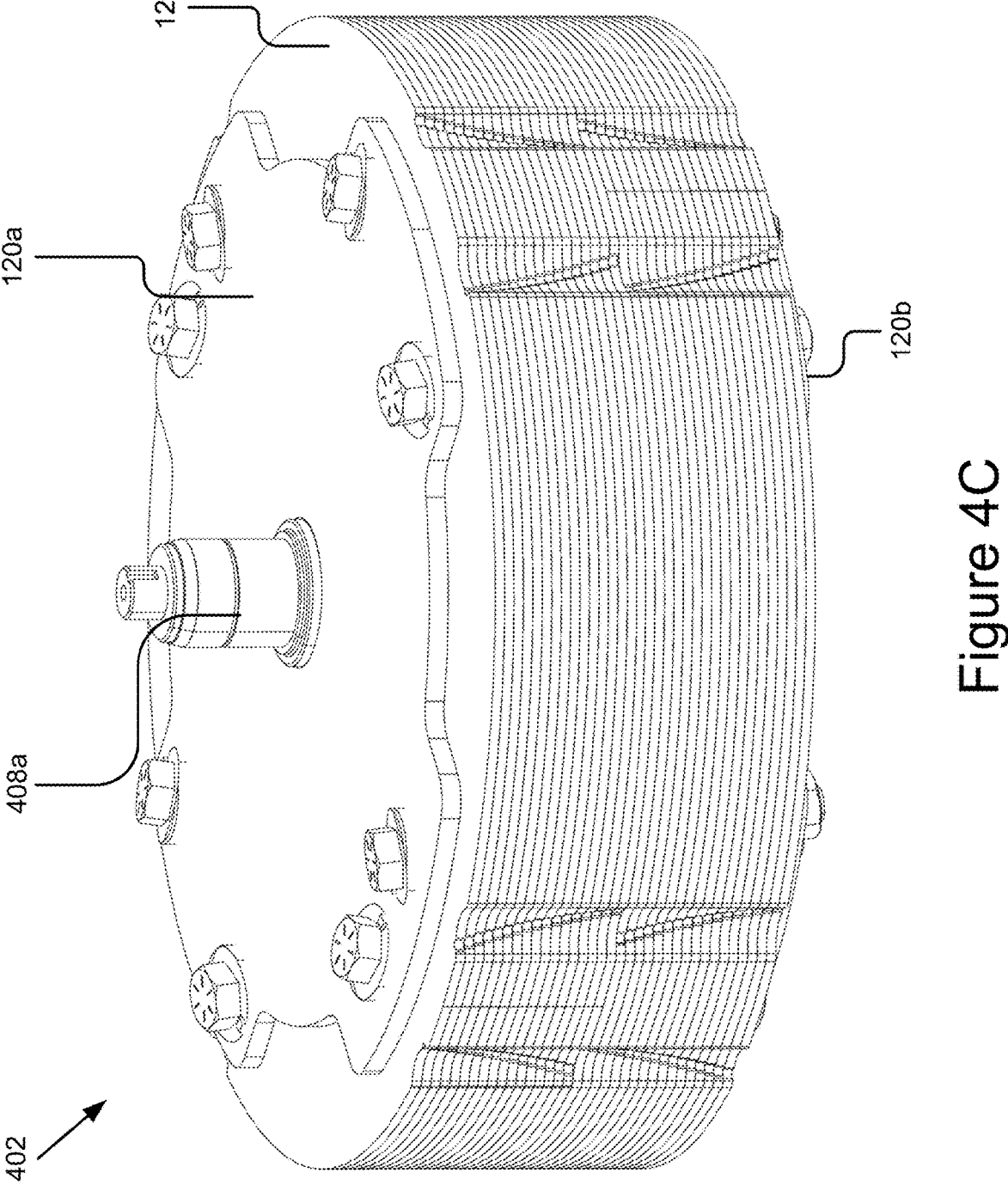
FIG. 4C illustrates a side-top view of an example flywheel.
Figure 4D:
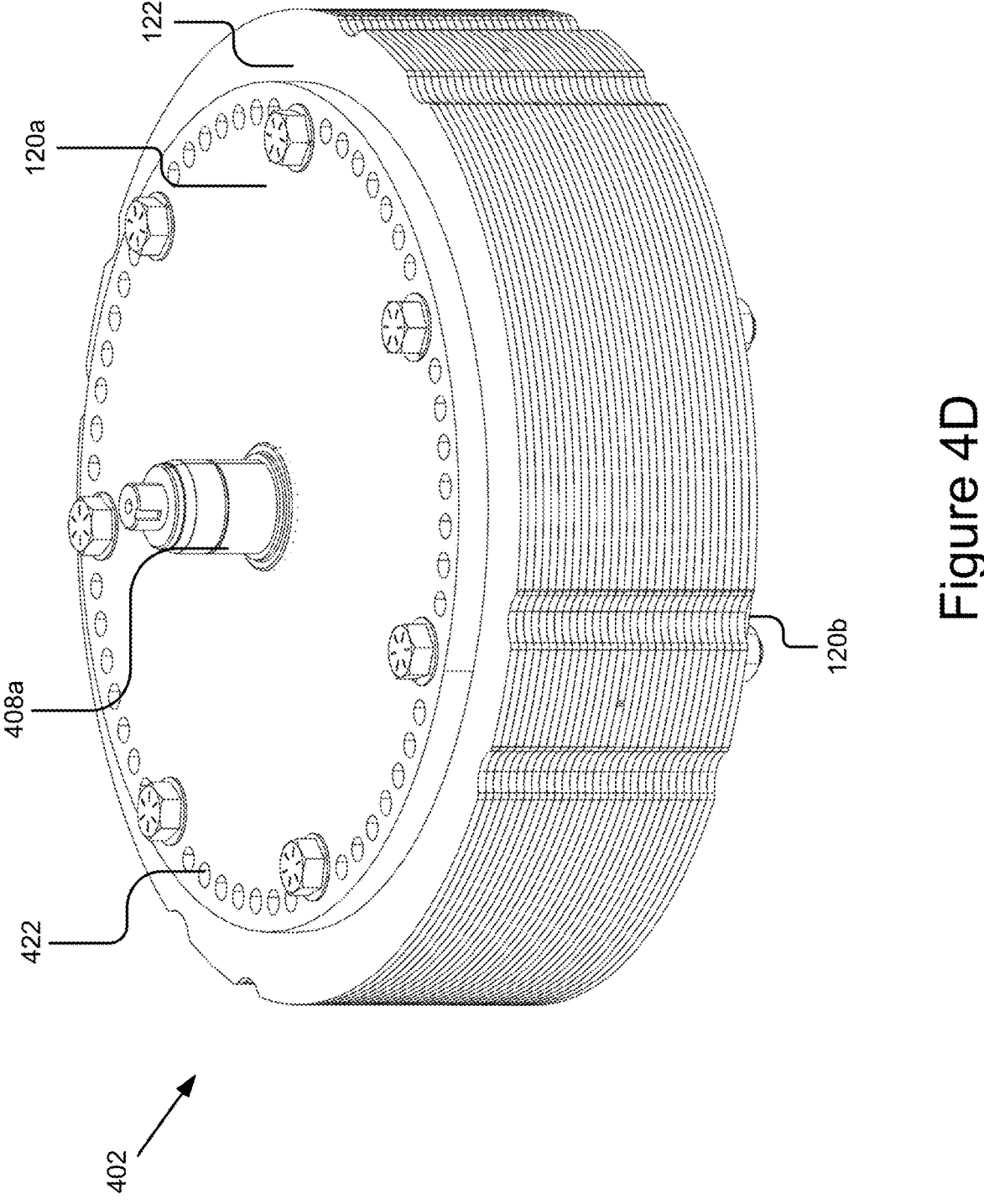
FIG. 4D illustrates a side-top view of another example flywheel.

FIG. 4B illustrates a cross sectional view of an example multi-part flywheel 402. As illustrated in the example implementation, a top clamping plate 120a may be connected with a top axle 408a. For instance, a top axle 408a may pass through the top clamping plate 120a so that the top clamping plate 120a may apply downward force on the axle 408. In some implementations, the axle 408 may include multiple parts, such as an axle 408 portion and an axle washer 432a or 432b, where the washer 432 (or a bottom portion of the top axle 408a) contacts a top-most stacking plate 122. Accordingly, via the axle 408, the top clamping plate 120a may apply force to the stacking plate(s) 122. It should be noted that other configurations, such as direct contact or contact through another device are possible without departing from the scope of this disclosure. Accordingly, the clamping plate 120 may apply pressure at a center of the stacking plate(s) 122 via the washer and/or axle 408.

Similar to the description of the top axle 408a above, a bottom axle 408b may be coupled to a bottom clamping plate 120b and may apply force to a bottom-most stacking plate 122. It should be noted that other configurations are possible, such as where the contact is direct, where the axles 408 are integrated with the clamping plates 120, where the axles 408 are integrated with one or more stacking plates 122, or otherwise.

Additionally, as described in further detail below, force may be applied (e.g., in an axial direction) to a center, periphery, and/or other area of the stacking plate(s) 122. For example, bolts may be tightened down on the clamping plate(s) 120, which apply force to an outer edge of the stacking plates 122. The force may be applied via direct contact between the clamping plates 120 and the stacking plates 122 or via an intermediary device, such as a bushing or washer (e.g., a ball washer or axle washer 432). In some instances, the clamping plates 120 may flex between the axle(s) 408 and the bolt(s) to provide the pressure. Accordingly, friction can be increased between the stacking plates 122. In some implementations, the stacking plates 122 may be simple, solid plates rather than having perforations for fasteners in the plates, which may reduce strength and introduce stress risers due to centrifugal force, and which may lead to increased complexity and failure modes. In other implementations, the stacking plates 122 may have perforations through which bolts may pass, which may increase a radius of the plates, provide simplicity in manufacturing, or increase an inter-plate (e.g., due to friction) force.

As described below, the bolts may be tensioned to varying levels of tension to cause the friction force. Although different configurations are possible and contemplated, as noted elsewhere herein, the flywheel 402 may include 8 bolts located around or proximate to a peripheral edge. Each bolt may be tightened to provide a defined torque or based on an applied force before the bolts are torqued (e.g., to apply a force of 2600 pounds per bolt), which may cumulatively provide a relatively even clamping and friction force across the stacking plates 122 (e.g., 16,000-21,000 pounds of clamping force).

In addition to their roles in clamping together the clamping plates 120, the bolts may include other features, such as the ability to mitigate failure of one or more stacking plates 122 (e.g., by catching a stacking plate 122 or portion thereof that slips or breaks). In some instances, the bolts may be replaced with other bolts of varying weights to assist in balancing the flywheel 402. Other details and implementations are possible and/or described elsewhere herein.

It should also be noted that the top axle 408a and the bottom axle 408b should be aligned as perfectly as possible to reduce vibrations and improve alignment with bearings, etc. Although other implementations are possible, ball washers (e.g., 232) may be used with the axles 408 to allow some adjustability during assembly to improve alignment. It should be noted that flat washers or no washers (e.g., the axles 408 may be single components instead of broken into an axle body and axle washer 432) may be used.

As the axles 408 or axle washers 432 contact the stacking plates 122, the application of clamping force by the bolts may cause one or more of the clamping plates 120 (e.g., the arms thereof) of the bend slightly and increase the force at the center that is applied by the axles 408/axle washers 432. Depending on the implementation, the thickness of the axle washer 432 (or similar component) and the configuration of the clamping arms may be such that the distance between the ends of the arms (e.g., to the stacking plates 122) may be minimalized when the plates are clamped. In some implementations, in addition or alternative to the clamping force at the center of the stacking plates 122, the clamping plates 120 may apply clamping force along a peripheral edge of the stacking plates 122.

FIG. 4C illustrates a side-top view of another example flywheel 402, according to some implementations. In the example of FIG. 4C, the shape of the clamping plates 120 has an X shape with two bolt holes proximate to the radial edge of each arm thereof. In the depicted example, the bolts may be angled as they pass from the top clamping plate 120a, through the stacking plates 122, and to the bottom clamping plate 120b. By angling the bolts, rotational forces across the clamping plates 120, stacking plates 122, and axles 408 may be reinforced, which reduces the odds that the plates will move out of alignment when the flywheel 402 is spun up or down though the axle(s) 408.

In the depicted example, the bolts may be angled toward each other or away from each other on alternating clamping plate arms, which improves uniformity of force (e.g., circumferentially and axially) and rotational balance. For instance, in a first arm, the bolts are angled away from each other at the top plate, while, at a second arm 90 degrees from the first arm, the bolts are angled toward each other at the top plate, which pattern may repeat, as illustrated. Where the top clamping plate 120a and the bottom clamping plate 120b are the same, they may be rotated 90 degrees, so that the holes on each match the angles of the bolts. For example, a bolt may be perpendicular to a radial direction of the flywheel 402 and angled around the periphery, for example, at an angle to the axial direction of the flywheel 402.

In the depicted example of FIG. 4C, the bolts extend through the top and bottom clamping plates 120b and through perforations in the stacking plates 122. In the example implementation where the bolts are angled, the bolts may use wedge shaped washers that allow the force from the bolts to be applied to the clamping plates 120. In some implementations whether with angled or straight (e.g., axial) bolts, the bolts and associated nuts may be tapered to allow them to extend partially into countersunk holes in the clamping plate(s) 120.

In the depicted example of FIG. 4C, the top clamping plate 120a (and potentially the bottom clamping plate 120b) may be substantially flat on its top and bottom surfaces, which allows the it to contact the stacking plates 122 and/or interact with a magnetic lifting component 152. For example, a very flat top surface of the top clamping plate 120a that interacts with a magnetic lifting component may reduce eddy currents in the top clamping plates 120a caused by rotation relative to the magnetic lifting member 152.

FIG. 4D illustrates a side-top view of another example flywheel 402, according to some implementations. In the depicted example, the bolts extend axially through perforations 422 in the top clamping plate 120a, the stacking plates 122, and the bottom clamping plate 120b. Depending on the implementation, the stacking plates 122 may have an equal quantity of perforations 422 as the quantity of bolts clamping the clamping plates 120, the clamping plate(s) 120 may include additional perforations 422 proximate to their peripheral edge(s). These additional perforations 422 may be used in balancing the flywheel 402, for instance, by drilling out the holes or adding plugs to the holes. As noted elsewhere herein, there may be a space between one or both of the clamping plates 120 and the stacking plates 122. For instance, the top clamping plate 120a and top stacking plate 122 may lack a space (e.g., as at 442), which may prevent the top clamping plate 120a from flexing, thereby improving its flatness and interaction with a magnetic lift member. In some implementations, there may be a small gap/space between the bottom clamping plate 120b and a bottom-most stacking plate 122, which allows some flex in clamping (e.g., to increase a force at the center/axles 408). For instance, a portion of the bottom axle 408b and/or an axle washer (whether a ball washer or flat) may be used to provide a space between a center of the bottom clamping plate 120b and the bottom-most stacking plate 122.

In some implementations, the stacking plates 122 may include contours or scallops 410 around a peripheral edge, which may reduce failure points due to radial stress around bolt holes and/or assist with aligning the plates. For instance, a scallop 410 may be a scalloped shape or contour removed or omitted from a peripheral edge of a stacking plate 122.

The clamping plates 120 may be constructed from aluminum, steel, or another material. For instance, the plates 120 may be constructed from a ferromagnetic steel (e.g., AR500 steel plate) and may be stamped, formed, or machined into the desired shapes. Example masses of the clamping plates 120 may be 66-68 pounds when constructed from steel, although other implementations are possible.

Figure 4E:
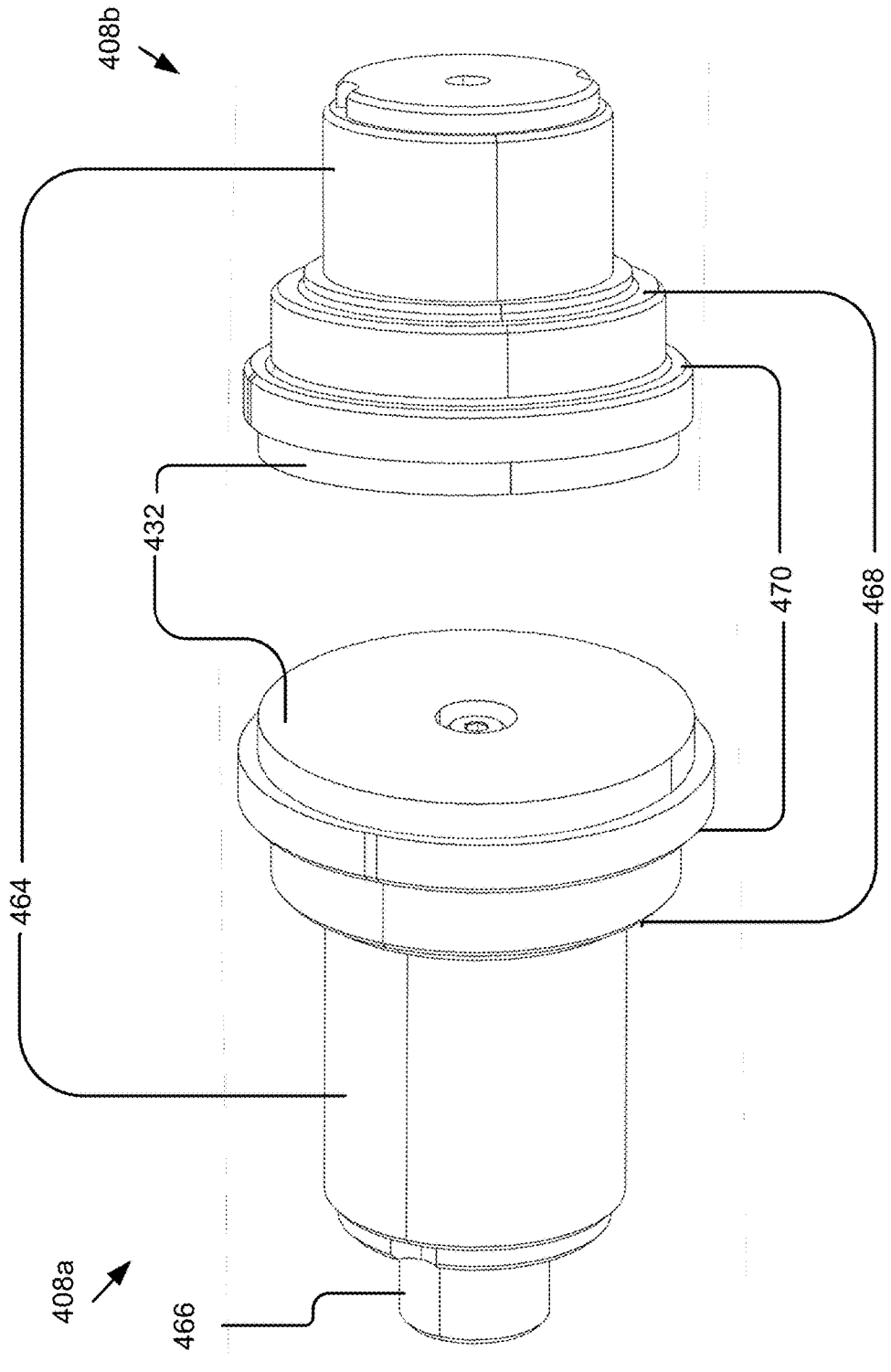
FIG. 4E illustrates example flywheel axles.

FIG. 4E illustrates example flywheel axles 408a and 408b. Although other sizes and configurations are possible, FIG. 4E illustrates a top and bottom axle 408b with axle washers 432 (e.g., ball washers). Depending on the implementation, the top and bottom axles 408b may be identical or have variations, such as their length, whether or not they include washers or axle washers 432, whether they include a motor connection 466. Some features of the axle 408 are described in reference to a single one of the top and bottom axle 408b, but they may be present on both or the other axle 408.

Depending on the implementation, an axle 408 may include a smooth shaft 464 (e.g., a 50-70 mm diameter shaft 464) portion that interacts horizontally with one or more bearings to keep the flywheel 402 aligned. The shaft 464 may contact one or more seals to maintain the vacuum and may be polished to avoid friction with the seals.

An axle 408 may include one or more bearing shelf(ves)/step(s) 468 that interact with bearings to provide vertical support to the flywheel 402 (e.g., to lift, lower, or hold it vertically).

In some implementations, an axle 408 may include one or more clamping shelf (ves)/step(s) 470 that interact with a clamping plate 120. For instance, the clamping step 470 could be a wider area than the shaft 464 so that the clamping plate 120 applies pressure on the clamping step 470 to hold the axle 408. In some implementations, the axle 408 extends beyond the clamping step 470 and flywheel step 468, so that the axle 408 applies pressure to a stacking plate 122, as noted above. The contact with a stacking plate 122 may be via a washer, such as an axle washer 432 (which may be a flat or ball washer). The clamping step 470 may interact with an edge or corresponding step(s) on a clamping plate 120.

In some implementations, the clamping step 470, an axle washer 432, or another part of the axle 408 may be shaped to interact with a corresponding shape or structure in a clamping plate 120. For instance, it may include a flat side, oval shape, protrusion, or other structure that allows torque to be transferred between the axle 408 and the clamping plate 120 and/or stacking plates 122 (e.g., where a top or bottom stacking plate 122 includes a shape to match this structure). For example, as noted in further detail above, an oval or small flat side may be used to avoid stress risers in the material (e.g., of the clamping plate 120).

In some implementations, one or both of the axles 408 may include a motor connection 466 that may be a portion or extension of the shaft 464. The motor connection 466 may include a flat, oval, D-shaped, or other structure/shape (e.g., a key or slot) that allows torque to be transferred between the axle 408 and another structure, such as a motor-generator 110 (e.g., via a magnetic coupling 118, as described elsewhere herein). The motor connection 466 may additionally or alternatively include keys or other protrusions that improve the connection between the axle 408 and another structure (e.g., the magnetic coupling 118, motor-generator 110, etc.).

Although a ball washer (at 232) is illustrated on both the top and bottom axle 408a and 408b in FIG. 4E, other implementations are possible and contemplated. For example, a ball washer may be used to provide a small amount of adjustability to the axle 408 alignment when top axle 408a, bottom axle 408b, stacking plates 122, and clamping plates 120 are aligned. As illustrated in the example, two axles 408 may be used where the axles 408 are physically disconnected from each other.

In some implementations, a ball washer may be flat on its bottom where it contacts a stacking plate 122 while it is rounded on a top where it contacts a corresponding curve in the axle body. Accordingly, the position of the axles 408 could be shifted slightly during assembly to allow the axles 408 to be positioned. As illustrated, in some implementations, a bolt may couple the axle washer 432 to the axle body in order to hold it in place during assembly.

It should be noted that, in some implementations, flat washers or no washers are used with an axle 408.

Figure 5A:
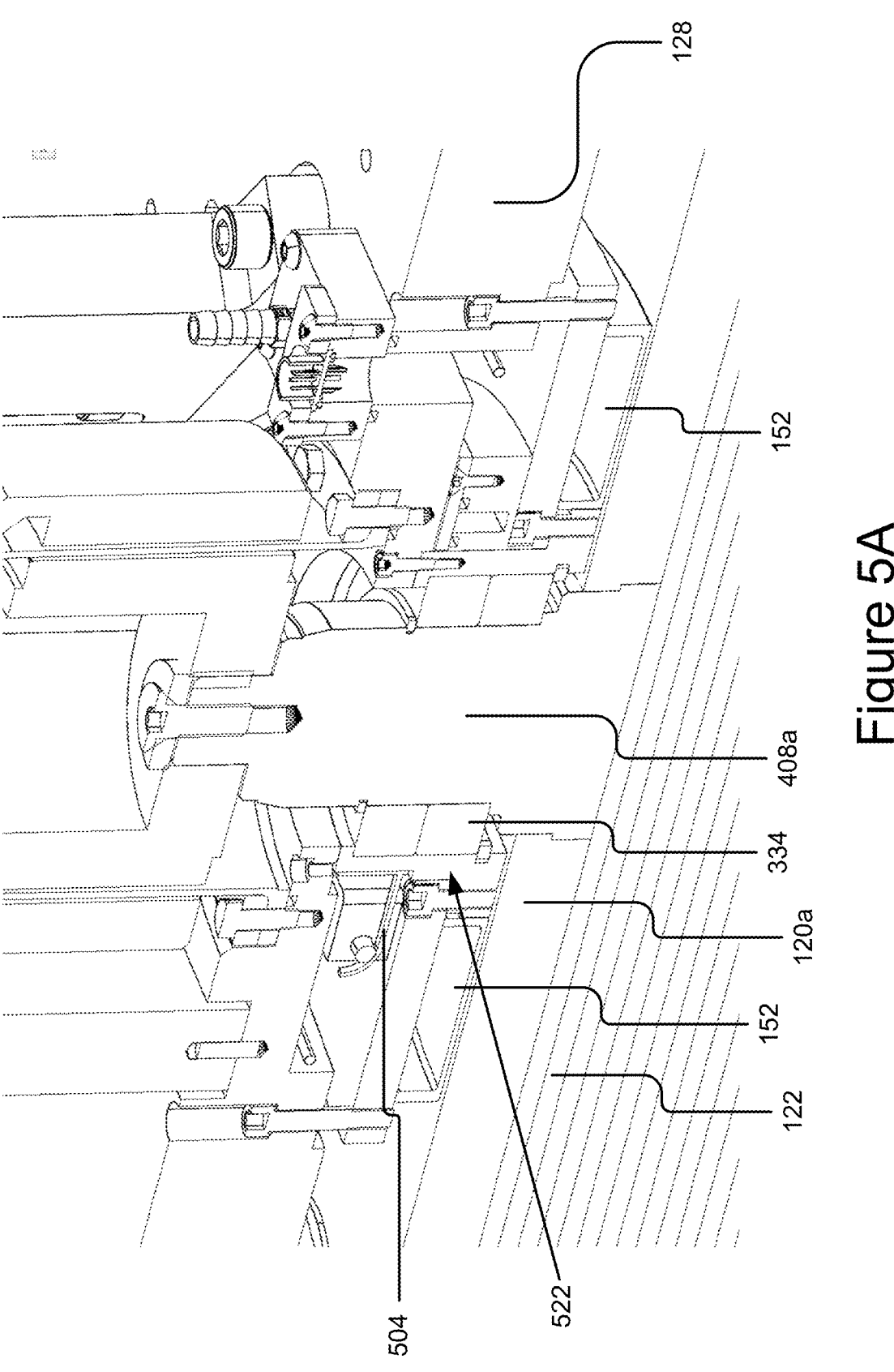
FIG. 5A illustrates a cross-sectional view of an example upper axle disposed within an upper bearing assembly of a flywheel enclosure.

FIG. 5A illustrates a cross-sectional view of an example upper axle 408a disposed within an upper bearing assembly of a flywheel enclosure 104. In the illustrated example, some components may be omitted for visibility. As illustrated, a top axle 408a may interact with a plurality of bearings 334 and/or seals (e.g., in a housing 522) to provide vertical and/or horizontal support. For instance, multiple (e.g., 2) bearings 334 may be used on an axle 408 to increase redundancy and safety. In some instances, a temperature sensor 504 or accelerometer may be located in or adjacent to the bearing housing 522, which allows the flywheel 402 to detect a failure of one or more bearings 334 thereby increasing a safety margin. Other features, such as cooling loops (e.g., through which coolant may be circulated), vacuum connections, etc., may also be used.

As illustrated, one or multiple seals may be located in or adjacent to the shaft of the axle. For instance, the seals may be housed within a bearing/O-ring housing 522 and contact the smooth sides of the axle shaft to seal a vacuum. In some instances, where the vacuum is actively established or maintained, the seals may change their shape by flexing inward to improve the seal. Similarly, the seals may be multiplied (e.g., doubled) for redundancy. Other structures, such as retaining clips may be located on one or both sides of the bearings 334, so that they can be installed or replaced separately or with a housing 522.

In some implementations, the bearings and/or seals/shaft may be lubricated, for example, using a high durability and/or vacuum specific lubricant. In some implementations, a special material may be used for the seals to allow them to be used in a vacuum and/or without a separate lubricant. Depending on the implementation, the bearings may be dry bearings, such as a ceramic hybrid bearing, which beneficially reduces eddy currents and other issues due to moving in a magnetic field. Additionally, or alternatively, a dry film lubricant may be used for these components.

In some implementations, as illustrated, an example magnetic lift member 152 may interact with (e.g., to attract) a flywheel 402, such as a top clamping plate 120a (and/or stacking plates 122). For instance, as illustrated, the magnet(s) of a magnetic lift member 152 may be located above, below, or next to the center of the axle 408a. For example, the magnets may be positioned by the magnetic lift member 152 (also referred to as the magnetic lift assist member/mechanism 152) to closely interact with the flat area (e.g., 444) of the top clamping plate 120a. For instance, the top bearing 334 may hold the top clamping plate 120a/flywheel 402 at a defined distance from the magnetic lift member 152, so that a defined magnetic force is applied, which lifts the flywheel 402 wholly or partially. For instance, as described elsewhere herein, the magnetic lift may be less than (e.g., so that weight remains on a bottom bearing), equal to (e.g., so that weight is roughly balanced between the top and bottom bearings), or greater than (e.g., so that the top bearing is holding the flywheel 402 from being pulled closer to the magnet(s)) the weight of the flywheel 402 at the set distance.

As illustrated and described in further detail below, the magnetic lift member 152 may be positioned close to the clamping plate 120a, which may be ferromagnetic (e.g., a magnetic steel) flat (or matching the shape of the magnetic lift member) shape. As shown, the flywheel 402 may be positioned at a center of the enclosure 104, although other implementations are possible. As noted elsewhere herein, the magnets of the magnetic lift mechanism 152/member may be stationary and coupled with the enclosure because magnets tend to be made out of weaker material that would not hold up well to rapid spinning (e.g., because rare-earth magnets, for instance, are mechanically weak). In the depicted example in FIG. 5A, a cavity is shown in the magnetic lift member 152, but this cavity may include one or more magnets, as described below. The magnetic lift member 152 may be assembled as a unit and then bolted or otherwise attached to a lid 128 of the flywheel assembly 102.

In the depicted example, an upper axle 408a may be coupled to a motor directly or via a magnetic coupling 118, as described elsewhere herein.

Figure 5B:
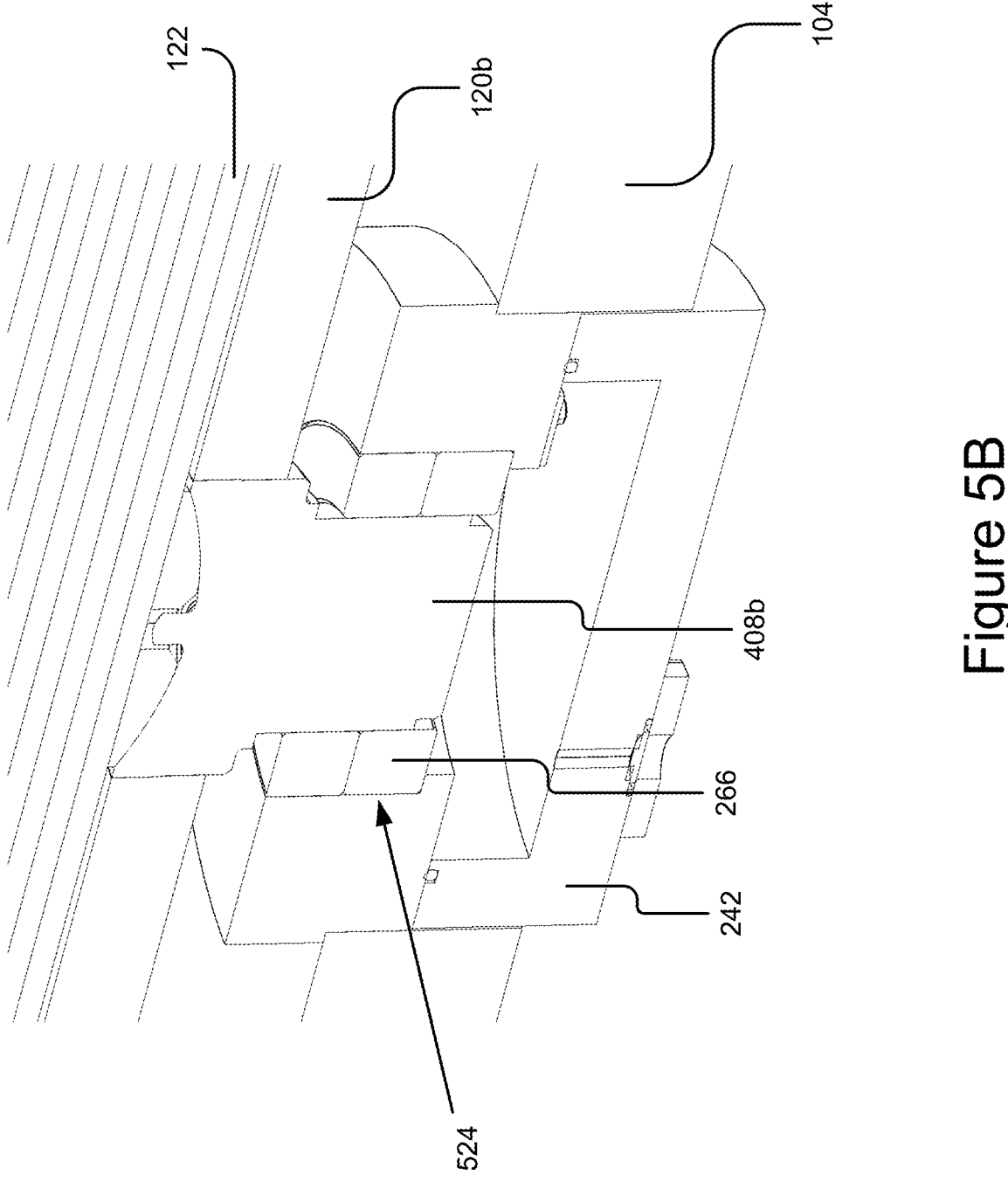
FIG. 5B illustrates a cross-sectional view of an example lower axle disposed within a lower bearing assembly of a flywheel enclosure.

FIG. 5B illustrates a cross-sectional view of an example lower axle 408b disposed within a lower bearing assembly 524 of a flywheel enclosure 104. In the illustrated example, some components may be omitted for visibility. Similar to FIG. 5A, as illustrated, a bottom axle 408b may interact with a plurality of bearings 266 and/or seals or structures to provide vertical and/or horizontal support. For instance, multiple (e.g., 2) bearing assemblies may be used on an axle 408b to increase redundancy and safety. In some instances, a temperature sensor or accelerometer may be located in or adjacent to the bearing housing 524, which allows the flywheel 402 to detect a failure of a bearing thereby increasing a safety margin, improving efficiency, etc. Stacking plates 122 are also shown.

As shown in the example of FIG. 5B, a cap 242 is also shown. The cap 242 may seal (e.g., using gaskets and bolts) an interior cavity of the enclosure 104. The cap 242 may provide access to move the flywheel 402 within the enclosure 104; install, maintain, or adjust bearings 266 and seals; and perform other actions.

In some implementations, the cap 242 and/or another component may be threaded, so that it may be twisted up/down, which adjusts the position of the bearings 266 and/or seals; or it may lift the flywheel 402 itself to set its position in the enclosure 104. In other implementations, the flywheel 402 may be manually adjusted (e.g., to be at a defined distance from the magnetic lift member 152) and then the bearings inserted or locked in position.

Figure 5C:
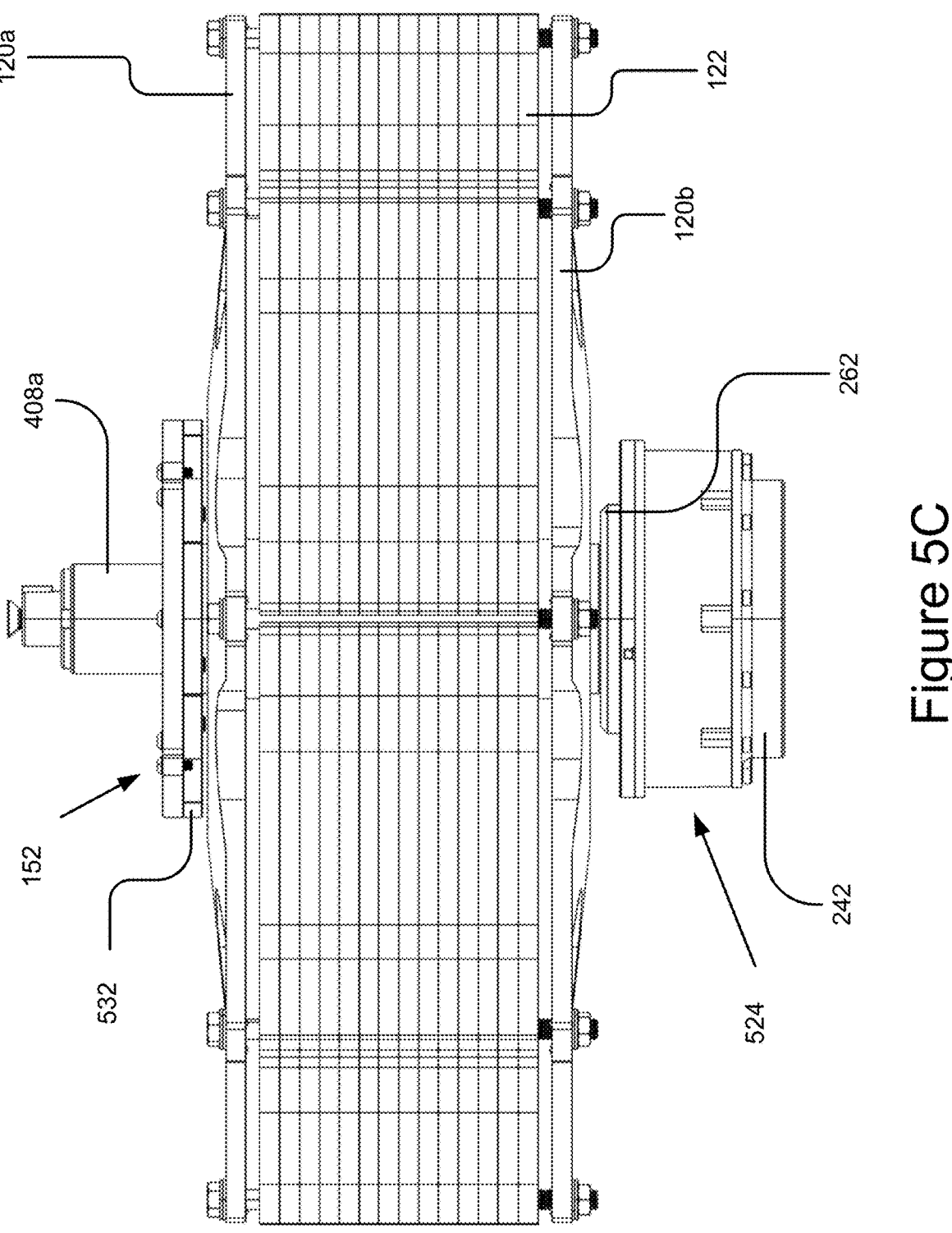
FIG. 5C illustrates an example flywheel coupled with a portion of a magnetic lift member and a lower bearing assembly outside of a flywheel enclosure.

FIG. 5C illustrates an example flywheel 402 coupled with a portion of a magnetic lift member 152 and a lower bearing assembly outside of a flywheel enclosure 104, for example, for purposes of illustration.

As illustrated in the example of FIG. 5C, an exterior of the magnetic lift member 152 has been omitted to show magnets 532, which may be wedge magnets, and an example relative proximity to the top clamping plate 120a. For instance, the wedge magnets 532 may, when in an active configuration, pull on the flat area (e.g., 444) of the clamping plate 120a, although other implementations are possible and contemplated. It should be noted that although the magnets 532 and other components of the magnetic lift member 152 are illustrated floating above the top clamping plate 120a (e.g., instead of attached to an enclosure 104/lid 128) for purposes of illustration.

The example of FIG. 5C also illustrates a lower bearing assembly 524 that holds one or more bearings at the bottom of the flywheel enclosure 104. For instance, a lower bearing assembly 524 may be welded, integrated with, or bolted to an enclosure tub 126. The lower bearing 524 may support none, a portion, or all of the weight of the flywheel 402. In some implementations, the lower bearing 524 may merely be present to keep the flywheel 402 horizontally aligned.

The lower bearing 524 may include a shipping support area 262, such as a shipping ring, on which the weight of the flywheel 402 may rest during shipping, storage, or when not in use. The shipping support area 262 may be any device that may support the flywheel 402, such as a plastic or metal ring in the enclosure tub 126.

The height and/or relative positioning of the bearings may also be adjusted because a quantity (e.g., 10, 14, 18, 28, or other quantities) of stacking plates 122 may vary, and thicknesses of each plate may vary (e.g., by a thousandth of an inch), the overall thickness of the flywheel 402 may vary enough to affect the functioning or longevity of the bearings unless there is flexibility in the design, as illustrated, to accommodate different heights.

As described elsewhere herein, a retaining cap 242 or another mechanism may seal the enclosure and/or capture an adjustment nut so that it does not accidentally move in order to lock the Z/vertical axis of the flywheel 402.

FIGS. 6A-7H illustrate various views, components, and constructions of an example flywheel positioning system. The flywheel positioning system may be configured to position the flywheel 402 within the enclosure 104, as described elsewhere herein. Although a certain implementation is described, other implementations and features are contemplated, and the provided examples should be understood as examples.

In some implementations, the flywheel positioning system may adjust the position of the flywheel 402 between the top and bottom bearings 266 so that a distance between the bearings 266 may be adjusted to match a size of the flywheel 402 and thereby to minimize wear on the bearings 266 while using their functionality. For instance, as noted elsewhere herein, the flywheel positioning system may lift the bottom bearing 266 upward, in turn lifting the flywheel 402 upward, until the flywheel 402 contacts the top bearing and/or is correctly distanced from the magnetic lift member/mechanism. In some implementations, as the flywheel 402 is lifted up, it may contact a surface, such as a top bearing (e.g., at the top of an enclosure 104, magnetic lift member 152, or bumper. Once it contacts the surface, it may be backed down by a defined amount to correctly position the flywheel 402. In some implementations, the positioning system (e.g., a nut bearing holder 264) may include one or more marks that may be used to determine correct positioning.

In some implementations, the flywheel positioning system may be used to move the flywheel 402 or components of the flywheel assembly 102 between modes. As noted above, the flywheel positioning system may move the flywheel 402 (e.g., via a bottom bearing 266) or a shipping surface/ring 262 in order to move the flywheel 402 between a shipping position and an active position.

For example, as noted in further detail elsewhere herein, a flywheel 402 may rest on a shipping ring 262 during shipping or storage. The flywheel positioning system may be adjusted to lift the flywheel 402 off the shipping ring 262 and into an active position, for instance, by engaging a bottom bearing 266 (e.g., by moving the bearing 266 and/or flywheel 402) and/or the top bearing (e.g., by moving the bearing and/or flywheel 402).

Figure 6A:
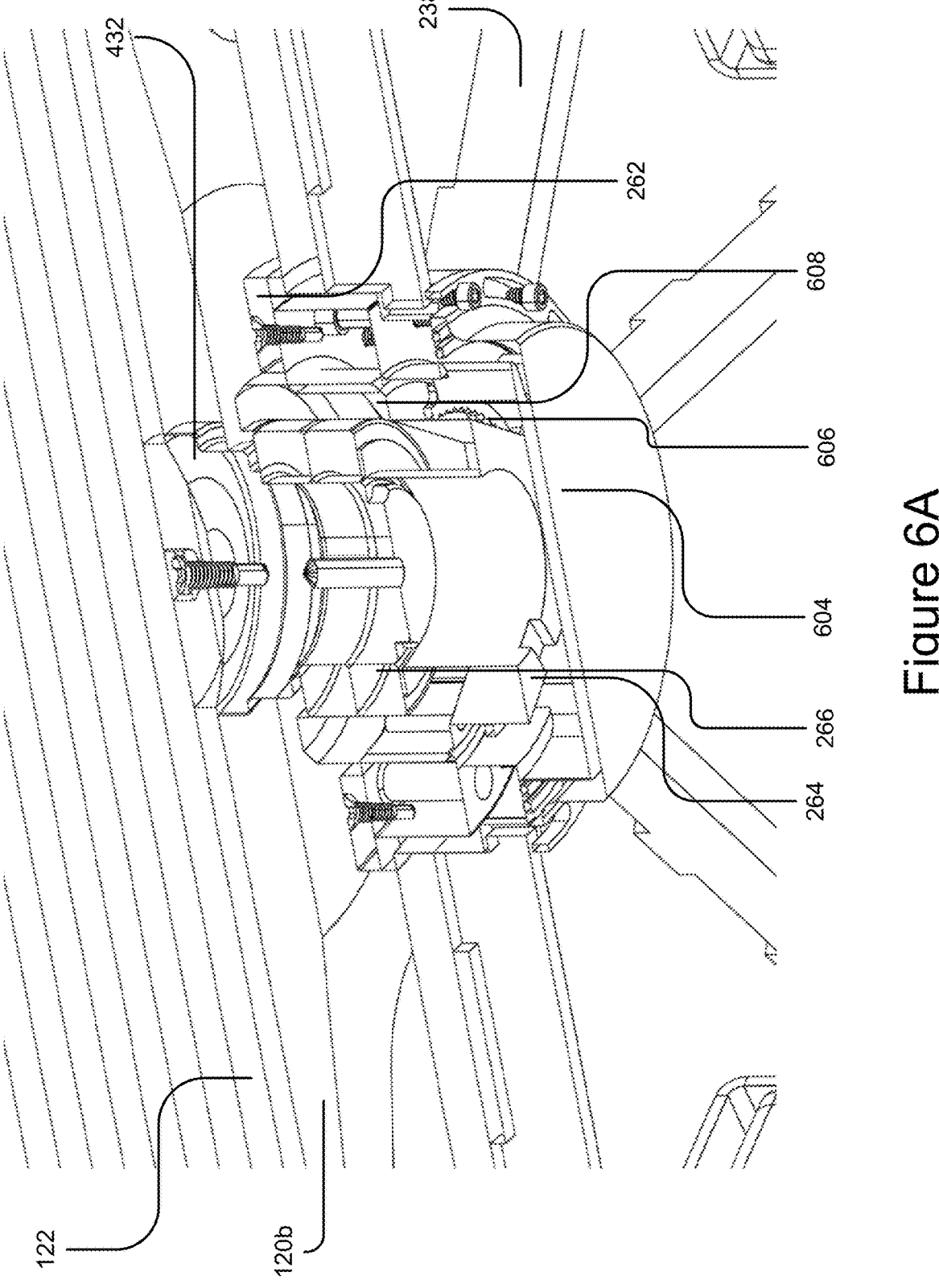
FIG. 6A illustrates a cross sectional view of an example flywheel positioning system.

FIG. 6A illustrates a cross sectional view of an example flywheel positioning system, which may include a retaining cap 604 that couples with a positioning nut/nut bearing holder 264 and a flywheel enclosure 104. For example, the base ring 240 may be integrated or coupled with a bottom plate 236 of the enclosure 104 tub. One or more bottom ribs 238 may also be coupled with the bottom plate 236 and base ring 240 (e.g., by a weld), which provides strength to the enclosure 104 sufficient to hold the weight of the flywheel 402.

In some implementations, the base ring 240 may be threaded on its interior to interact with a nut bearing holder 264, as described below. In some implementations, a retaining cap 604 may be coupled with the base ring 240 via one or more bolts, which bolts may provide adjustability to the rotation of the retaining cap 604 on the enclosure 104, as noted below.

In the depicted examples, a flywheel 402 and flywheel axle 408*b* are shown inside an enclosure 104. Although the flywheel positioning system could be used with a top axle 408*b*/the top of a flywheel, the illustrated examples of FIG. 7B illustrates the flywheel positioning system used with a bottom axle 408*b* of the flywheel 402.

As shown, an axle 408*b* may interact with one or multiple bearings 266 held by a lower bearing holder 264. The lower bearing holder 264 may be a nut bearing holder 264 where the nut includes a bearing 266 holding portion, a tightening portion, and one or more threads, as described below. The bearing(s) 266 may support the axle 408*b* of the flywheel. In some instances, the bearing(s) 266 and/or nut bearing holder 264 may be held by a lower sleeve 608.

As illustrated in the example, the nut bearing holder 264 may hold the bearings 266 and may rotate (e.g., using threads) within a lower ring of the enclosure 104 tub to move the nut bearing holder 264 and bearing(s) 266 upward or downward relative to the enclosure 104, which may, in turn, move the flywheel upward or downward. For example, when in a shipping configuration, the nut bearing holder 264, bearing(s) 266, and flywheel 402 may be moved downward so that the bottom surface of the clamping plate 120*b* rests on the shipping ring 262, which may be a metal, plastic, or another material on which the flywheel may rest to remove stress from the bearing(s) 266. In some instances, the flywheel 402 may rest directly on the bottom of the enclosure 104 tub when in a shipping or storage position.

Although other implementations are possible, a nut locking mechanism may include one or more of a cap 604, a hex lock 606, and/or a nut bearing holder 264, etc. In some implementations, as described in further detail below, a cap hex lock 606 may include various protrusions, recesses, or other structures, such as teeth 714 (e.g., defining a set of angles at which a nut may be held), that interact with the nut bearing holder 264 to prevent the nut bearing holder 264 from twisting relative to the enclosure 104, which may change the vertical position of the flywheel in the enclosure 104. The cap 604 hex lock 606 is described in further detail below.

In the depicted implementation, a retaining cap 604 is also shown. The retaining cap may be an implementation of a cap 242. The retaining cap 604 may include one or more O-rings 752 or channels to seal the vacuum internal to the enclosure 104. Accordingly, when the retaining cap 604 is placed onto the enclosure 104 (e.g., after flywheel positioning), a vacuum may be maintained.

In some implementations, the retaining cap 604 may hold the cap hex lock 606 in position on the nut bearing holder 264, so that the nut bearing holder 264 cannot rotate when the retaining cap 604 is bolted to the enclosure 104 (e.g., the base ring 240). For example, when attaching the retaining cap 604, it may be rotated to mate up with the cap hex lock 606 to hold it in a specific position, causing the cap hex lock 606 to bridge the space between the nut bearing holder 264 and the retaining cap 604 and prevent the nut from rotating. It should be noted that although the cap hex lock 606 is described as a separate device from the retaining cap 604, it may be integrated with either the nut bearing holder 264 or the retaining cap 604 to simplify installation. Example implementations of the nut bearing holder 264, cap hex lock 606, and retaining cap 604 are described elsewhere in further detail below.

Accordingly, as an example procedure for changing the mode of the flywheel from a shipping position to an active position, a technician may rotate the nut bearing holder 264, so that it moves upward and lifts the flywheel internal to the enclosure 104 and off of the shipping ring 262. Once the flywheel 402 (e.g., a top clamping plate 120*a*) contacts a surface at the top of the enclosure 104, magnetic lift member 152, top bearing(s) 266, bumper, or other component, the technician may stop rotating the cap 604 hex lock 606 upward and may back it off slightly to relieve pressure on the top bearing 266 or contact with another component. The technician may then insert a cap hex lock 606 around the hex head of the nut bearing holder 264 to mesh the teeth 714 of the lock with the nut. The technician may then place the retaining cap 604 onto the base ring 240 and rotate it until it interacts with the cap hex lock 606 (as described below) to hold the cap hex lock 606 in a given orientation so that it does not rotate. The technician may then tighten bolts between the retaining cap 604 and the base ring 240 to seal the enclosure 104 and lock the nut bearing holder 264 in place.

Accordingly, the position of the flywheel 402 and lower bearing 266 may be adjusted to accommodate for shipping, variations in flywheel thickness, or other aspects. By locking in an adjustable vertical position of the flywheel 402, the flywheel positioning system prevents unintended movement of the nut bearing holder 264 during flywheel rotation or vibration. It also allows the position to be adjusted in the future for troubleshooting or maintenance, where adhesives or welds would not allow such access. Accordingly, the lock is secure, sealed, and accessible.

Although not visible in FIG. 6A, one or more sensors 756a and 756b may also be located in the lower bearing assembly, such as in the base ring, adjacent to the bearings 266, in the retaining cap 604, or otherwise. The sensors 756 may measure vibration, temperature, rotational velocity, or otherwise.

Figure 6B:
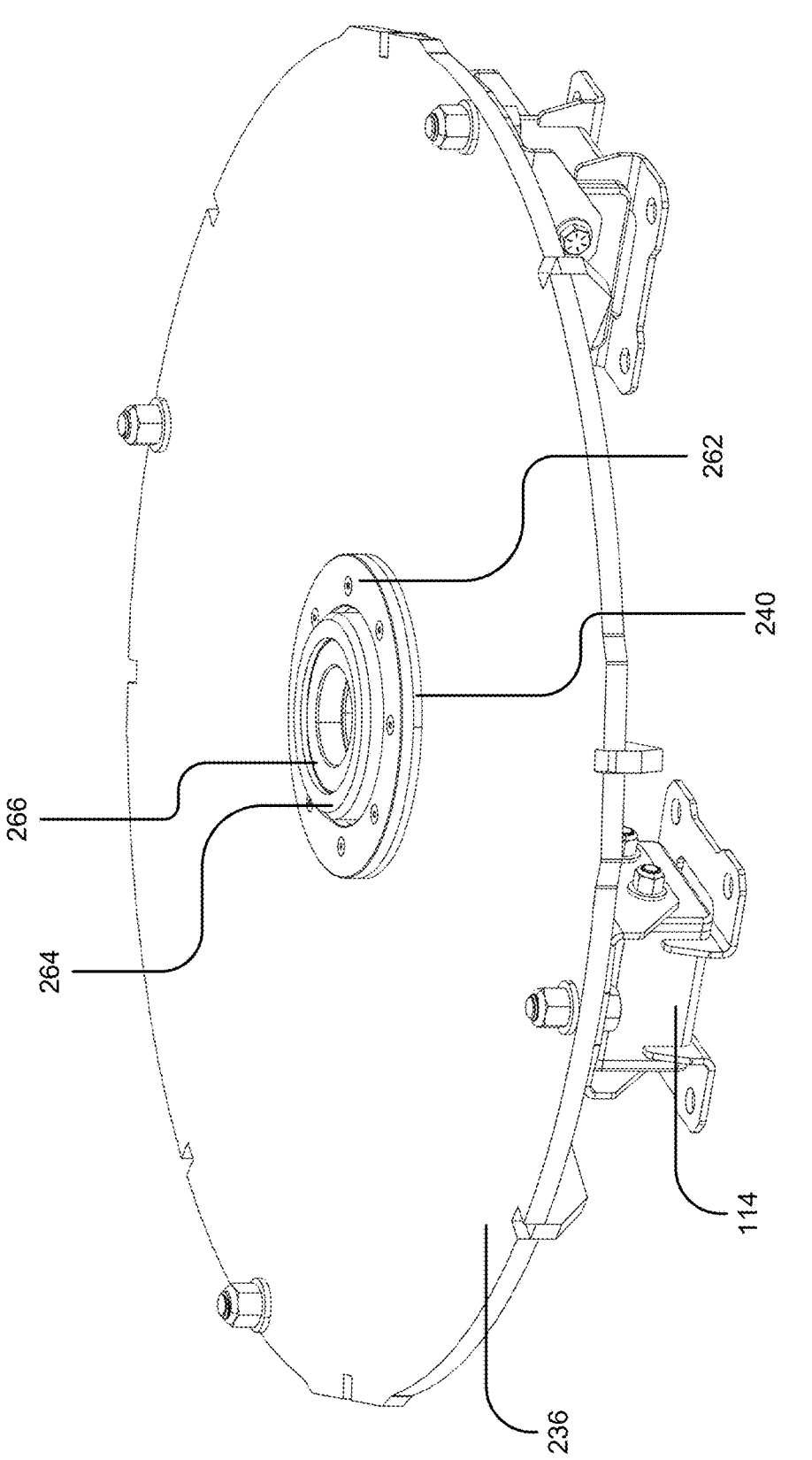
FIG. 6B illustrates a bottom plate of a flywheel enclosure with a lower bearing coupled thereto.

FIG. 6B illustrates a bottom plate 236 of a flywheel enclosure 104 with a lower bearing 266 assembly coupled thereto. In the illustrated example, the enclosure 104 slides, flywheel 402, and bottom axle 408b have been omitted.

As illustrated, the shipping ring 262 and bolt plate 754 may be a single component or multiple components, one of which is slightly raised above the bottom plate 236 of the enclosure 104. The top of the bolt plate 754 may act as a shipping ring 262/support surface, as described above, to support the flywheel 402 when not in use. The bolt plate 754 may also couple together with the base ring 240, lower sleeve 608, and/or other components of the assembly 102 to hold it together and provide support.

In some implementations, the nut bearing holder 264 may be positioned within the base ring 240 and shipping ring 262/bolt plate 754 and move upwards and downward therein in order to move the bearing(s) 266. The bearings 266 may move upward and/or downward with the nut bearing holder 264, for example, to lift or lower the lower/bottom axle 408b and change the position of the flywheel 402, as described above.

Figure 6C:
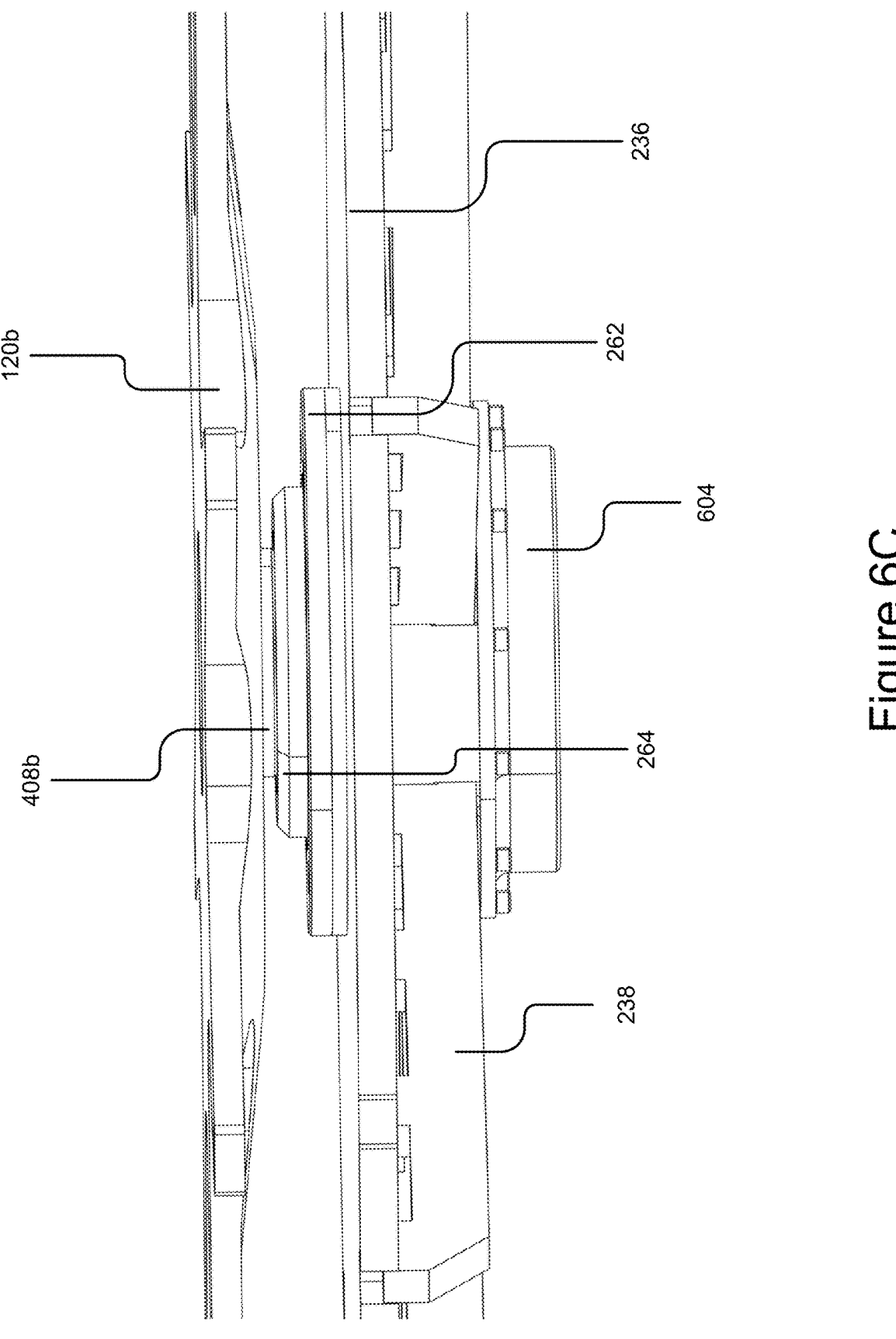
FIG. 6C illustrates a side view of an example lower bearing assembly with a bottom axle and bottom clamping plate coupled thereto.

FIG. 6C illustrates a side view of an example lower bearing 266 assembly with a bottom axle 408b and bottom clamping plate 120b coupled thereto. The lower bearing 266 assembly is shown coupled with a bottom plate 236 of a flywheel enclosure 104 and the enclosure 104 sides are omitted. As illustrated, the bottom axle 408b of the flywheel 402 extends into the nut bearing holder 264 to interact with the bearings 266 held thereby. The example implementation of FIG. 6B corresponds to an active position where the flywheel 402 (e.g., the clamping plate 120b) is lifted off the shipping ring 262.

Figure 7A:
FIG. 7A illustrates a bottom-up view of an example nut bearing holder coupled with a flywheel enclosure and a hex lock.
Figure 7B:
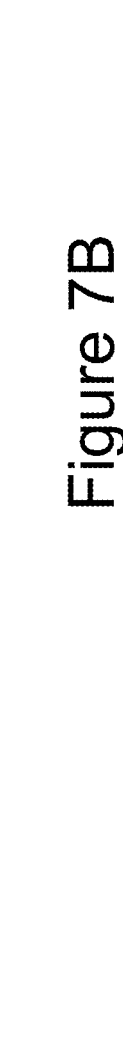
FIG. 7B illustrates an example hex lock.

FIG. 7A illustrates a bottom-up view of an example nut bearing holder 264 coupled with a flywheel enclosure 104 and a hex lock 606. As illustrated in the example of FIG. 7A, a nut bearing holder 264 is located in a base ring 240 and a retaining cap 604 is removed for visibility. As illustrated, the nut bearing holder 264 may be in a defined rotation that affects the height of the flywheel 402. Because small changes in the height of the flywheel 402 may affect its functioning (e.g., while it interacts with a magnetic lift member 152 or bearing(s) 266), a few degrees of rotation of the nut bearing holder 264 can significantly affect the longevity, etc., of the bearings 266. Accordingly, the hex lock 606 may include teeth 714 on a radially inward edge, any of which may interact with the sides of the nut bearing holder 264 in various rotational positions. As noted below, the hex lock 606 may interact with a retaining cap 604 to hold the hex lock 606 in place, so that the hex lock 606 bridges the gap and/or rotational difference between the nut bearing holder 264 and the retaining cap 604. Accordingly, when the retaining cap 604 is placed on it, the cap 604 and hex lock 606 combination captures the torque of the nut bearing holder 264, which may be otherwise disposed to rotate due to the rotation of the flywheels 402 and bearings 266.

Also, as illustrated in FIG. 7A, the nut bearing holder 264 may include a hex shape to interact with wrench or other tools of various sizes, although it may be a different shape to accommodate different tools. In some implementations, it may include one or more slots at the bottom, so that a flat tool or a rod can be used to tighten or loosen the nut.

FIG. 7B illustrates an example cap 604 or nut hex lock 606 (also referred to as a hex lock 606). As illustrated in the example of FIG. 7B, the hex lock 606 may be a ring that may extend around a hex nut, such as the nut bearing holder 264; although, it should be noted that it may extend only partially around the nut. The hex lock 606 may be a plate or disk of material that is formed, machined, or stamped (e.g., from steel) to have its features, as noted below.

In the depicted implementation, the hex lock 606 may include teeth 714 or other grooves, protrusions, recesses or other structures disposed around an inner edge of the ring. For instance, the angles of the teeth 714 may match the angle of the hex lock 606 (e.g., 120 degrees) and where the radius of the nut bearing holder 264 matches the radius of the corners of the teeth 714, so that when the hex lock 606 is placed on the nut, the teeth 714 hold the nut.

The quantity of teeth 714 of the hex lock 606 may be varied depending on the increments of angles at which the nut may be held and adjustability of the retaining cap 604. For instance, the teeth 714 may be larger and therefore fewer if the precise angle of adjustment of the nut is less important but smaller and greater in number of more precision is required for the application. Similarly, as noted elsewhere herein, the retention cap 604 may provide adjustability in its mounting to the enclosure 104 and/or interaction with the hex lock 606, so the teeth 714 may be made larger based on the retaining cap 604 adjustability.

The hex lock 606 may also include one or more protrusions 712 at an outer edge of the ring (e.g., a full or partial ring) that may interact with another structure to prevent the hex lock 606 from rotating. For instance, the hex lock 606 protrusions 712 may interact with corresponding protrusions or recesses of the retaining cap 604, as noted below, to hold the hex lock 606 in a position. The hex lock 606 may include various quantities of protrusions, such as the six pairs of protrusions illustrated in the example. The protrusions and their interaction with one or multiple positions and structures are described in further detail below.

It should be noted that, although nut interaction teeth 714 are illustrated in the inner edge of the ring and hex lock protrusions 712 are illustrated on the outside of the ring, other implementations are possible and contemplated herein. For instance, the hex lock 606 and/or retainer cap 604 may interact with an inner surface of the nut bearing holder 264 to keep it in place.

As noted below, in some implementations, the structure of the hex lock 606, such as the teeth 714, may be integrated with the retaining cap 604.

Figure 7C:
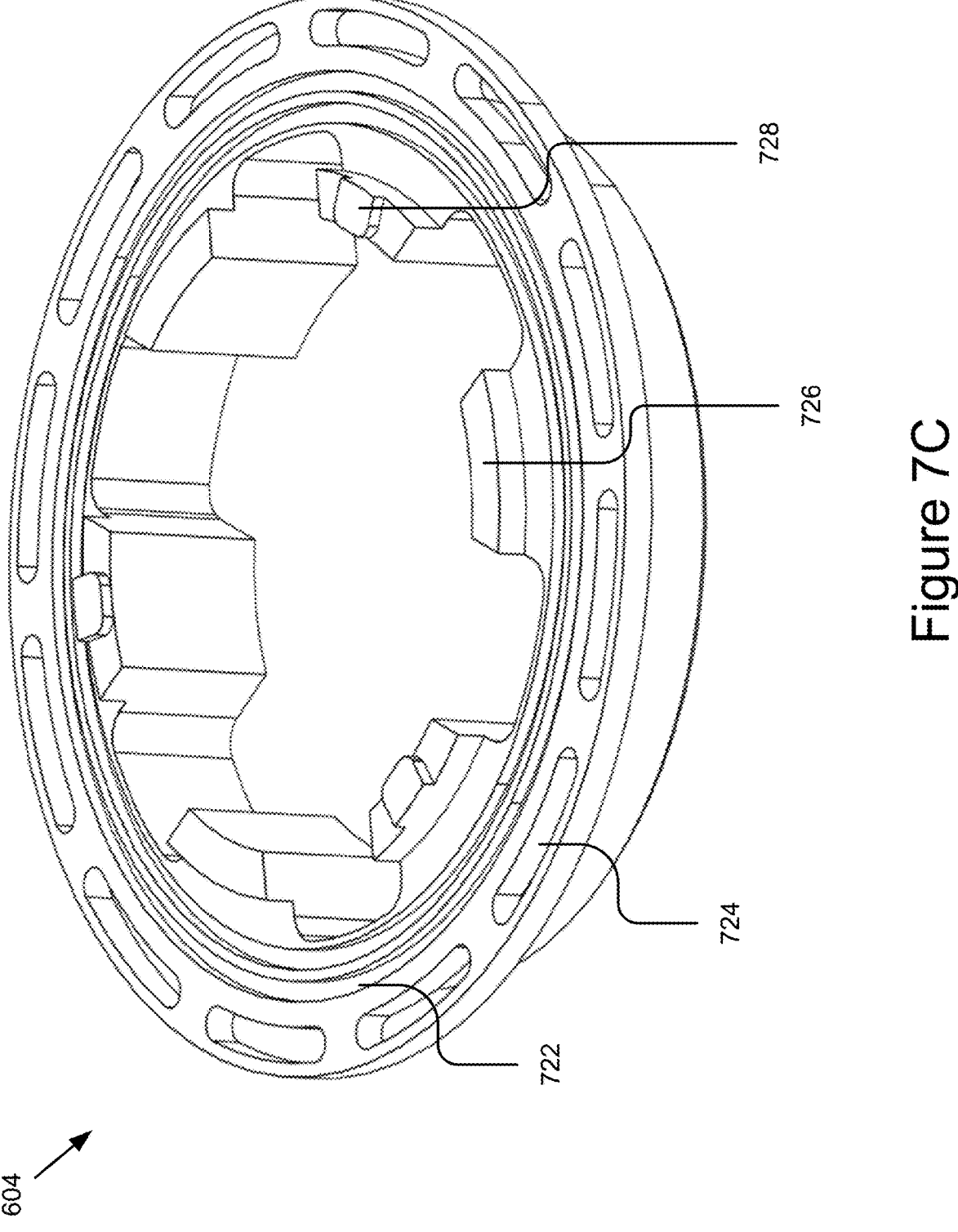
FIG. 7C illustrates a top view of an example retaining cap.

FIG. 7C illustrates a top view of an example retaining cap 604. As illustrated, the retaining cap 604 may include hex lock interaction elements 728. For instance, the interaction elements 728 may be raised above the body of the retaining cap 604 in order to extend upward into the space next to a nut bearing holder 264 and interact with the hex lock 606. For instance, the retaining cap 604 may include an equal or fewer number of hex lock interaction elements 728 as the hex lock 606 includes locking protrusions 712, so that these components interact with each other in order to rotationally couple the hex lock 606 to the retaining cap 604. As illustrated in the example, the hex lock 606 may include more locking protrusion 712 pairs than the retaining cap 604 includes interaction elements (e.g., a 2:1 ratio), so that the hex lock 606 can be locked into multiple positions relative to the retaining cap 604. In some instances, these positions may be offset at various angles to provide further adjustability to the interaction.

In some implementations, the retaining cap 604 may include raised areas 726 that contact the bottom of the hex lock 606 to hold it in place. For instance, the top of the hex lock 606 may press against another area of the nut bearing holder 264, base ring 240, or another area to keep it from falling off the hex lock interaction elements 728.

In some implementations, the retaining cap 604 and/or base ring 240 (not shown in FIG. 7C) may include recesses or other areas that may hold seals (e.g., gaskets or O-rings 752) in order to seal the vacuum internal to the enclosure 104. For example, two grooves are illustrated as O-ring holders 722 in FIG. 7C. In some implementations, the retaining cap 604 may include other components or structures, such as a vacuum hose adapter to which a vacuum hose may be attached to pull the vacuum in the enclosure 104.

In some implementations, the retaining cap 604 may include adjustable bolt holes 724 or slots through which the retaining cap 604 may be bolted to the enclosure 104, such as the base ring 240 as noted above. For example, the retaining cap 604 may be bolted at various positions, which increases adjustability of the retaining cap 604, hex lock 606, and nut bearing holder 264 combination, so that more precise rotations and, therefore, heights may be locked.

Figure 7D:
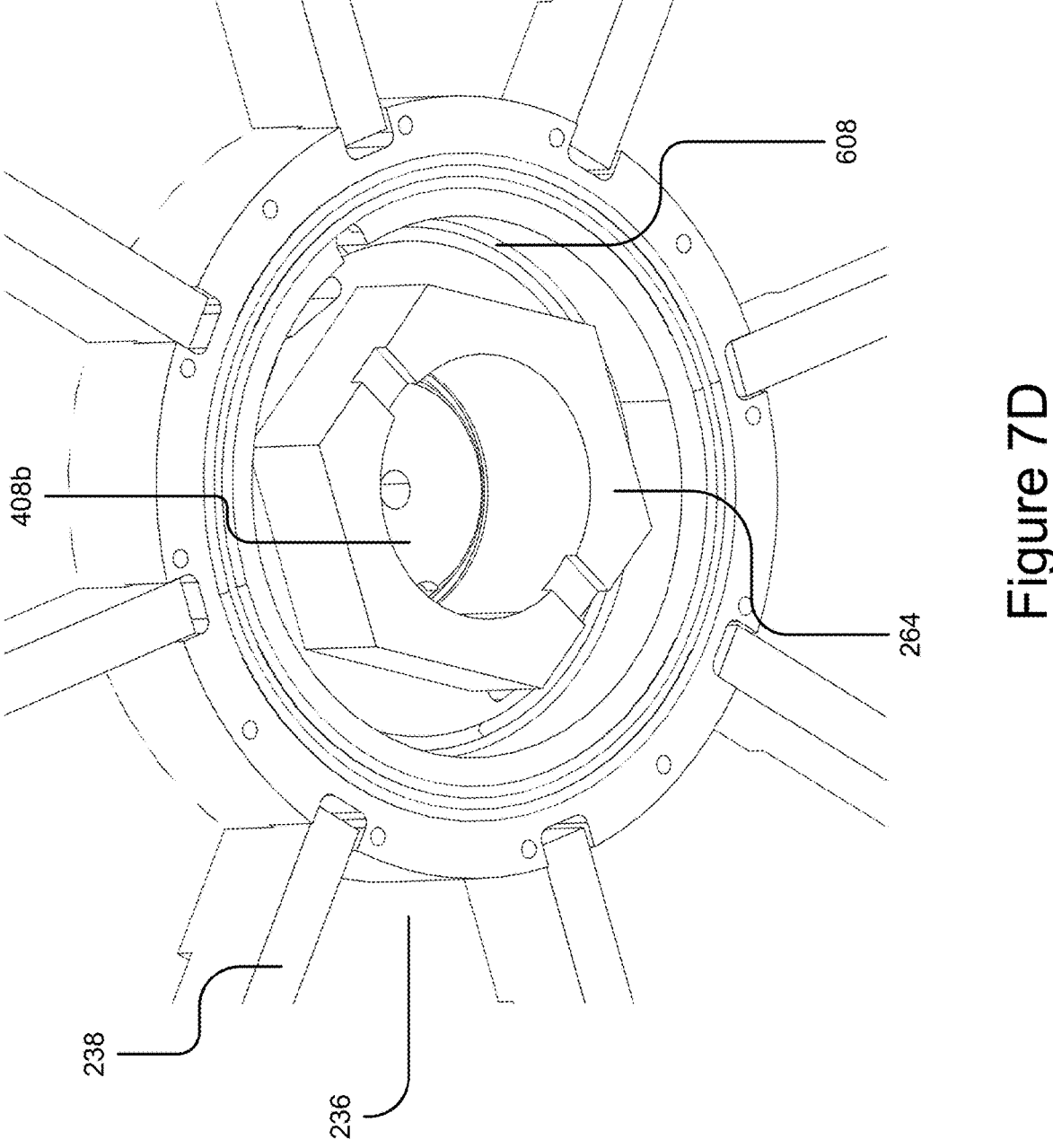
FIG. 7D illustrates a bottom view of an example nut bearing holder with a nut hex lock removed therefrom.

FIG. 7D illustrates a bottom view of an example nut bearing holder 264 with a nut hex lock 606 removed therefrom. As illustrated in the example, a nut bearing holder 264 may be rotated to move it upwards or downwards in the base ring 240 and/or lower sleeve 608. The nut bearing holder 264 may hold a bearing 266, which, in turn, holds the lower/bottom axle 408*b* of the flywheel 402. In some implementations, the nut bearing holder 264 may be open at a center/bottom so that the bottom axle 408*b* is visible, although other implementations are possible and contemplated herein. Once the nut bearing holder 264 is rotated to a correct rotation/height, the hex lock 606 and/or retaining cap 604 may be placed thereon to secure its rotation and therefore the vertical/Z height of the flywheel 402.

Figure 7E:
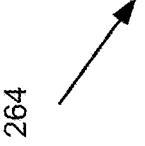
FIG. 7E illustrates a top view of an example nut bearing holder.

FIG. 7E illustrates a top view of an example nut bearing holder 264. The example nut bearing holder 264 may have the illustrated configuration, although other configurations are possible. Additionally, the nut bearing holder 264 is illustrated without threads for clarity but, in some implementations, it may include threads on an outer face 738 to allow it to be twisted up or down. The bearing(s) 266 are also removed from the bearing holder 732 in order to illustrate an example structure of the nut bearing holder 264.

The nut bearing holder 264 may have a hex interface 740 and/or notches to allow it to interact with tools and/or the hex lock 606. The hex interface 740 may be located at the bottom of the nut bearing holder 264, for example, below the outer face 738 and bearing holder 264.

The nut bearing holder 264 may have a bearing holder body 734 with an outer face 738 and a bearing holder portion 732 on the inside that holds one or more bearings 266. For instance, the bearing holder body 734 may be cylindrical with threads on a radially outward face and a hollowed-out core configured to hold one or more bearings 266. The core or center of the bearing holder portion 732 may support vertical and/or horizontal bearings 266, such as on one or more bearing steps 736. In some implementations, the bearing holder body 734 may include a cavity at a center, such as is illustrated, to hold the flywheel axle 408*b* or let it pass therethrough.

The nut bearing holder 264 may be resized, elongated, or widened based on the size of axle 408*b* and/or tightening tool being used. Furthermore, other configurations are possible and contemplated, such as where the nut bearing holder 264 additionally or alternatively holds a shipping ring 262, where the nut bearing holder 264 has a different shape, or otherwise.

Figure 7F:
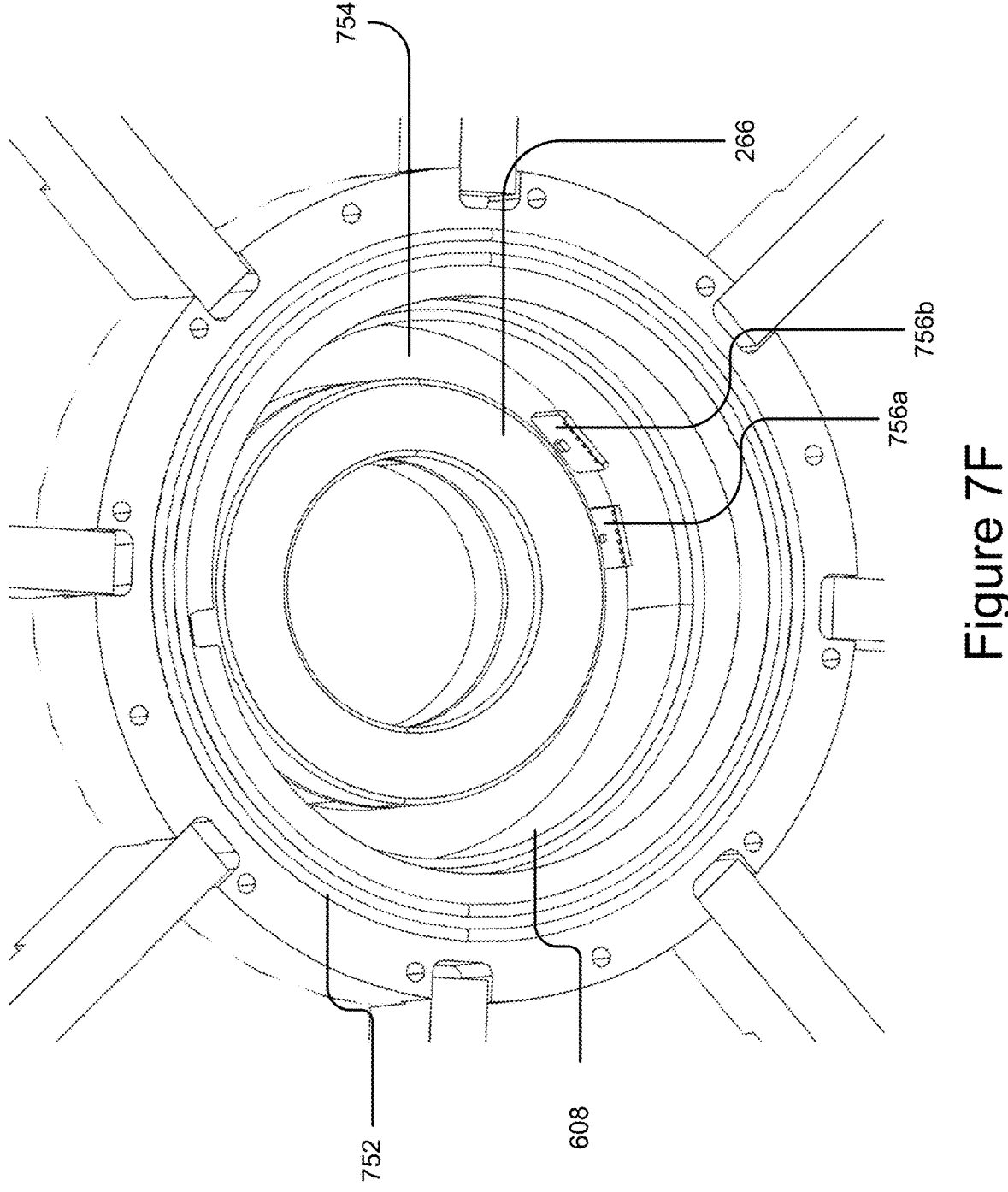
FIG. 7F illustrates an example lower bearing in a flywheel enclosure.

FIG. 7F illustrates an example lower bearing 266 in a flywheel enclosure 104 with the nut bearing holder 264 and bottom axle 408*b* removed to show the other example components. Although the bearing holder 264 has been removed, the bearing(s) 266 is illustrated to show their positioning. The bearing(s) 266 may move upward or downward in the aperture based on rotation of the nut bearing holder 264.

As shown, the bearings 266 may be held at the center of an aperture/hole in the enclosure 104 bottom. The enclosure 104 bottom may include a base ring 240 coupled with a bottom plate 236 and bottom rib 238 to provide strength to support the flywheel 402. In some implementations, the base ring 240 may include a lower sleeve 608 that is positioned between a portion of the nut bearing holder 264 and the base ring 240 to provide threads and/or reduce vibrations (e.g., from a space around the nut bearing holder 264). In some implementations, the base ring 240 or other components may be coupled with a bolt plate 754 at the bottom of the enclosure 104 tub, which may securely hold the lower bearing 266 assembly in place.

In some implementations, the nut bearing holder 264, lower sleeve 608, space around the nut bearing holder 264, or other area of the lower bearing 266 assembly may include one or more sensors 756 that relay bearing 266 or flywheel 402 health/status to the flywheel CPU/CNS/controller. For instance, a temperature sensor 756*a* and an acceleration sensor 756*b* may be placed at the bearing 266 to detect bearing 266 wear and/or failure or other anomalous conditions. Wiring for the sensors 756 may pass through a retaining cap 604 or through the side of the enclosure 104, as illustrated elsewhere herein.

Figure 7G:
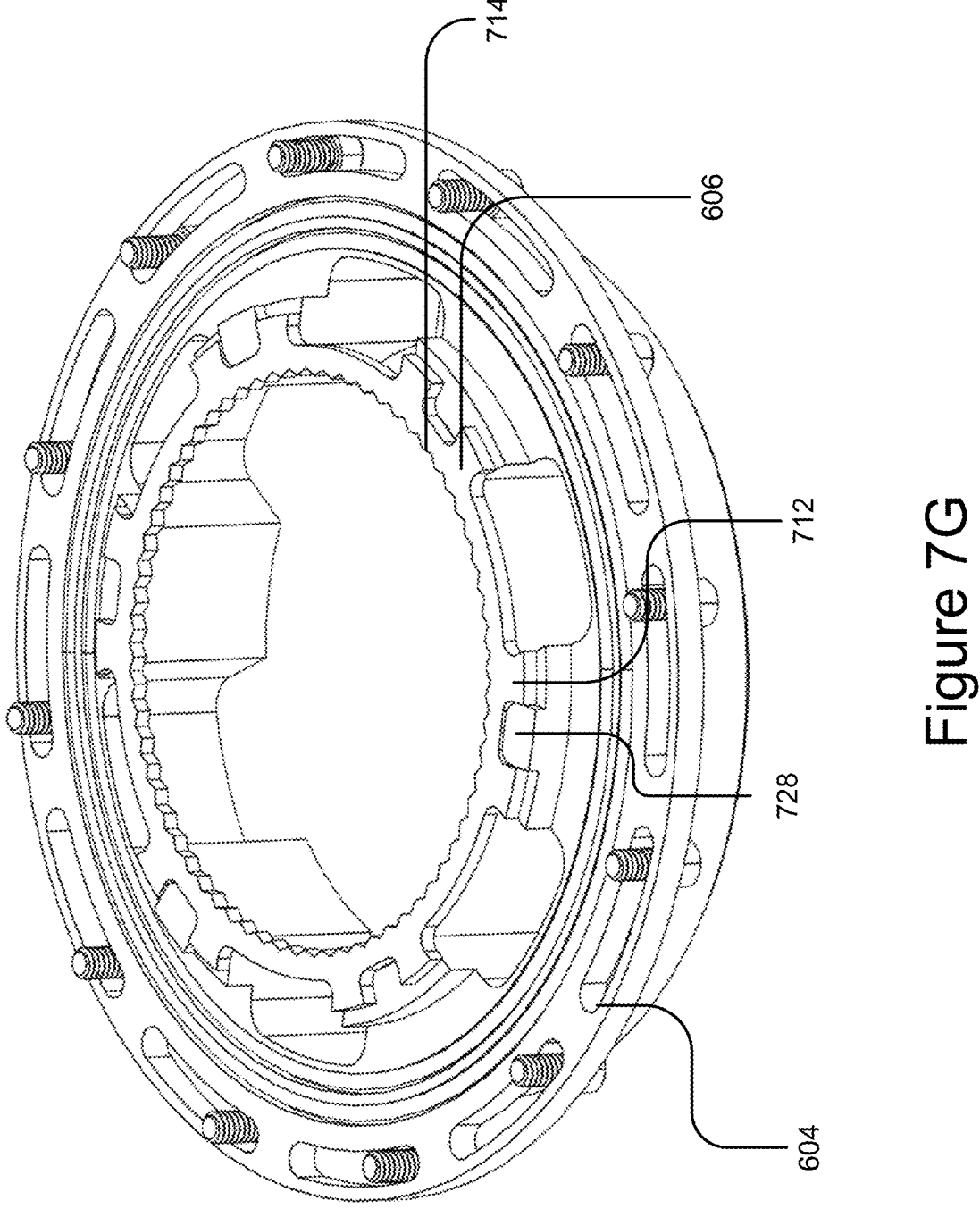
FIG. 7G illustrates a top view of an example cap hex lock and nut bearing holder.

FIG. 7G illustrates a top view of an example cap hex lock 606, and nut bearing holder 264 in an assembled position, but with the flywheel 402, flywheel enclosure 104, and nut bearing holder 264 omitted for clarity.

The example raised area(s) 726 of the retaining cap 604 are illustrated supporting the cap hex lock 606 to keep it in place. Hex lock interaction element(s) 728 of the retaining cap 604 are also shown interacting with locking protrusions 712 of the hex lock 606. For instance, the interaction elements 728 are held in between pairs of the locking protrusions 712 around an outer edge of the cap hex lock 606. It should be noted that different configurations, such as pairs of protrusions being on the cap 604 instead of or in addition to the hex lock 606 are possible. Similarly, other structures in which the components are rotationally locked are possible and contemplated herein.

It should be noted that although the cap hex lock 606 and retaining cap 604 are illustrated as separate components, in some implementations, they may be integrated into a single component. For instance, an inner diameter of the retaining cap 604 may include teeth 714 configured as the hex lock 606. Accordingly, while separating these components may provide easier manufacturability and assembly, they may be combined into a single unit designed to hold the nut bearing holder 264 in place, for example, at various rotations and corresponding heights.

Figure 7H:
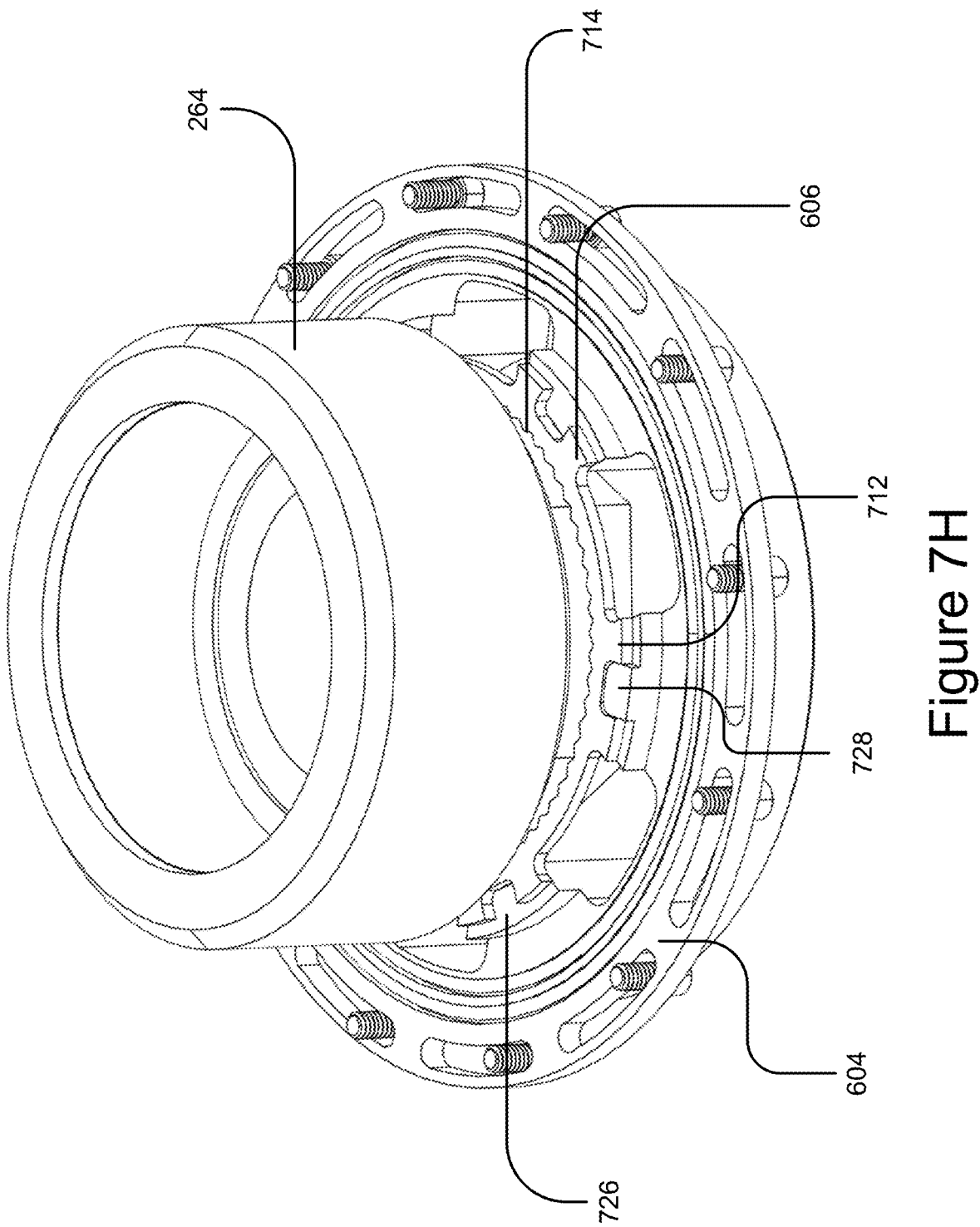
FIG. 7H illustrates a top view of an example retaining cap, cap hex lock, and nut bearing holder in an assembled position.

FIG. 7H illustrates a top view of an example retaining cap 604, cap hex lock 606, and nut bearing holder 264 in an assembled position, but with the flywheel 402 and flywheel enclosure 104 omitted for clarity. In the depicted example, the assembled retaining cap 604 and cap hex lock 606 are shown in a locking position to prevent the nut bearing holder 264 from rotating.

In addition to the interactions described above between the retaining cap 604 and the cap hex lock 606, the teeth 714 of the hex lock 606 are shown interacting with the corners of the hexagonal/hex interface 740 of the nut bearing holder 264 to rotationally lock the hex lock 606 with the nut bearing holder 264.

The retaining cap 604 may be bolted with the base ring 240 or other component of the flywheel enclosure 104. For example, a technician may position the nut bearing holder 264 (e.g., as a correct height, as noted above), place the cap hex lock 606 in the retaining cap 604, and then place the retaining cap 604 onto the base ring 240 while rotating it slightly (e.g., using adjustability provided by the bolt holes/slots) until the teeth 714 of the hex lock 606 fall into place with the nut bearing holder 264. The bolts of the retaining cap 604 may then be tightened to the base ring 240 of the enclosure 104 to secure the entire assembly in the set position and, in some instances, seal an internal vacuum.

FIG. 8 is a block diagram illustrating a method of building a flywheel assembly 102, such as placing a flywheel 402 into a flywheel enclosure 104 and moving the flywheel 402 from a storage or shipping position to an active position. It should be noted that the operations provided are illustrative examples and that variations are possible and contemplated herein, such as where the order of operations is changed, various operations are omitted or added, or otherwise.

In some implementations, at 802, a flywheel 402 may be assembled, aligned, and/or balanced, for example, as described herein.

In some implementations, at 804, a bottom bearing assembly and/or flywheel 402 may be set at a storage or shipping position, for example, using a vertical adjustment bolt or nut 264. For example, an axle 408 support may be completely twisted downward, so that it (e.g., via a bearing) does not vertically support the flywheel 402. As described above, where the flywheel 402 is in a shipping position, it may rest on a shipping ring 262 or similar structure to avoid damaging the bearings during shipping. In some implementations, other clamps, packing materials, bolts, or devices may be used to further secure the flywheel 402 from shifting during shipping.

In other implementations, the top and/or bottom bearings may be completely removed or otherwise disengaged to prevent damage to the bearings during transport of the MESU 102 or flywheel assembly 102. In such instances, as noted below at 814, the flywheel 402 may be adjusted and/or the bearings reengaged or re-inserted.

In some implementations, at 806, the flywheel 402 may be placed in the enclosure tub 126 with a bottom axle 408b inserted into the bottom bearing assembly. For instance, the bottom bearing assembly may hold the axle 408 horizontally. Where a bottom axle 408b holder has been moved to a shipping position, a bottom area of the bottom clamping plate 120b may rest on a shipping ring 262 or disposable shipping support. In some implementations, the bottom of the clamping plate 120b and the shipping ring 262 (e.g., with ridges, protrusions, channels, etc.) may prevent the flywheel 402 from shifting on the shipping ring 262 or shipping support during transport.

In some implementations, at 808, the enclosure 104 lid may be attached and sealed to the enclosure tub 126. The enclosure 104 lid may include O-rings or other seals (e.g., caulk, welds, etc.) may be used to seal it. The enclosure 104 lid may be bolted to a top ring of the enclosure tub 126. The top axle 408a of the flywheel 402 may be inserted into a top bearing assembly when the enclosure 104 lid is lowered onto the enclosure tub 126.

In some implementations, various components may be pre-assembled onto the enclosure 104 lid, such as the motor-bearing, controller, or components described or illustrated herein. In some implementations, after the enclosure 104 lid is assembled onto the enclosure 104, the other components of the flywheel assembly 102 may be assembled.

In some implementations, at 810, the MESU 102/flywheel assembly 102 may be transported to an installation location and installed. For instance, the legs thereof may be bolted to a concrete base or other structure. In some implementations, the flywheel assembly 102 may be placed into an enclosure 104 or case that is decorative or protects it from the elements. The flywheel assembly 102 may be placed fully or partially underground, above ground in a water-resistant enclosure 104 or otherwise. In some instances, where additional cooling is needed, the enclosure 104 may include vents, fans, or a radiator.

The flywheel assembly 102 may be installed at a residence in a utility room or adjacent to a service panel, or the flywheel assembly 102 may be installed with other flywheels 402.

In some implementations, at 812, a position of the flywheel 402 may be adjusted into an active position using a vertical adjustment bolt, clamp, axle 408 holder, external lift, or other device. For instance, an axle 408 holder may be twisted upward to engage a lower bearing (e.g., 266) with the flywheel 402 and lift it from a shipping ring 262.

In some implementations, the flywheel 402 may be raised, using an axle holder, lift, or other device (whether from the top or bottom), until the flywheel 402 contacts a top structure, such as the magnetic lift member (e.g., magnets located at the top of the enclosure 104 to pull the flywheel 402 against a top bearing or limit the force on a bottom bearing), an enclosure 104 lid, or another structure, or the flywheel 402 may be raised until another condition is satisfied, such as a measured rotation of the nut bearing holder 264, a measured height or offset from a structure, etc. For example, the flywheel 402 may be raised until a top clamping plate 120a contacts the magnetic lift member 152 or a top bearing. The flywheel 402 may be lowered slightly to avoid contact with a structure or magnetic lift member 152.

Once the vertical position of the flywheel 402 has been set, a retaining cap and/or hex lock 606 may be placed on the nut bearing holder 264 to lock the flywheel's 402 vertical position. Similarly, the retaining cap may be sealed using integrated O-rings or other seals.

Other openings in the enclosure 104 may also be closed or sealed, a vacuum valve may be opened, and other preparations may be performed.

In some implementations, at 814, where the top and/or bottom bearings were removed or otherwise disengaged during shipping, a technician may reinsert or reengage the bearings. For instance, a shipping holder may be removed and/or a bottom bearing may be inserted into a channel or cylinder at the bottom of the flywheel enclosure 104 to bridge the gap between the cylinder and the bottom axle 408b. In some implementations, similar actions may be performed to install one or more top axle bearings.

In some implementations, at 816, the MESU 102/flywheel assembly 102 may be connected to an external electrical network. For example, the motor-generator 110, control unit, or other components may be coupled with an external energy source, load, or power grid. An inverter may be coupled with an external circuit breaker, and a controller may be connected to a communications network. Accordingly, for example, energy received from a grid or renewable energy source (e.g., solar panels) may be received, converted into A/C (e.g., based on a motor-generator type), and used to spin up the flywheel 402. Similarly, when electrical power is requested, the motor-generator 110 may receive energy from the flywheel 402 to provide the power.

In some implementations, at 818, a vacuum may be engaged for the enclosure 104 to reduce internal air pressure in the enclosure 104, which may reduce energy losses due to air resistance. The vacuum may be permanent or maintained by an attached vacuum assembly 108. The vacuum assembly 108 may be set to run at defined intervals or pressures (e.g., based on a pressure sensor). The vacuum assembly 108 may receive its power from the flywheel 402, supercapacitor 106, chemical battery, and/or external grid.

In some implementations, at 820, the flywheel 402 may be spun up or down based on received power, requested power, or a data signal. For instance, when excess power is fed into the motor-generator 110, the motor-generator 110 spins the flywheel 402 more quickly. Similarly, when power is requested, the motor-generator 110 may generate current from on the rotation of the flywheel 402. The flow of energy may be controlled by a controller, which may be controlled based on received signals (e.g., from a server or connected computer).

The flywheel 402 controller may measure various parameters of the flywheel 402, such as its rotational frequency, using sensors in the bearings or otherwise coupled with the flywheel assembly 102. The controller may instruct an inverter to receive or input power that keeps the flywheel 402 within certain RPMs. For instance, the controller may measure the RPM and keep the flywheel 402 from spinning too quickly beyond safe limits, which may be set based on flywheel 402 size, material strengths, desired energy storage capacity, regulations, etc. For example, the limits may keep the flywheel 402 at less than 15,000 or 25,000 RPMs, although other implementations are possible.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above-described implementations, implementations, and examples, but by all implementations, implementations, and examples, and other equivalents within the scope and spirit of the invention as claimed.

What is claimed is:

1. A flywheel enclosure comprising:

an enclosure base having a bottom surface and one or more side walls coupled with the bottom surface;

an enclosure lid having a top surface, the enclosure lid coupling with the one or more side walls of the enclosure base to create an enclosed space, the enclosed space containing a flywheel, the flywheel having one or more axles;

one or more bearings coupling the one or more axles to the enclosure base and the enclosure lid, the one or more bearings holding the one or more axles at an axis of rotation;

a nut bearing holder including a recess that holds a bottom bearing of the one or more bearings, the nut bearing holder including first threads that interact with second threads of the enclosure base, rotating the nut bearing holder in the second threads causing the nut bearing holder to move the bottom bearing in an axial direction; and a nut locking mechanism including one or more interfaces that interact with a corresponding structure on the nut bearing holder, the nut locking mechanism locking the nut bearing holder at one of a set of angles defined by the one or more interfaces.

2. The flywheel enclosure of claim 1, further comprising: a plurality of reinforcing ribs reinforcing the bottom surface and the one or more side walls.

3. The flywheel enclosure of claim 1, wherein:

one or more seals are disposed on at least one of the enclosure base and the enclosure lid, the one or more seals sealing the enclosed space to provide a vacuum inside the enclosed space.

4. The flywheel enclosure of claim 1, wherein:

the enclosure base includes a top ring mounted to the one or more side walls, the top ring including a groove holding an O-ring seal;

the enclosure lid mounts to the top ring via a plurality of fasteners, the O-ring seal sealing the enclosure lid to the top ring; and the one or more bearings include a top bearing coupled with the enclosure lid and the bottom bearing coupled with the enclosure base.

5. The flywheel enclosure of claim 1, further comprising: a component mounting plate coupled with the enclosure lid, the component mounting plate including a plurality of accessory mounting points, a vacuum assembly being mounted to one or more of the plurality of accessory mounting points.

6. The flywheel enclosure of claim 1, wherein:

the nut bearing holder lifts the flywheel via the one or more bearings when the nut bearing holder is rotated.

7. The flywheel enclosure of claim 1, wherein the enclosure base includes a threaded ring having the second threads around a perforation in the bottom surface, the threaded ring interacting with the first threads of the nut bearing holder.

8. The flywheel enclosure of claim 1, further comprising: a positioning mechanism coupled with the enclosure base, the positioning mechanism moving one or more of the one or more bearings and the flywheel within the enclosed space, the positioning mechanism including the nut bearing holder.

9. The flywheel enclosure of claim 8, wherein the positioning mechanism includes:

the nut bearing holder that holds the bottom bearing of the one or more bearings at a radially inward position from a circumferential wall of the nut bearing holder, the nut bearing holder having the first threads that cause the nut bearing holder to move the bottom bearing vertically when the nut bearing holder is rotated, the first threads being radially outward from the circumferential wall of the nut bearing holder.

10. The flywheel enclosure of claim 8, further comprising:
a shipping support area coupled with the enclosure base and extending above the bottom surface of the enclosure base, the shipping support area vertically supporting the flywheel, the positioning mechanism lifting the flywheel from the shipping support area when the nut bearing holder moved in the axial direction.

11. The flywheel enclosure of claim 10, wherein the shipping support area includes a shipping ring located around a perforation in the bottom surface, the one or more bearings extending through the perforation in the bottom surface.

12. The flywheel enclosure of claim 8, wherein the positioning mechanism includes:
the nut bearing holder that holds the bottom bearing of the one or more bearings, the nut bearing holder moving the bottom bearing and the flywheel within the enclosed space when the nut bearing holder is rotated; and
the nut locking mechanism that locks the nut bearing holder rotationally to the enclosure base.

13. The flywheel enclosure of claim 12, wherein the nut locking mechanism includes:
a retaining cap that holds the nut bearing holder to the enclosure base and encloses the one or more bearings in the enclosed space.

14. The flywheel enclosure of claim 13, wherein the nut locking mechanism includes:
a hex interface coupling with the nut bearing holder and the retaining cap, the hex interface allowing the nut bearing holder to be held by the retaining cap at the set of angles defined by the hex interface, the one or more interfaces including the hex interface.

15. The flywheel enclosure of claim 8, wherein:
the flywheel enclosure includes one or more magnets coupled with the enclosure lid, the one or more magnets pulling the flywheel toward the enclosure lid; and
the movement of the bottom bearing in the axial direction causes the flywheel to move closer to the one or more magnets.

16. A flywheel system comprising:
an enclosure base having a bottom surface and one or more side walls coupled with the bottom surface;
an enclosure lid having a top surface, the enclosure lid coupling with the enclosure base to create an enclosed space, the enclosed space containing a flywheel, the flywheel including a cylinder and one or more axles, the flywheel rotating about the one or more axles, a motor being mounted to the enclosure lid and coupled with the one or more axles, the motor changing a rotational velocity of the flywheel;
one or more bearings coupling the one or more axles to the enclosure base and the enclosure lid, the one or more bearings holding the one or more axles at an axis of rotation;

a nut bearing holder including a recess that holds a bottom bearing of the one or more bearings, the nut bearing holder including first threads that interact with second threads of the enclosure base, rotating the nut bearing holder in the second threads causing the nut bearing holder to move the bottom bearing in an axial direction; and
a nut locking mechanism including one or more interfaces that interact with a corresponding structure on the nut bearing holder, the nut locking mechanism locking the nut bearing holder at one of a set of angles defined by the one or more interfaces.

17. The flywheel system of claim 16, further comprising:
a positioning mechanism coupled with the enclosure base, the positioning mechanism moving one or more of the one or more bearings and the flywheel within the enclosed space, the positioning mechanism including the nut bearing holder.

18. The flywheel system of claim 17, wherein the positioning mechanism includes:
the nut bearing holder that holds the bottom bearing of the one or more bearings at a radially inward position from a circumferential wall of the nut bearing holder, the nut bearing holder having the first threads that cause the nut bearing holder to move the bottom bearing vertically when the nut bearing holder is rotated, the first threads being radially outward from the circumferential wall of the nut bearing holder.

19. The flywheel system of claim 8, wherein:
the nut bearing holder lifting the flywheel via the one or more bearings when the nut bearing holder is rotated.

20. A system comprising:
an enclosure tub having a bottom surface and one or more side walls coupled with the bottom surface;
an enclosure lid having a top surface, the enclosure lid coupling with the enclosure tub to create an enclosed space, the enclosed space containing a flywheel, the flywheel having one or more axles;
one or more bearings coupling the one or more axles to the enclosure tub and the enclosure lid, the one or more bearings holding the one or more axles at an axis of rotation; and
a positioning mechanism coupled with the enclosure tub, the positioning mechanism holding the one or more bearings, the positioning mechanism moving the flywheel vertically via the one or more bearings, the positioning mechanism including:
a nut bearing holder including a recess that holds a bottom bearing of the one or more bearings, the nut bearing holder including first threads that interact with second threads of the enclosure tub, rotating the nut bearing holder in the second threads causing the nut bearing holder to move the bottom bearing in an axial direction; and
a nut locking mechanism including one or more interfaces that interact with a corresponding structure on the nut bearing holder, the nut locking mechanism locking the nut bearing holder at one of a set of angles defined by the one or more interfaces.

* * * * *